(12) United States Patent
Zeng et al.

(10) Patent No.: US 12,222,311 B2
(45) Date of Patent: *Feb. 11, 2025

(54) SELECTIVE REAL-TIME GAS SENSING

(71) Applicant: Oakland University, Rochester, MI (US)

(72) Inventors: Xiangqun Zeng, Rochester Hills, MI (US); Yongan Tang, Huntley, IL (US)

(73) Assignee: Oakland University, Rochester, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,123

(22) Filed: Dec. 6, 2022

(65) Prior Publication Data

US 2023/0109455 A1    Apr. 6, 2023

Related U.S. Application Data

(62) Division of application No. 16/123,643, filed on Sep. 6, 2018, now Pat. No. 11,567,031.

(60) Provisional application No. 62/556,144, filed on Sep. 8, 2017.

(51) Int. Cl.
G01N 27/404    (2006.01)
G01N 27/407    (2006.01)

(52) U.S. Cl.
CPC ....... *G01N 27/4045* (2013.01); *G01N 27/407* (2013.01); *F01N 2560/02* (2013.01)

(58) Field of Classification Search
CPC .................. G01N 27/4045; G01N 27/407
See application file for complete search history.

(56) References Cited

U.S. PATENT DOCUMENTS

| | | | |
|---|---|---|---|
| 7,147,761 B2 | 12/2006 | Davis et al. | |
| 9,213,016 B1* | 12/2015 | Stetter | G01N 33/0006 |
| 2005/0005840 A1* | 1/2005 | Bonrath | C07D 249/08 |
| | | | 117/2 |
| 2006/0078467 A1 | 4/2006 | Stock | |
| 2008/0077331 A1 | 3/2008 | Lewis et al. | |
| 2009/0293590 A1* | 12/2009 | Zeng | G01N 29/022 |
| | | | 73/24.06 |
| 2012/0186999 A1* | 7/2012 | Walton | G01N 33/497 |
| | | | 977/773 |

(Continued)

OTHER PUBLICATIONS

Tang et al., "Electrochemical Oxidation of Hydrogen in Bis(trifluouromethylsulfonyl)imide Ionic Liquids under Anaerobic and Aerobic Conditions", J. Phys. Chem. C., 2016, 120(41), pp. 23542-23551 (web pub. Sep. 12, 2016), 2016.

(Continued)

*Primary Examiner* — C. Sun
(74) *Attorney, Agent, or Firm* — Dierker & Kavanaugh, P.C.

(57) ABSTRACT

In an example of a selective, real-time gas sensing method, a gas sample, potentially including a specific gas molecule to be sensed, is supplied to an interface between a working electrode and an ionic liquid electrolyte. Based on at least one unique electrochemical reaction of the specific gas molecule to be sensed, a driving force is implemented to initiate a series of reactions involving the specific gas molecule. In response to the implementation of the driving force, a signal indicative of the specific gas molecule is monitored for.

15 Claims, 32 Drawing Sheets
(1 of 32 Drawing Sheet(s) Filed in Color)

(56) References Cited

U.S. PATENT DOCUMENTS

| | | |
|---|---|---|
| 2014/0202856 A1 | 7/2014 | Roxhed et al. |
| 2015/0083592 A1 | 3/2015 | Chapples et al. |
| 2015/0241375 A1* | 8/2015 | Merz .................... G01N 27/30 204/406 |
| 2015/0247818 A1 | 9/2015 | Silvester et al. |

OTHER PUBLICATIONS

Tang et al., "Hydrogen Electrooxidation in Ionic Liquids Catalyzed by the NT2 Radical", The Journal of Physical Chemistry, Feb. 2017, 7 pages, 2017.

* cited by examiner

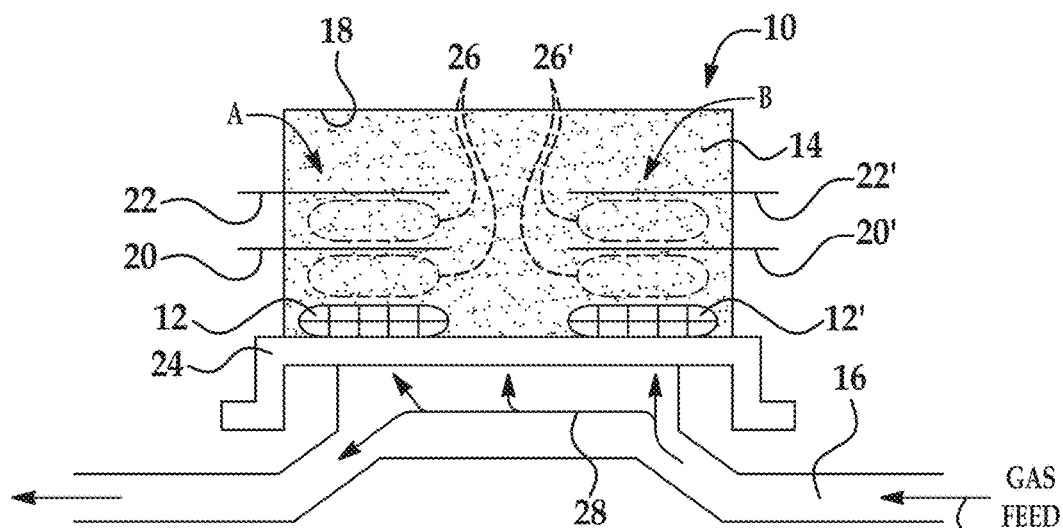
FIG. 1A
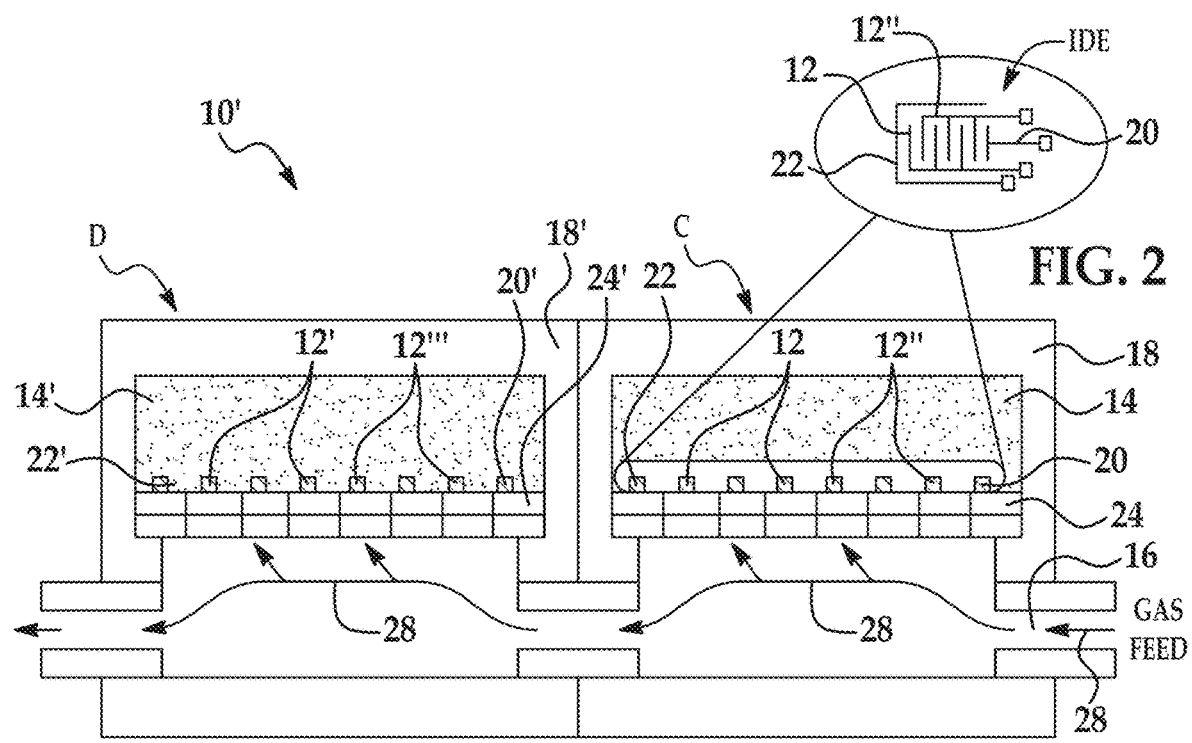
FIG. 1B
FIG. 2

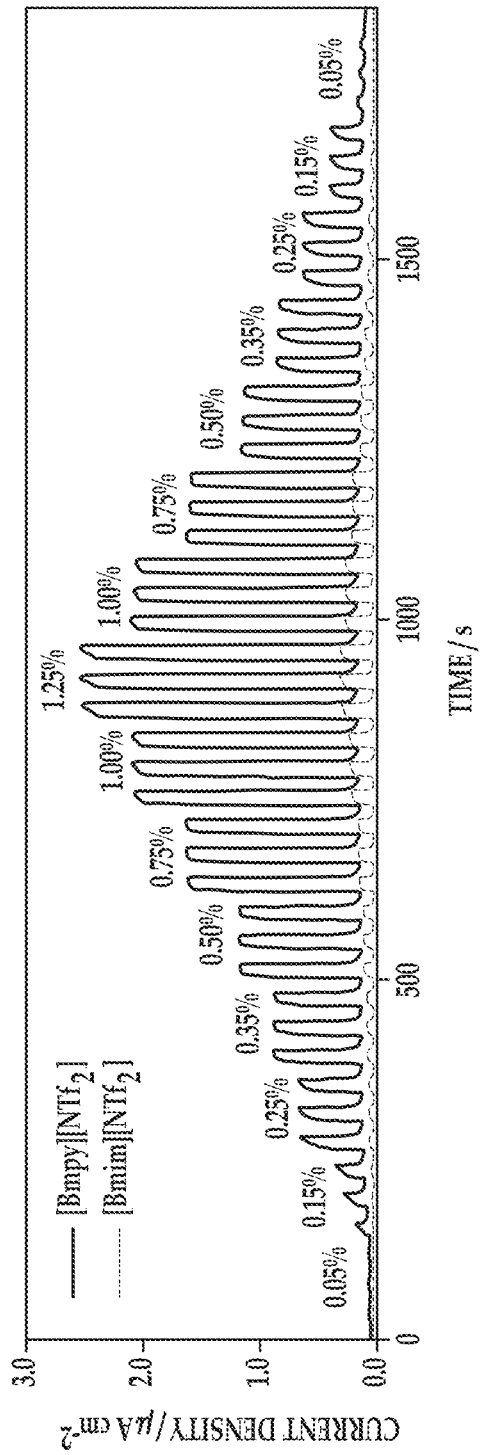
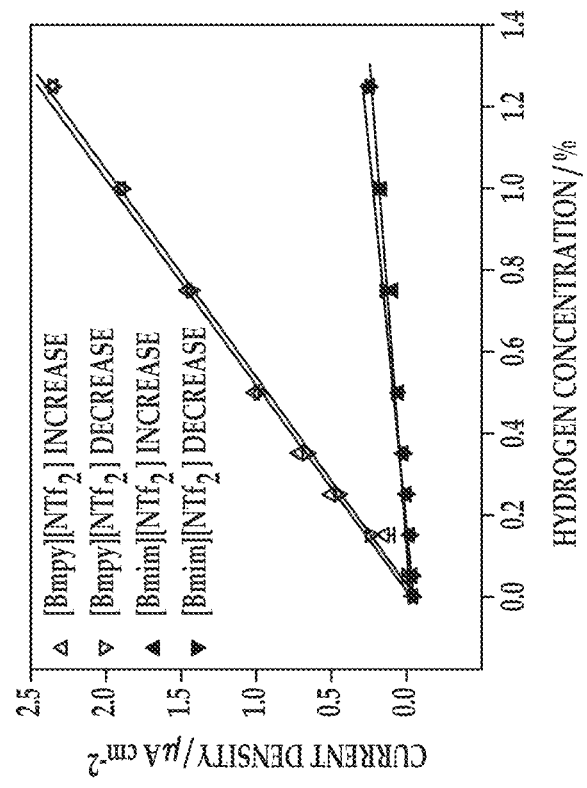
FIG. 6A
FIG. 6B

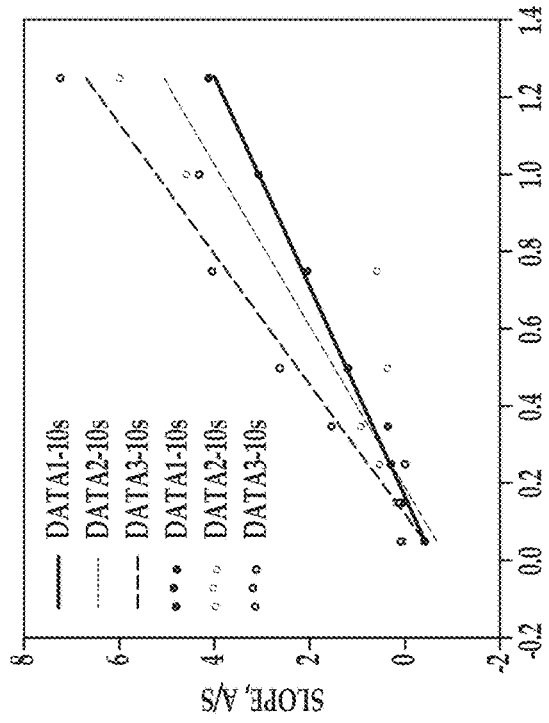
FIG. 15B
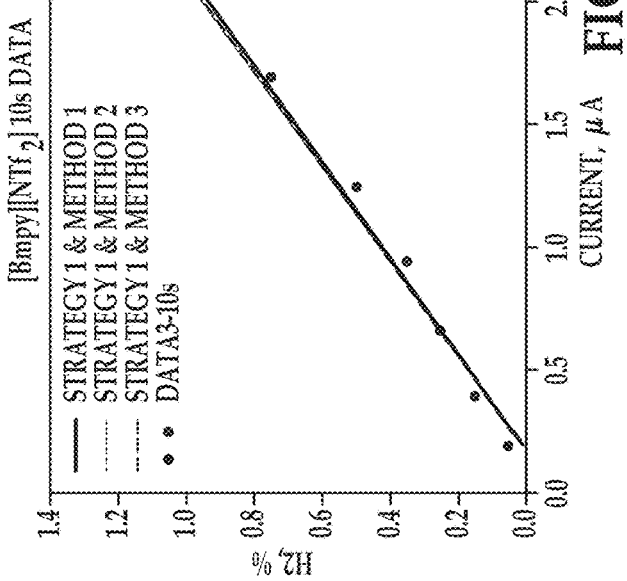
FIG. 16A
FIG. 16B

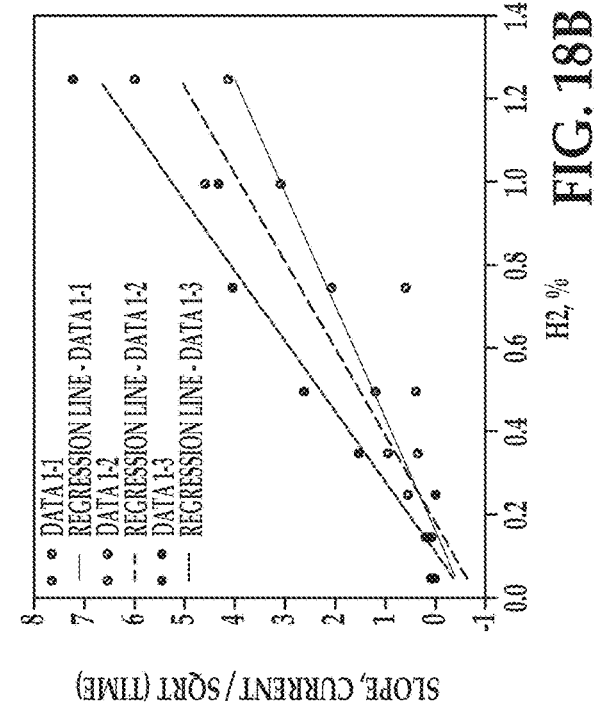
FIG. 17A
FIG. 17B
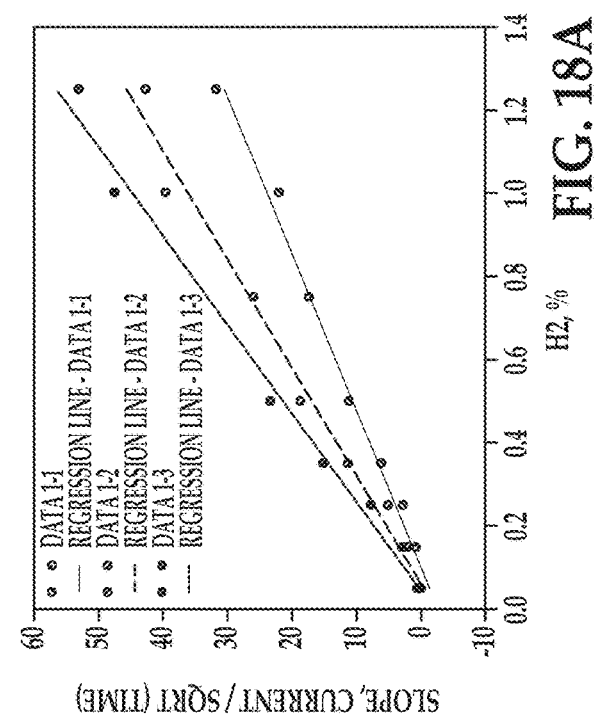
FIG. 18A
FIG. 18B

RED: GAS GROUP 1 HYDROGEN/NITROGEN
BLUE: GAS GROUP 2 AIR/HYDROGEN
GREEN: GAS GROUP 3 HYDROGEN/AIR
PINK: GAS GROUP 4 METHANE/AIR
LIGHT BLUE: GAS GROUP 5 HYDROGEN/METHANE/AIR
YELLOW: GAS GROUP 6 METHANE/SULFUR DIOXIDE/AIR
LIGHT RED: GAS GROUP 7 HYDROGEN/METHANE/SULFUR DIOXIDE/AIR

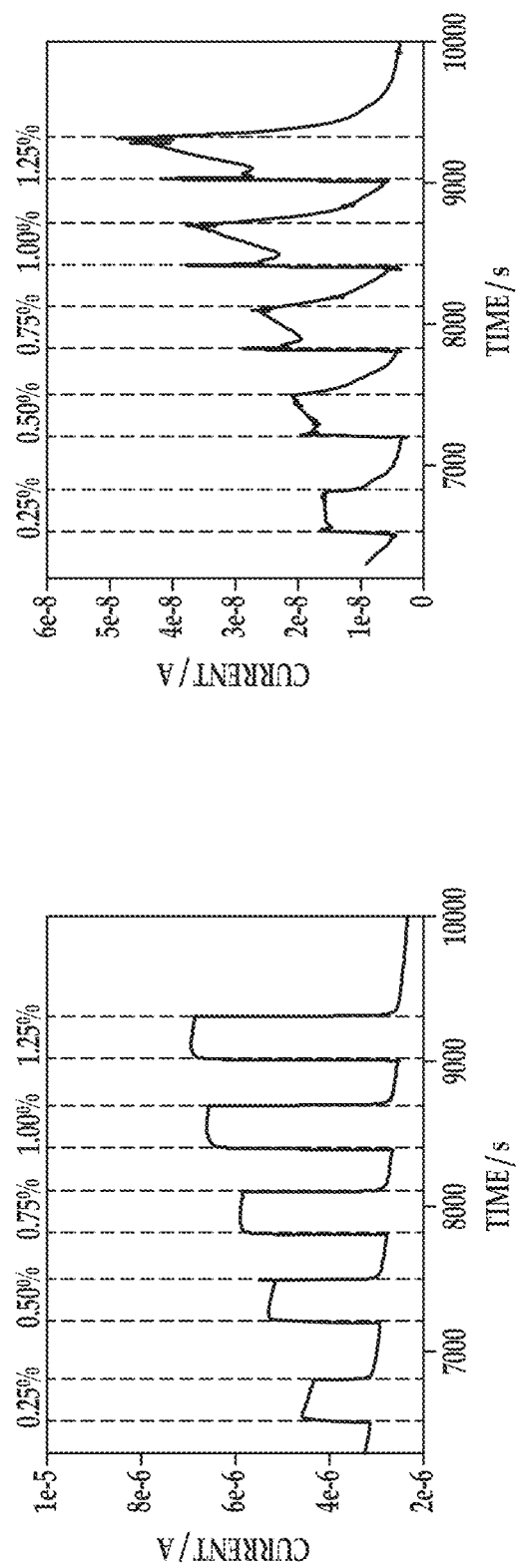
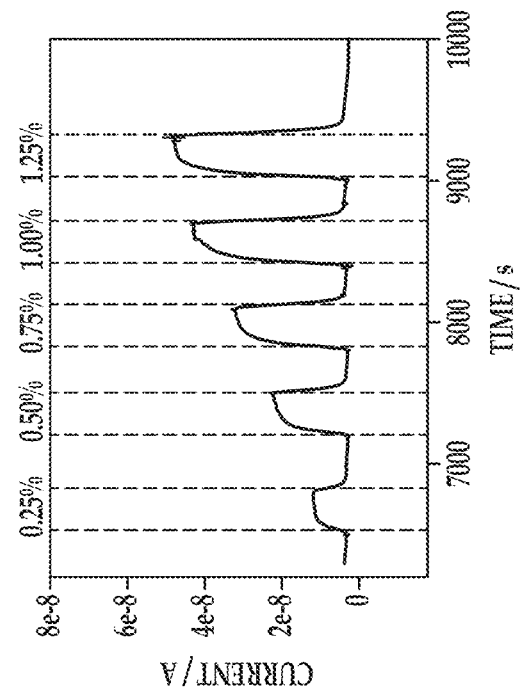
FIG. 30A
FIG. 30B
FIG. 30C

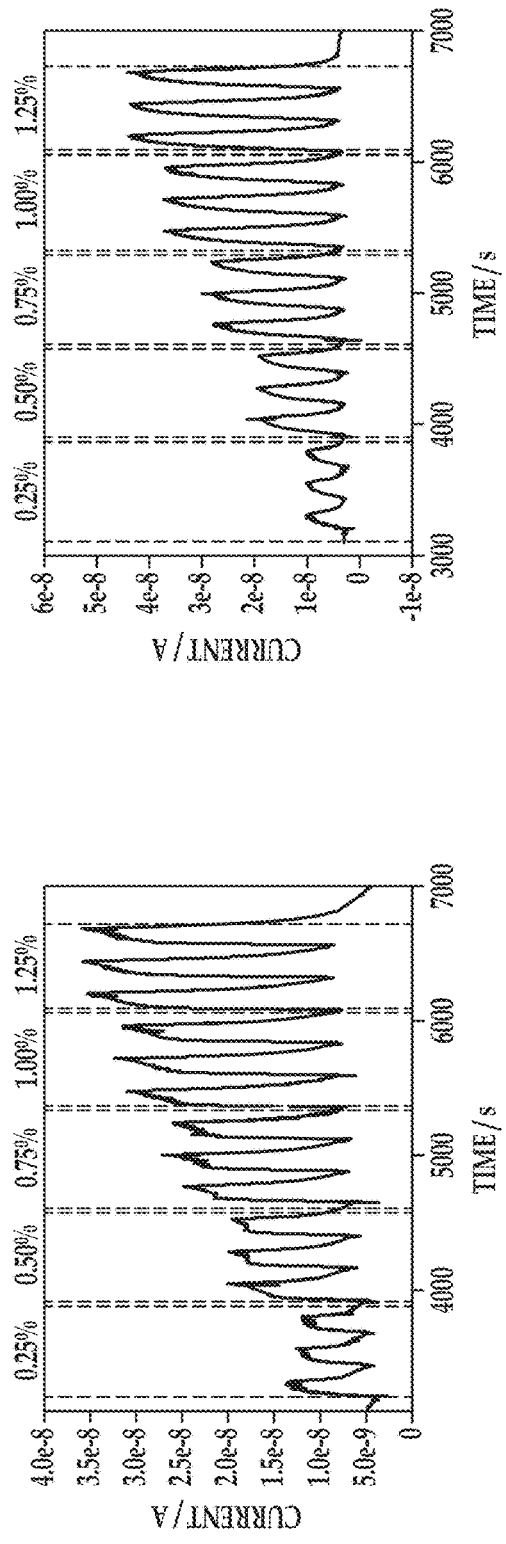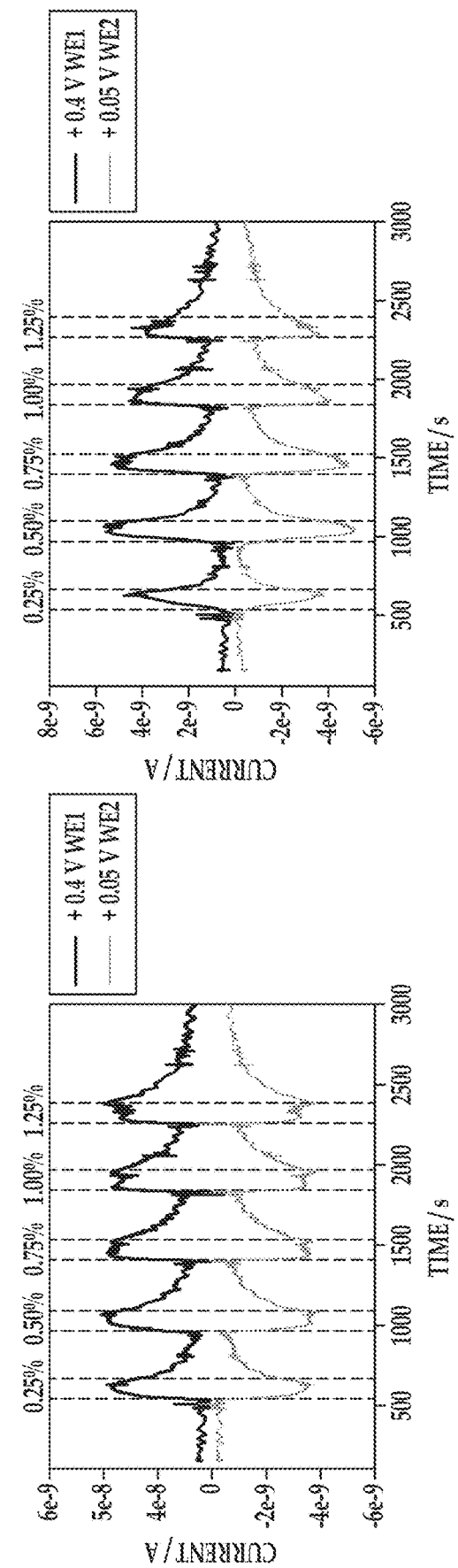

SELECTIVE REAL-TIME GAS SENSING

CROSS-REFERENCE TO RELATED APPLICATIONS

This application is a divisional application of U.S. Ser. No. 16/123,643, filed Sep. 6, 2018, which itself claims the benefit of U.S. provisional application Ser. No. 62/556,144, filed Sep. 8, 2017, the contents of each of which is incorporated by reference herein in its entirety.

STATEMENT REGARDING FEDERALLY SPONSORED RESEARCH OR DEVELOPMENT

This invention was made with government support under Grant No. R01ES022302 awarded by the National Institute of Environmental Health Sciences (NIEHS). The government has certain rights in the invention.

BACKGROUND

Gas monitoring may be desirable for a variety of applications, such as air quality monitoring, environmental health, biomedical diagnostics, occupational health and/or safety, industrial process control, etc. Gases have been detected using optical, solid state, and electrochemical based sensors. Electrochemical sensors require the use of an electrolyte dissolved in water or an organic solvent, which is prone to exhaustion and has a limited applicable potential window. These characteristics can shorten the sensor lifetime, limit the analytes that can be detected, and render continuous gas sampling difficult or impossible.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1A is a cross-sectional schematic illustration of an example of an electrochemical sensing system that may be used to perform an example of the method disclosed herein;

FIG. 1B is a cross-sectional schematic illustration of another example of an electrochemical sensing system that may be used to perform an example of the method disclosed herein;

FIG. 2 is a top, enlarged, schematic view of one example of an interdigitated electrode configuration;

FIG. 6A is a graph depicting the amperometric response of sensors with different ionic liquids ([Bmpy][NTf$_2$]) and [Bmim][NTf$_2$]) in the presence of different, increasing and then decreasing, concentrations of hydrogen in nitrogen (v/v) with 20 second on and off cycles;

FIG. 6B is a calibration curve generated from the data in FIG. 6A;

FIG. 15B depicts linear regression curves for Data1-10s, Data2-10s, and Data3-10s from the sensor with [Bmpy][NTf$_2$] to analyze the signal drift;

FIGS. 16A and 16B are the linear regression curves for Data1-10s, Data2-10s, and Data3-10s from the sensors with [Bmpy][NTf$_2$] (16A) and [Bmim][NTf$_2$] (16B) generated by training one model (Method 1) or two models (Method 2) on Data 1-10s and Data 2-10s and testing the models on Data 3-10s to predict concentration based on the limiting current (summit of current);

FIGS. 17A and 17B are linear regression curves for Data1-10s, Data2-10s, and Data3-10s using the change in current versus the change in time (i.e., slope or ΔI/Δt) as input in the linear regression model;

FIGS. 18A and 18B are linear regression curves for Data1-10s, Data2-10s, and Data3-10s using the change in current versus the change in the square root of the time (i.e., slope or $\Delta I/\Delta t^{1/2}$ or $\Delta I/\sqrt{\Delta t}$) as input in the linear regression model;

FIGS. 30A through 30C are graphs depicting (A) the amperometric response of a sensor with [Bmim][NTf$_2$] in the presence of different and increasing concentrations of hydrogen in nitrogen (v/v) with 5 minute on and off cycles, (B) the amperometric response of one working electrode of a sensor with large spacing planar electrodes (S$_{LD}$) and [Bmim][NTf$_2$] in the presence of different and increasing concentrations of hydrogen in nitrogen (v/v) with 5 minute on and off cycles, and (C) the amperometric response of one working electrode of a sensor with smaller spacing planar electrodes (S$_{SD}$) and [Bmim][NTf$_2$] in the presence of different and increasing concentrations of hydrogen in nitrogen (v/v) with 5 minute on and off cycles;

FIGS. 33A and 33B are graphs depicting the (A) amperometric response of one working electrode of the sensor S$_{LD}$ with [Bmim][NTf$_2$] in the presence of different and increasing concentrations of hydrogen in nitrogen (v/v) with three measurements taken at each concentration over a 5 minute detection period, and (B) amperometric response of one working electrode of the sensor $S_{SD}$ with [Bmpy][NTf$_2$] in the presence of different and increasing concentrations of hydrogen in nitrogen (v/v) with three measurements taken at each concentration over a 5 minute detection period;

FIGS. 34A and 34B are graphs depicting the (A) amperometric response of two workings electrodes (at two different applied potentials) of the sensor $S_{LD}$ with [Bmim][NTf$_2$] in the presence of a fixed concentrations of hydrogen in nitrogen (v/v) with 2 minute on cycles and 5 minute off cycles, and (B) amperometric response of two workings electrodes (at two different applied potentials) of the sensor $S_{SD}$ with [Bmim][NTf$_2$] in the presence of a fixed concentrations of hydrogen in nitrogen (v/v) with 2 minute on cycles and 5 minute off cycles;

DETAILED DESCRIPTION

Figure 1C:
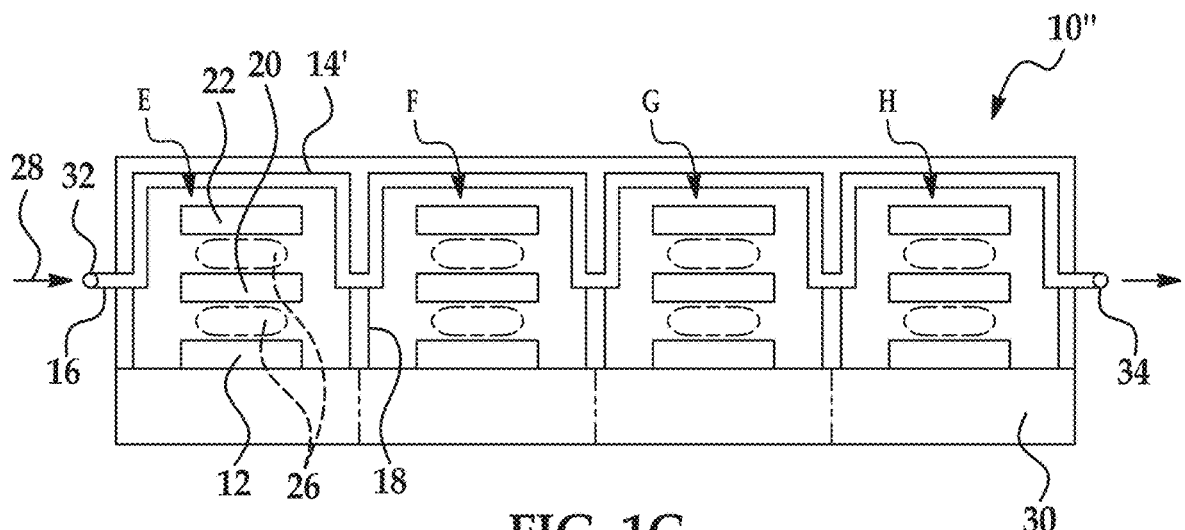
FIG. 1C is a cross-sectional schematic illustration of still another example of an electrochemical sensing system that may be used to perform an example of the method disclosed herein.

In the examples disclosed herein, it has been found that gas molecules undergo unique redox reactions depending, in part, upon the combination of environmental conditions (e.g., aerobic versus anaerobic), the electrode material and/ or geometric configuration, and the ionic liquid used as the sensor electrolyte. The ionic liquid is highly conductive and also acts as a solvent of the gas molecules, which eliminates the need for an additional solvent in the sensing system.

The ionic liquids used in the examples disclosed herein are also highly chemically inert and solubilize different gas molecules at different rates. The inert characteristic advantageously minimizes or prevents potentially interfering species, such as water vapor in the surrounding atmosphere (i.e., changing humidity), from interfering with the reactions taking place at the interface between the electrode and the ionic liquid. Moreover, the differing solubility of certain gas molecules in different ionic liquids has been found to affect the detection sensitivity of these gas molecules. As such, in the examples disclosed herein, the ionic liquid may be selected to tune the sensing behavior of the sensor for a particular gas molecule. Moreover, the ionic liquid cations and anions exhibit negligible vapor pressure, which at least substantially reduces evaporation, which can be a problem with water and organic solvent based sensors.

It has also been found that distinctive redox reactions (some of which are electrochemically coupled reactions, i.e., an electrode reaction followed by a catalytic reaction) take place in the ionic liquid at or near the electrode/electrolyte interface. These reactions are different for the different gas molecules and are also different depending upon the environmental conditions (i.e., anaerobic versus aerobic).

In non-aqueous ionic liquids at any conditions, the redox reactions of at least some of the gas molecules are quasi-reversible. Cations formed by the oxidation of the gas molecule or anions formed by the reduction of the gas molecule can be readily moved away from the electrode surface, respectively, by combining with the electrolyte anions or the electrolyte cations, or the generated cations or anions may undergo the reverse process (i.e., reduction or oxidation) at the counter electrode, which regenerates the gas molecule. In these examples, there is little or no product accumulation at the electrode/electrolyte interface, and thus continuous sensing may be performed.

In aerobic conditions, the coupling of oxygen in the oxidation process of the gas molecule may form reaction product(s) that can affect the sensing of the gas molecule. For example, the oxygen species can react with a reaction product of the oxidation of the gas molecule, which can compete with the direct oxidation of the gas molecule. In this example, however, it has been found that the reaction rates involving the oxygen species and the reaction product are highly dependent upon the concentration of the gas molecule, and thus continuous sensing of the gas molecule can occur, even in the presence of oxygen. In another example involving aerobic conditions, the oxygen species may be used to react with a radical (e.g., the hydrogen radical) generated by the gas molecule oxidation. In this other example, the sensitivity of gas molecule sensing may be dependent on the rate of this chemical reaction, which occurs continuously in the sensing system when the gas molecule is present.

Referring now to FIGS. 1A through 1D, different examples of the selective, real-time gas sensing system 10, 10', 10'', 10''' are depicted. Each of the sensing systems 10, 10', 10'', 10''' includes an array of sensors, and each of the sensors is individually electrically addressable so that the sensing at a particular sensor is controllable. The elements of any single sensor, including the electrode material and/or geometry and the ionic liquid electrolyte and the driving force for the redox reaction(s), may be selected in order to sense a particular gas molecule at the single sensor. In one example of the array, each of the sensors may be the same (i.e., include the same elements). In this example, all of the sensors selectively sense the same gas molecule, and thus the sensing system may be used to monitor for and to detect one gas that may be present in a gas stream that is introduced into the sensing system. In this example, the reading(s) from one sensor may be used to validate or calibrate the reading(s) from the other sensor(s).

In another example of the array, each of the sensors may be different (i.e., include at least one different element). In this example, each sensor selectively senses a different gas molecule, and thus the sensing system may be used to monitor for and to detect multiple gases that may be present in a gas stream that is introduced into the sensing system. In still another example of the array, sets of sensors may be designed to sense different gas molecules. In this example, each of the sensors within a particular set may be designed to sense the same gas molecule. As such, the sensors within a set may be used to validate or calibrate the readings within the set, and the different sets within the system may be used to monitor for and to detect multiple gases that may be present in a gas stream that is introduced into the sensing system.

Each of the selective, real-time gas sensing systems 10, 10', 10'', 10''' includes a plurality of individual sensors (e.g., A, B in FIG. 1A, C, D, in FIG. 1B, etc.), each of the individual sensors including an individual working electrode 12 or 12' or 12, 12'', or 12', 12'''; and an ionic liquid electrolyte 14 or 14' in contact with the individual working electrode 12 or 12', or 12, 12'', or 12', 12'''; a mechanism for implementing a driving force to a selected one of the plurality of individual sensors, wherein the driving force is to initiate a series of reactions involving a specific gas molecule when present in a gas sample exposed to the selected one of the plurality of individual sensors; and addressing circuitry operatively connected to the individual working electrodes 12, or 12' or 12, 12'', or 12', 12''', the addressing circuitry to detect a signal, generated in response to the series of reactions, at the individual working electrode 12, or 12' or 12, 12'', or 12', 12''' of the selected one of the plurality of individual sensors. Some examples of the sensing system 10, 10', 10'', 10''' further include a channel 16 to deliver the gas sample, potentially including the specific gas molecule(s), to each of the individual sensors. In other examples of the sensing system 10, 10', 10'', 10''', the systems may not include a gas channel 16, but rather, each sensor may be open to the external environment (e.g., air).

As mentioned above, the elements (e.g., electrode material and/or geometry, ionic liquid electrolyte, and driving force of the redox reaction(s) at the working electrode 12, 12' or 12, 12'', 12', 12''') of any single sensor in the array may be selected in order to sense a particular gas molecule at the single sensor. The elements may be selected based on the gas and the redox chemistry of the gas. Several examples of the various combinations of elements are described herein, but generally, the electrode materials may be metal or non-metal, the ionic liquids may be aprotic or protic, and the redox reaction driving force may be potential, light, temperature, or combinations thereof.

Specific examples of metal electrodes include platinum, palladium, and gold, and a specific example of a non-metal electrode includes carbon. Nanomaterials, such as metal nanocrystals and carbon nanotubes, can also be used. These materials may be particularly desirable in miniaturized sensors. Nanomaterials provide high surface areas (for enhancing sensing signals), and also possess the catalytic activity to enable highly sensitive sensing reactions. In addition, nanomaterials are compatible with microprinting and batch fabrication techniques for sensor miniaturization. Depending upon the type of gas molecule to be sensed, a balance of reactivity and surface area needs to be considered for selecting electrode materials. In an example, nanocrystals with controlled surface structures may be able to maximize the sensitivity and selectivity of electrochemical interface reactions through the choice of crystal facets.

The ionic liquid may have a cation selected from the group consisting of pyrrolidinium

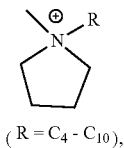

($R = C_4 - C_{10}$), imidazolium

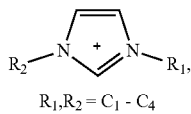

$R_1, R_2 = C_1 - C_4$ quaternary ammonium

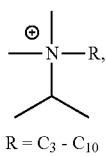

$R = C_3 - C_{10}$ and phosphonium

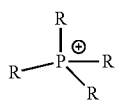

and may have an anion selected from the group consisting of trifluoromethylsulfonyl)imide

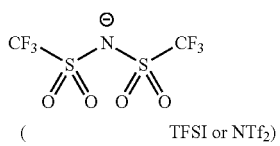

( TFSI or NTf$_2$)

and trifluoromethanesulfonate

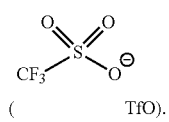

( TfO).

Hydrophilic anions, such as, $BF_4^-$ or $HSO_4^-$, $CH_3SO_3^-$, camphorsulfonate, etc. may also be used. Some examples of the ionic liquid include alkyl substituted methylpyrrolidinium bis(trifluoromethylsulfonyl)imide ionic liquid electrolytes, or [C$_n$mpy][NTf$_2$] (where n=2-10). Other examples include alkyl substituted methylimidazolium bis(trifluoromethylsulfonyl)imide ionic liquid electrolytes, or [C$_n$mim][NTf$_2$] (where n=2-10). Some specific examples of the ionic liquid electrolyte include aprotic ionic liquids, such as 1-ethyl-1-methylpyrrolidinium bis(trifluoromethylsulfonyl)imide, 1-propyl-1-methylpyrrolidinium bis(trifluoromethylsulfonyl)imide, 1-butyl-1-methylpyrrolidinium bis(trifluoromethylsulfonyl)imide, 1-pentyl-1-methylpyrrolidinium bis(trifluoromethylsulfonyl)imide, 1-hexyl-1-methylpyrrolidinium bis(trifluoromethylsulfonyl)imide, 1-heptyl-1-methylpyrrolidinium bis(trifluoromethylsulfonyl)imide, 1-octyl-1-methylpyrrolidinium bis(trifluoromethylsulfonyl)imide, 1-nonyl-1-methylpyrrolidinium bis(trifluoromethylsulfonyl)imide, 1-decyl-1-methylpyrrolidinium bis(trifluoromethylsulfonyl)imide, and 1-butyl-3-methylimidazolium bis(trifluoromethylsulfonyl)imide, or protic (and hydrophobic) ionic liquids, such as diethylmethylammonium trifluoromethanesulfonate or 1-butyl-3-methylimidazolium trifluoromethanesulfonate, or any combination of these ionic liquids.

The driving force of the redox reaction(s) may be potential (e.g., DC potential or AC potential), light, and/or temperature.

The potential used depends, at least in part, upon the gas molecule that is being monitored for and that is to be sensed (when present in a gas stream). For a reduction reaction of the specific gas molecule at the working electrode 12, 12', the driving force may be a cathodic potential. The cathodic potential may be the reduction peak potential for the specific gas molecule in the specific ionic liquid (e.g., obtained in a cyclic voltammetry experiment), or a more negative potential than the reduction peak potential for the specific gas molecule. In these examples, the limit of the more negative potential may be the potential where the ionic liquid anion can be reduced. In other words, a negative potential that initiates ionic liquid anion reduction may not be selected. For an oxidation reaction of the specific gas molecule at the working electrode 14, 14', the driving force may be an anodic potential. The anodic potential may be the oxidation peak potential for the specific gas molecule in the specific ionic liquid (e.g., obtained in a cyclic voltammetry experiment), or a more positive potential than the oxidation peak potential for the specific gas molecule. In these examples, the limit of the more positive potential may be the potential where the ionic liquid cation can be oxidized. In other words, a positive potential that initiates ionic liquid cation oxidation may not be selected. These anodic or cathodic potentials ensure that the detected current is directly related to the gas analyte redox reactions. For quantitative analysis, it is desirable that the current, due to the gas analyte redox reaction, can be determined by the mass transport of the gas molecule to the working electrode surface, rather than based on the kinetics of the oxidation or reduction reaction taking place at the working electrode surface. This allows for simple quantification because this current is proportional to the gas concentration.

In any of the examples disclosed herein, the potential may also be selected to drive the gas molecule (analyte) reaction alone, so that there are no other side reactions. This simplifies the quantitative analysis of the desired gas molecule. The potential may also be biased to minimize polarization to avoid other interfering reactions. In both aerobic and anaerobic conditions, it has been found that controlling the potential of the sensing (working) electrode is an effective way to control the kinetics of the redox reactions and thus the sensitivity of the sensor to a particular gas molecule. As such, in some examples disclosed herein, the potential is used to alter the performance of the sensor for analyzing a mixture of gases.

The term "potential" is to be broadly construed, and may encompass a constant potential applied according to a time program, or it may be several potentials applied according to several time programs.

Light and/or temperature may also be used as the driving force to initiate the redox reaction(s) of a specific gas molecule. The light and/or temperature may initiate a specific change in the sensing system. For example, light may be used to drive a change in the ionic liquid that affects the reaction(s) that are being measured by the electrodes. For another example, a temperature increase may increase the mass transport of the specific gas molecules to the interface between the working electrode 12, 12' and the ionic liquid electrolyte 14 where the redox reaction(s) take place. An increase in the temperature can reduce the viscosity of the ionic liquid, which, in turn, can increase the conductivity of the ionic liquid electrolyte. The current signals measured at varying temperature may provide additional selectivity for the determination of the gas molecule. Furthermore, temperature can be used to regenerate the ionic liquid sensing system since volatile compound(s) in the ionic liquid may be removed by heating. This allows regeneration of the baseline by removing the gas or volatile compounds in the ionic liquids after their detection much more quickly.

Any gas molecule may be monitored for, and if present, sensed by the sensing systems 10, 10', 10", 10''' disclosed herein. Examples of the gas molecules are selected from the group consisting of hydrogen gas ($H_2$), oxygen gas ($O_2$), ozone gas ($O_3$), carbon monoxide (CO), sulfur dioxide ($SO_2$), hydrogen sulfide ($H_2S$), methanol ($CH_3OH$), methane ($CH_4$), nitrogen dioxide ($NO_2$), aldehydes, acetaldehyde ($C_2H_4O$), aldehyde ($CH_2O$), nitrobenzene ($C_6H_5NO_2$), methylene chloride ($CH_2Cl_2$), trichloroethylene ($C_2HCl_3$), etc. While the listed gas molecules are some examples of the gas molecules that can be monitored for, it is to be understood that any volatile or gaseous molecule can be monitored for, sensed, identified, and quantified using the sensing systems 10, 10', 10", 10''' and methods described herein.

Some examples of the combinations of sensor elements that may be used to monitor and sense particular gas molecules are shown in Table 1. While Table 1 illustrates several examples, it is contemplated that other combinations of elements may be used depending, in part, upon the gas molecule, and its unique redox reaction(s) within the sensing system and in the specific environment.

TABLE 1

| Gas to be sensed | Redox Mechanism | Working Electrode/Electrolyte | Driving Force* |
|---|---|---|---|
| $O_2$ | Reduction | Gold/1-butyl-1-methylpyrrolidinium bis(trifluoromethylsulfonyl)imide | Cathodic Potential (−1.2 volts) |
|  | Reduction | Platinum/1-butyl-1-methylpyrrolidinium bis(trifluoromethylsulfonyl)imide | Cathodic Potential (−1.2 volts) |
|  | Reduction | Carbon/1-butyl-1-methylpyrrolidinium bis(trifluoromethylsulfonyl)imide | Cathodic Potential (−1.2 volts) |
| $H_2$ | Oxidation | Platinum/1-butyl-1-methylpyrrolidinium bis(trifluoromethylsulfonyl)imide | Anodic Potential (+0.4 volts) |
|  | Oxidation | Platinum/diethylmethylammonium trifluoromethanesulfonate | Anodic Potential (+0.2 volts) |
| CO | Oxidation | Platinum/1-butyl-1-methylpyrrolidinium bis(trifluoromethylsulfonyl)imide | Anodic potential (+1.6 V) |
| CO | Oxidation | Platinum/diethylmethylammonium trifluoromethanesulfonate | Anodic Potential (+1.2 volts) |
| $SO_2$ | Reduction | Gold/1-butyl-1-methylpyrrolidinium bis(trifluoromethylsulfonyl)imide | Cathodic Potential (−1.5 volts) |
|  | Reduction | Platinum/1-butyl-1-methylpyrrolidinium bis(trifluoromethylsulfonyl)imide | Cathodic Potential (−1.5 volts) |
| $NO_2$ | Reduction | Platinum/1-butyl-3-methylimidazolium bis(trifluoromethylsulfonyl)imide | Cathodic Potential (−0.5 volts) |
| $CH_4$ | Oxidation | Platinum/1-butyl-1-methylpyrrolidinium bis(trifluoromethylsulfonyl)imide | Anodic Potential (+1.0 volts) |
| $H_2S$ | Oxidation | Platinum/1-butyl-3-methylimidazolium trifluoromethanesulfonate | Anodic Potential (+1.5 volts) |

*potential versus a quasi platinum reference electrode.

Referring now to FIG. 1A, the example sensing system 10 includes a cell 18 that contains individually addressable sensors A, B and the ionic liquid electrolyte 14. By individually addressable, it is meant that the electrodes 12, 20, 22 of one sensor A may be operated separately from the electrodes 12', 20', 22' of the other sensor B. For example, a unique analytical method (e.g., a different potential or a different potential program) may be applied to the electrodes 12, 20, 22 or 12', 20', 22' of each sensor A, B.

As shown in FIG. 1A, the configuration of the cell 18 may be such that each of the sensors A, B is present in the same ionic liquid electrolyte 14. In this example, the sensors A, B may be individually addressed to sense the same gas molecule or different gas molecules. This example cell 18 may include any number of sensors A, B. While not shown, the configuration of the cell 18 may be divided into separate sub-cells, such that each of the sensors A, B is present in a different sub-cell. In this example, ionic liquid electrolytes 14 in the sub-cells do not mix, and may be same or different.

Each sensor A, B includes its own electrodes (i.e., a working electrode 12 or 12', a reference or a quasi-reference or a true reference electrode 20, 20', and a counter electrode 22, 22'), and in this example system 10, one ionic liquid 14 is in contact with each of the electrodes 12, 12', 20, 20', 22, 22'.

As mentioned above, the material and geometry of the electrodes 12, 12', 20, 20', 22, 22' depends, in part, upon the gas molecule that is to be sensed and the specific/unique redox reaction(s) that the gas molecule undergoes within the sensing system 10. In the example shown in FIG. 1A, the working electrode 12, 12' geometry resembles a mesh gauze. This type of working electrode 12, 12' allows for efficient current collection with excellent gas diffusivity. This type of working electrode 12, 12' may be particularly suitable for use with a system 10 that delivers the gas directly to the working electrode 12, 12' through a gas permeable membrane 24 as opposed to through the ionic liquid electrolyte 14. In the example shown in FIG. 1A, the working electrodes 12, 12' may alternatively be on a solid substrate and may have a macroelectrode size. The macroelectrode may have a diameter that is equal to or greater than 1 mm. As still other examples, the working electrodes 12, 12' may be a sputtered electrode. The sputtered electrode may be desirable to increase the specific surface area for the redox reaction(s) to take place. Still other examples of the working electrode 12, 12' include nanomaterial based electrodes, such as metal nanocrystal electrode materials that can increase the surface area and electrode activity. These may be particularly suitable for miniaturized and/or wearable sensing systems.

Examples of suitable reference and counter electrodes 20, 20', 22, 22' include polycrystalline platinum wires or meshes. Another example of the reference electrode 20, 20' is a quasi-platinum reference electrode. Still another example is a conductive polymer based true reference electrode, such as polyaniline, polypyrrole or a π-conjugated polymer and redox pendant group (e.g., polyaniline with a fused quinone moiety).

As shown in FIG. 1A, the electrodes 12, 20, 22 and 12', 20', 22' may be separated by respective porous cellulose spacers 26, 26'.

Alternatively, the electrodes 12, 20, 22 and 12', 20', 22' may be supported by a solid substrate. In this example, each of the electrodes 12, 20, 22 and 12', 20', 22' can have a planar geometry with proper spacing between them (e.g., to prevent shorting). An example of electrodes with planar geometry and proper spacing includes interdigitated planar electrodes (as shown in FIG. 1B).

In the example shown in FIG. 1A, the working electrodes 12, 12' are pressed onto a porous gas permeable membrane 24 which physically separates the interior of the cell 18 from a gas feed 28 that flows through the channel 16. As depicted, the porous gas permeable membrane 24 has two opposed surfaces, and one of the two opposed surfaces is positioned adjacent to at least a portion of the channel 16. In the example shown in FIG. 1A, the other of the two opposed surfaces of the porous gas permeable membrane 24 supports both of the working electrodes 12, 12'. In other examples, each sensor A, B may have its own porous gas-permeable membrane 24 that supports the respective working electrodes 12, 12'.

The gas permeable membrane 24 may be selected to be permeable to one specific gas molecule that is to be detected, or to two or more gas molecules that are to be detected. In an example, the porous gas permeable membrane 24 is polytetrafluoroethylene (an example of which is TEFLON® from Dupont).

One or more gases are fed as part of the gas feed 28 through the channel 16. The gas(es) permeate through the porous gas permeable membrane 24 into the cell 18, where a specific gas molecule participates in unique redox reactions when the driving force is implemented in/at a particular sensor A, B.

In another example, the sensors A, B in the sensing system 10 are sandwiched in a Clark cell type of geometry. In this example, the gas permeable membrane 24 may be suspended between two chambers and may have the sensors A, B built thereon so that they face one of the chambers. Each chamber may have inlets and outlets for introducing and removing gases. The chamber adjacent to the gas permeable membrane 24 may allow for the flow of the sample gas (i.e., the gas to be sensed), and the chamber adjacent to the ionic liquid of the sensors A, B may be used to remove any gas products generated by the sensors A, B from the sensing system 10.

Still other examples of the sensors A, B may not include the channel 16 for gas sampling. Rather, in some examples, the sensors A, B may be open to the external environment. When open, the sensors A, B may include a small fan that moves the air in the environment to the sensing interface of each sensor A, B. It is to be understood that alternative gas sampling mechanisms may be employed in any of the examples disclosed herein.

Referring now to FIG. 1B, another example of the sensing system 10' is schematically depicted. In this example, the individually addressable sensors C, D are each contained within their own cell 18, 18'. As such, in this example system 10', different ionic liquids 14, 14' may be used in each cell 18, 18', each of which may be selected depending upon the gas molecule to be sensed by the respective sensors C, D. When the sensors C, D are to detect the same gas molecule, the ionic liquid 14, 14' may be the same in both cells 18, 18'. When the sensors C, D are to detect different gas molecules, the ionic liquid 14, 14' may be the same in both cells 18, 18' or may be different in each of the cells 18, 18'. As shown, the ionic liquid 14 is in contact with each of the electrodes 12, 12', 20, and 22, while the ionic liquid 14' is in contact with each of the electrodes 12', 12", 20', and 22'.

In the example shown in FIG. 1B, each sensor C, D includes two working electrodes 12, 12" or 12', 12'". These electrodes 12, 12" or 12', 12'" may be any of the electrode materials disclosed herein, and are present in an interdigitated electrode configuration IDE (a top, enlarged schematic view of which is shown in FIG. 2). Two working electrodes 12, 12" or 12', 12'" in a single sensor C, D may be desirable for multiple reasons. In one example, the two electrodes 12, 12" or 12', 12'" may be used to detect two different types of gas molecules (i.e., one at each working electrode 12, 12" or 12', 12'") by the same sensor C or D. In another example, one of the two working electrodes 12 or 12' may be used to oxidize or reduce one type of gas (for detection/sensing), and the other of the working electrodes 12" or 12'" may be used to remove the product of the gas oxidation or reduction reaction and to regenerate the gas for continuous sensing. As a more specific example, one working electrode 12 or 12' may oxidize hydrogen gas (which generates an $H^+$ proton), and the other working electrode 12" or 12''' may reduce the generated $H^+$ proton to regenerate hydrogen gas.

In the interdigitated electrode configuration IDE, the counter electrode 22, 22' is positioned in a U-shaped configuration that partially surrounds the working electrode portion. The reference or quasi-reference electrode 20 or 20' is positioned at one end of the interdigitated working electrodes 12", 12'" or 12', 12''' and may be positioned between the leads of the working electrodes 12, 12" or 12', 12'''. As shown in FIG. 1B, the reference or quasi-reference electrode 20 or 20' is also positioned near the open end of the U-shaped configuration of the counter electrode 22 of 22'.

The interdigitated electrode configuration IDE may include microfabricated planar electrodes that are printed, vapor deposited, or made using some other suitable microfabrication technique. As such, the interdigitated electrode IDE may be very thin and may as flexible as the substrate upon which it is fabricated. In the example shown in FIG. 1B, the respective IDE of each sensor C, D is fabricated directly on the porous gas permeable membrane 24, 24'.

The width and the gap between the working electrode 12 or 12' fingers and the working electrode 12" or 12''' fingers of the interdigitated electrode configuration IDE may be anywhere from about 150 nm to about 150 μm. Even smaller spacing may be used if redox recycling is used in the sensing system 10' to amplify the current signal. The thickness of the electrodes of the IDE may range from about 400 nm to about 600 nm. These dimensions are believed to ensure good continuity of the thin film IDE without blocking the pores of the underlying membranes 24, 24'.

In the example shown in FIG. 1B, one or more gases (in a gas feed 28) are fed through the channel 16, which sequentially introduces to the gas(es) to the sensor C and then the sensor D. The gas(es) permeate through the porous gas-permeable membranes 24, 24' into the cells 18, 18' where unique redox reactions take place at one or both working electrodes 12, 12" or 12', 12''' when the driving force is implemented in/at a particular sensor C, D.

While not shown, it is to be understood that the system 10' may include soldering or adhesive (glue) that will aid in assembling or otherwise packaging the interdigitated electrode configuration IDE in a robust sensor component so that the gas flow, gas concentration, etc. can be readily controlled. The solder material or adhesive should be chemically inert to the ambient environment and to the ionic liquid 14, 14'.

Also while not shown, it is to be understood that each sensor C, D of the system 10' may include a solid support (similar to support 30 in FIG. 1C) and not the gas permeable membranes 24, 24'. In this example, the respective IDE of each sensor C, D may be fabricated directly on the solid support, such as silicon. Also in this example, the channel 16 may be a gas permeable membrane positioned at or near the top of the cells 18, 18' that delivers the gas(es) directly into the ionic liquids 14, 14'.

Figure 3:
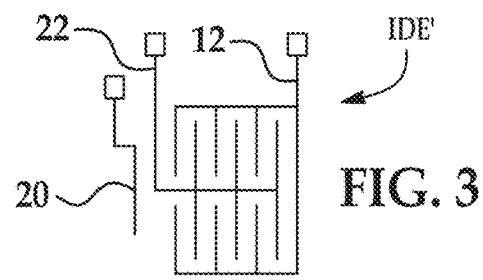
FIG. 3 is a top schematic view of another example of an interdigitated electrode configuration.

Referring briefly to FIG. 3, another example of the interdigitated electrode configuration IDE' is depicted. This example includes one working electrode 12 interdigitated with one counter electrode 22 and a reference or quasi-reference electrode 20 positioned near the end where the counter electrode 22 lead is positioned.

While two examples of interdigitated electrode configurations IDE, IDE' are shown, it is to be understood that the planar electrodes may have other configurations (e.g., geometries and/or spacing between the electrodes and/or location of the electrodes in the planar design and/or number of electrodes in the planar design). As examples of other geometries, the planar electrodes may be disk shapes or band shapes.

Still another example of the sensing system 10" is depicted in FIG. 1C. This example of the sensing system 10" includes four sensors E, F, G, H. Within each sensor E, F, G, H, the electrodes 12, 20, 22 and spacers 26 are stacked in a similar manner as previously described in FIG. 1A.

Unlike the system 10 in FIG. 1A, however, the stacks of electrodes 12, 20, 22 and spacers 26 are not supported by the gas permeable membrane 24. Rather, in this example, each individual working electrode 12 is supported by a solid support 30. In one example, the solid support 30 may be a single substrate upon which the working electrodes 12 of each sensor E, F, G, H is formed or positioned. In another example, each sensor E, F, G, H may include its own, separate solid support (represented by the phantom lines in the solid support 30), upon which the respective working electrodes 12 are formed or positioned. In an example, the solid support 30 is a silicon wafer.

The gas sampling channel 16 in the sensing system 10" may be a tube or a gas permeable membrane, with one inlet 32 and one outlet 34, that extends through each of the sensors E, F, G, H. The tube may be gas permeable, so that the gas(es) that are to be sensed may permeate through the channel 16 into the respective ionic liquids 14 of the sensors E, F, G, H. When different gases are to be sensed by each sensor E, F, G, H, different sections of the tube may be formed of different materials that are permeable to the different gases. For example, the section of the tube in sensor E may be permeable to oxygen gas, while the section of the tube in sensor F is permeable to sulfur dioxide gas, while the section of the tube in sensor G is permeable to hydrogen gas, while the section of the tube in sensor H is permeable to methane gas.

Figure 1D:
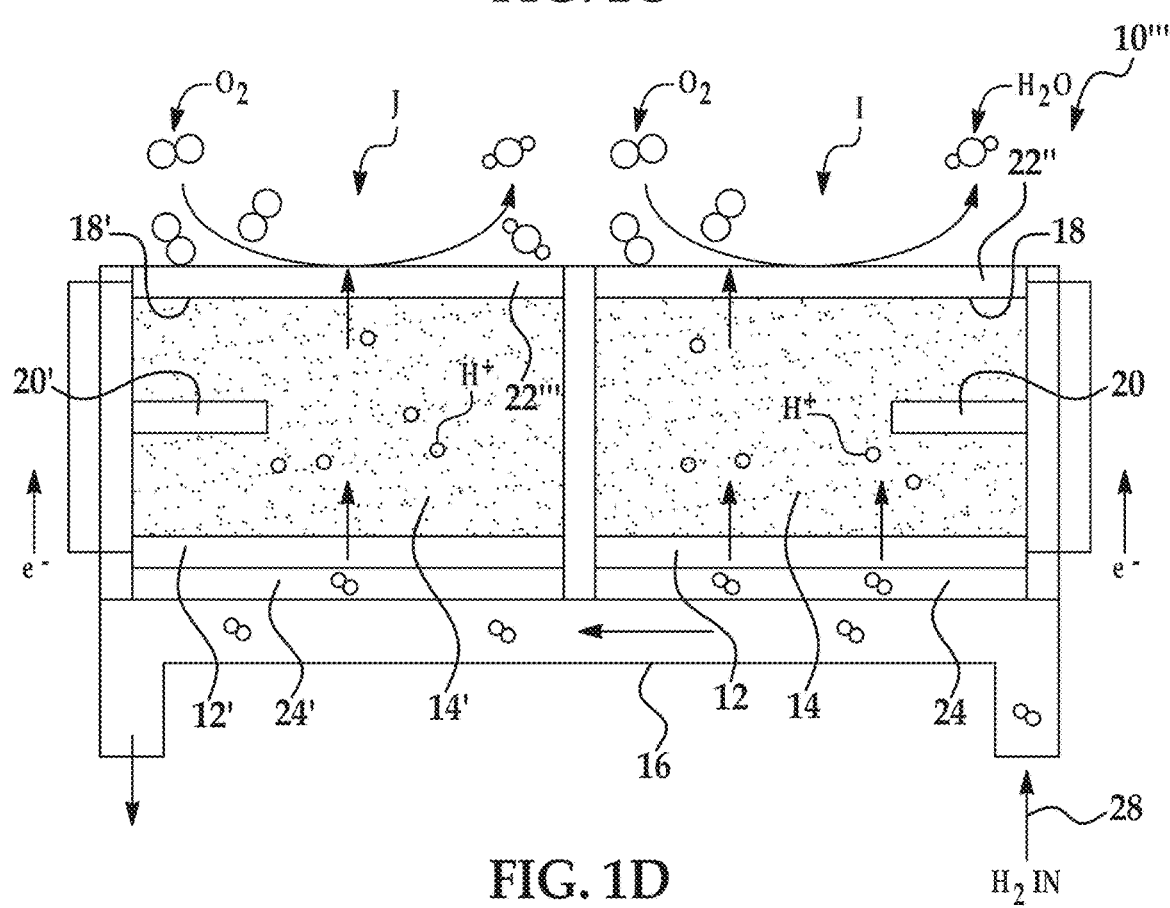
FIG. 1D is a cross-sectional schematic illustration of yet another example of an electrochemical sensing system that may be used to perform an example of the method disclosed herein.

Still another example of the sensing system 10''' is depicted in FIG. 1D. This example of the sensing system 10''' is shown with two sensors I, J, although any number of the sensors may be included and arranged in any desirable array configuration (e.g., linear, 2×2, etc.).

This example of the sensing system 10''' is specific for sensing in aerobic conditions, because the counter electrodes 22" and 22''' are open to the outside environment (i.e., ambient air) and the oxygen in the outside environment participates in reactions respectively taking place at the counter electrodes 22", 22'''. In this example, the mesh gauze may be a particularly suitable geometry for the counter electrodes 22", 22'''.

Each sensor I, J includes its own electrodes (i.e., a working electrode 12 or 12', a reference or quasi-reference electrode 20, 20', and the counter electrode 22", 22'''), and in this example system 10''', its own ionic liquid 14, 14'.

In the example shown in FIG. 1D, the working electrodes 12, 12' are pressed onto respective porous gas permeable membranes 24, 24' which physically separate the interior of the cells 18, 18' from the gas feed 28 that flows through the channel 16.

One or more gases are fed as part of the gas feed 28 through the gas sampling channel 16. The gas(es) permeate through the porous gas permeable membranes 24, 24' into the respective cells 18, 18', where a specific gas molecule participates in unique redox reactions when the driving force is implemented in/at a particular sensor I, J.

An example of the method disclosed herein is schematically depicted in FIG. 1D. The example shown in FIG. 1D takes place in aerobic conditions and involves sensing for hydrogen gas $H_2$. This example of the method will be described in more detail below in reference to Example 3.

Generally, an example of the method disclosed herein includes supplying the gas (e.g., feed 28), which potentially includes a specific gas molecule to be sensed, to an interface between the working electrode 12, 12' and the ionic liquid electrolyte 14, 14'; based on an aerobic or anaerobic sensing condition and the specific gas molecule to be sensed, implementing a driving force to initiate a series of reactions involving the specific gas molecule; and in response to the implementation of the driving force, monitoring for a signal indicative of the specific gas molecule.

In some examples of the method, two or more different gas molecules may be sensed.

In some of these examples, the sensing system 10, 10', 10", 10''' includes two or more sensors A, B or C, D or E, F, G, H, or I, J, where at least one sensor is operated to monitor for, and, if present, sense one of the gas molecules and at least one other sensor is operated to monitor for, and, if present, sense another of the gas molecules. Generally, this example of the method includes supplying the gas (e.g., feed 28), which potentially includes at least two different gas molecules, to an interface between an array of individual working electrodes 12, 12' and an ionic liquid electrolyte 14, 14'; implementing a first driving force at a first of the individual working electrodes 12 to initiate a series of reactions involving a first of the at least two different gas molecules; implementing a second driving force at a second of the individual working electrodes 12' to initiate a series of reactions involving a second of the at least two different gas molecules; in response to the implementation of the first driving force, monitoring for a signal indicative of the first of the at least two different gas molecules; and in response to the implementation of the second driving force, monitoring for a signal indicative of the second of the at least two different gas molecules.

In others of these examples, different potentials are applied to the working electrode 12 or 12' at different times to respectively drive the redox activity of at least two different gas molecules at the different time. Generally, this example of the method includes supplying the gas (e.g., feed 28), which potentially includes at least two different gas molecules, to an interface between an array of individual working electrodes 12, 12' and an ionic liquid electrolyte 14, 14'; implementing a first potential at the working electrode 12 to initiate a series of reactions involving a first of the at least two different gas molecules; in response to the implementation of the first potential, monitoring for a signal indicative of the first of the at least two different gas molecules; implementing a second potential at the working electrode 12 to initiate a series of reactions involving a second of the at least two different gas molecules; and in response to the implementation of the second potential, monitoring for a signal indicative of the second of the at least two different gas molecules. In these examples, the potentials used differ, so that at one of the potentials, the current sensitivity of the first gas molecule is much larger than that of the second gas molecule, and at the other of the potentials, the current sensitivity of the second gas molecule is much larger than that of the first gas molecule. In other words, the potentials selected should differ so that the sensitivities at the respective potentials also differ. In an example, the potentials are separated by about 0.2 V or more. As is discussed in detail below, the current that is measured at a particular potential and the current sensitivities of the gas molecule(s) at the particular potential may be used to quantitatively determine the concentration of the gas molecules in a gas mixture.

In any of the examples disclosed herein, the gas may be supplied through the gas sampling channel 16. While the gas may be supplied to each sensor A, B or C, D or E, F, G, H, or I, J in the sensing system 10, 10', 10", 10''', only those sensors A, B or C, D or E, F, G, H, or I, J that are exposed to the driving force will monitor for and detect the specific gas molecule. As such, if sensors A and B are respectively designed for sensing oxygen gas and hydrogen gas, then the different driving force may be implemented at sensor A vs. B. The combined information from sensors A and B allow determination and quantification of oxygen and hydrogen gases.

When light is the driving force, the systems 10, 10', 10", 10''' may include a light source for each sensor in the array or a single light source that illuminates all of the sensors in the array simultaneously. When temperature is the driving force, the systems 10, 10', 10", 10''' may include a heating/cooling source for each sensor in the array or a single heating/cooling source that heats or cools all of the sensors in the array simultaneously. When electric potential is the driving force, any individual working electrode 12, 12', 12", 12''' may be selectively addressed, i.e., a potential that drives a redox reaction or a series of redox reactions involving the specific gas molecule may be selectively applied to the working electrode 12, 12', 12", 12''' of the sensor that is being used for sensing. When potential is the driving force, the method may further include selecting the potential (the potential can be a constant or varying DC potential or an AC potential at certain frequency) based on the specific gas that is to be sensed. The driving force can be single one (e.g., only potential is used) or a combination of forces (e.g., combined potential and temperature, etc.)

In some examples, the gas to be sensed by a particular sensor A, B or C, D or E, F, G, H, or I, J undergoes an oxidation reaction in response to the implementation of the driving force. Examples of this gas/gas molecule include $H_2$, CO, $CH_4$, and $H_2S$. Implementing the driving force in this example of the method includes applying a predetermined electrode potential to the working electrode 12, 12', where the predetermined electrode potential is the oxidation peak potential for the specific gas molecule, or a more positive potential than the oxidation peak potential for the specific gas molecule, where the more positive potential does not oxidize a cation of the ionic liquid electrolyte 14, 14'. In one specific example, the specific gas molecule is hydrogen gas, and the predetermined electrode potential is +0.3V versus a quasi-platinum reference electrode, or ranges from +0.3V to a more positive potential that does not oxidize the ionic liquid electrolyte cation. In an example, the specific gas molecule is hydrogen gas, and the predetermined electrode potential is +0.4V versus a quasi-platinum reference electrode.

In these examples, the counter electrode 22 or 22", 22''' or the second working electrode 12" or 12''' may be used to facilitate continuous sensing. A more negative potential (than the predetermined electrode potential used as the driving force at the working electrode 12, 12') may be applied to the counter electrode 22 or 22", 22''' or the second working electrode 12" or 12''' in order to reduce a product of the oxidation reaction involving the specific gas molecule, and to regenerate the specific gas molecule.

In other examples, the gas to be sensed by a particular sensor A, B or C, D or E, F, G, H, or I, J undergoes a reduction reaction in response to the implementation of the driving force. Examples of this gas/gas molecule include $O_2$, $NO_2$, and $SO_2$. Implementing the driving force in this example of the method includes applying a predetermined electrode potential to the working electrode 12, 12', where the predetermined electrode potential is the reduction peak potential for the specific gas molecule, or a more negative potential than the reduction peak potential for the specific gas molecule, where the more reduction potential does not reduce an anion of the ionic liquid electrolyte 14, 14'. In one specific example, the specific gas molecule is oxygen gas, and the predetermined electrode potential is −0.9V versus a quasi-platinum reference electrode, or ranges from −0.9V to a more negative potential that does not reduce the ionic liquid electrolyte anion. In an example, the specific gas molecule is oxygen gas, and the predetermined electrode potential is −1.2V versus a quasi-platinum reference electrode.

In these examples, the counter electrode 22 or 22", 22''' or the second working electrode 12" or 12''' may be used to facilitate continuous sensing. A more positive potential (than the predetermined electrode potential used as the driving force at the working electrode 12, 12') may be applied to the counter electrode 22 or 22", 22''' or the second working electrode 12" or 12''' in order to oxidize a product of the reduction reaction involving the specific gas molecule, and to regenerate the specific gas molecule.

Different gas molecules undergo different redox reactions at the working electrode 12, 12'. Upon initiation of the driving force, adsorption of the gas molecule may occur at or near the surface of the working electrode 12, 12'. The adsorbed gas molecule then undergoes oxidation or reduction, which generates a detectable signal at the working electrode 12, 12'. The detectable signal may be a current signal, such as the current of the reaction or the current density of the reaction, both of which are related to the concentration of the specific gas molecule. As such, the specific gas molecule concentration may be determined using the anodic or cathodic current or the anodic or cathodic current density measured at the working electrode 12, 12'. The anodic current is the current observed/measured when gas molecule oxidation takes place, and cathodic current is the current observed/measured when gas molecule reduction takes place. The anodic current density is the current observed/measured when gas molecule oxidation takes place normalized by the area of the working electrode 12, 12' that is used, and the cathodic current density is the current observed/measured when gas molecule reduction takes place normalized by the area of the working electrode 12, 12' that is used.

For a specific redox species, the electrode potential may affect the rate of the electron transfer reaction (e.g., hydrogen oxidation) at the IL/electrode interface. Based on the Bulter-Volmer equation, a more cathodic potential results in a higher reduction rate and a higher cathodic current. Likewise, a more anodic potential results in a higher oxidation rate and the higher anodic current. At different electrode potentials, the interface double layer structures at the IL/electrode interface can be different, which may affect the $H_2$ or $O_2$ (or other analyte) surface concentrations and/or the mass transport rate (remove of the product from the surface).

For real time sensing, the sensing systems 10, 10', 10", 10''' disclosed herein may be amperometric sensors, which measure the electrical current due to the redox reaction of the analyte at a specific fixed or variable potential. As is discussed in Example 1 below, the current of hydrogen oxidation is determined by one or more factors affecting the redox reactions (eqs. 1-3), which in turn affect the sensitivity, selectivity, detection speed, and stability (i.e., reproducibility) of the hydrogen sensor. For example, the fast removal of hydrogen oxidation product(s) (eq. 3) increases the reversibility of sensing and improves the reproducibility of the hydrogen sensor, since it minimizes the sensor signal drift due to the accumulation of oxidized products on the working electrode surface.

For at least some of the gas molecules, a linear relationship has been observed between the limiting currents of at least some of the gases and known concentrations of these gases, and thus any unknown gas concentration can be quantified using the current of the gas or the current density of the gas and linear regression fitting. The slope of the line from linear regression fitting represents the sensitivity of the current or current density toward the gas concentration. The linear equation can then be used to determine the gas concentration in an unknown sample. In particular, the linear fit of the current/current density signal versus the analyte concentration may be used to determine the unknown analyte concentration because the signal can be measured.

As an example, the hydrogen redox reaction kinetic is very fast, and the current may be governed by the rate at which the hydrogen transports to the electrode surface (eq. 1, Example 1) which involves the mass transport and adsorption of hydrogen onto the surface of the working electrode (e.g., platinum) and the removal of the products from the working electrode (e.g., desorption of the $Pt-H_{(ad)}$, eqs. 2-3, Example 1). The mass transport of hydrogen to the working electrode surface depends on the concentration of hydrogen and the diffusion coefficient of the hydrogen in the ionic liquid electrolyte. Thus, the ionic liquid properties, such as viscosity, solubility of hydrogen, and solvation and miscibility with hydrogen, impact the hydrogen mass transport in the ionic liquid, and its adsorption, as well as the removal of the oxidized product protons. The concentration of the hydrogen at electrode/electrolyte interface is also determined by the rate at which the analyte transports through the gas permeable membrane to the electrode/IL interface and the rate of the supply of the analyte. Since hydrogen redox reaction at the electrode surface is very facile, the measured current response of the sensor A, B or C, D or E, F, G, H, or I, J should be proportional to the concentration of hydrogen analyte at electrode/electrolyte interface which is determined by the amount of hydrogen adsorbed at electrode surface, as indicated by Faraday's law: I=nFRC (where C=the concentration of analyte in mol/m$^3$, R=the rate of gas consumption in m$^3$/s, F=Faraday's constant (9.648×104 coulombs/mol), and n=the number of electrons per molecule participating in the reaction).

It has also been found that the current signal at the certain time of measurement, or the slope measured by the ratio of the change in current to the change in time ($\Delta I/\Delta t$), or the ratio of the change in current to the square root of the change in time ($\Delta I/(\Delta t)^{1/2}$) may be used to predict the concentration of the gas molecule using linear regression. Moreover, modeling the sensor signal drift using the slope measured by the ratio of the change in current to the change in time ($\Delta I/\Delta t$) can be faster than those using the limiting current, and this can increase the gas concentration prediction performance (see the discussion in Example 1).

A multi-component gas mixture can also be analyzed by measuring the total current at two different potentials, each of which respectively drives the redox activity of one of the gas molecules in the mixture. In chronoamperometry, at a given applied potential, the current is the sum of the faradic current and the non-faradic current. The non-faradic capacitive charging current will be generated when a potential is stepped to a predetermined value, due to the presence of electric double layer at electrode/electrolyte interface. The total capacitive charging current ($i_c(t)$) (at a particular time, t) reflects the change in potential polarization, and this correlation is represented by:

$$i_c(t) = \left(\frac{E}{R_s}\right)^{-t/R_s C_d} \quad (A)$$

where E is the amplitude of the applied potential step, $R_s$ is the solution resistance, $C_d$ is the differential capacitance of the double layer, and t is the time in seconds. While in the presence of the redox analyte (e.g., one of the gas molecules), a faradic current will occur and superimpose on the capacitive charging current. The total faradic current at a particular time ($i_f(t)$) is due to the analyte electrolysis reaction that follows the Cottrell equation:

$$i_f(t) = \frac{nFAD^{1/2}C}{\pi^{1/2}t^{1/2}} \quad (B)$$

provided this current is controlled by the diffusion of the redox analyte. In the Cottrell equation, n is the stoichiometric number of electron, F is the Faraday constant, A is the electroactive area, D is the diffusion coefficient, C is the concentration of the electroactive analyte, and t is the time (in seconds). Theoretically, the total current at a particular time (i(t)) may be considered as the sum of two current components (i.e., faradic current ($i_f$) and the capacitive charging current ($i_c$)):

$$i(t) = i_f + i_c \quad (C)$$

Through time, the capacitive charging current ($i_c$) decays (exponentially) much faster than the faradic current ($i_f$) decay. Consequently, when current is sampled at a time exceeding five times of the time constant (i, $T=R_s C_d$), the faradic current can be quantitatively related to the gas analyte concentration since the capacitive charging current is then negligible. In these instances, if there are multiple redox processes occurring at the applied potential, then the current will be the sum of these multiple faradic processes:

$$i(t) = i_{f1} + i_{f2} + \ldots \quad (D)$$

However, for gas analysis, the faradic process also depends on the available surface sites on the working electrode 12, and different faradic processes often have different sensitivities. As such, the faradic process for one gas molecule may be represented by $I_{f1}=K_1 C_1$ and the faradic process for a different gas molecule may be represented by $I_{f2}=K_2 C_2$, etc. In these equations, $K_1$ and $K_2$ are the sensitivity factors of the respective gas molecules and $C_1$ and $C_2$ are the concentration of the respective gas molecules. The sensitivity factor for a particular gas molecule may be determined using a calibration curve of currents measured at a particular applied potential versus known concentrations of the particular gas molecule. The sensitivity factor is the slope of the line from this calibration curve.

For analyzing a two component mixture of gases using chronoamperometry, the total current can be measured at two different potentials. The potentials may be selected so that the redox activity of the two gas molecules at the potentials differs significantly. For example, at a first potential (E1), the current sensitivity of one gas molecule, M, is much larger than that of a second gas molecule, N; and at a second potential (E2), the current sensitivity of the one gas molecule, M, is much smaller than that of the second gas molecule, N. From the known current sensitivities, the following equations hold:

$$i_{E1} = K_{M1}C_M + K_{N1}C_N + i_{blank1} \quad (E)$$

$$i_{E2} = K_{M2}C_M K_{N2}C_N + i_{blank2} \quad (F)$$

wherein $K_{M1}$ and $K_{M2}$ are the current sensitivities of the individual gas molecule M at potential E1 and E2, respectively; $K_{N1}$ and $K_{N2}$ are the current sensitivities of the individual gas molecule N at potential E1 and E2, respectively; $i_{blank1}$ and $i_{blank2}$ are the residual or background current at potential E1 and E2, respectively. The background current comes from the induced double layer charging current and the residue current from any interference species (e.g., water). The background current may be determined from the y-intercept of the calibration curve (i.e., the calibration curve of currents measured at a particular applied potential versus known concentrations of the particular gas molecule). The background current can also be obtained by performing a blank experiment using the identical electrochemical sensor without the present of the analyte.

Because the M gas molecule should have no redox reaction at the E2 potential (i.e., $K_{M2}=0$) and the N gas molecule should have no redox reaction at the E1 potential (i.e., $K_{n2}=0$), the equations immediately above can be simplified to $$i_{E1} = K_{M1}C_M + 0 + i_{blank1} \quad (G)$$

$$i_{E2} = 0 + K_{N2}C_N + i_{blank2} \quad (H)$$

and thus the concentration of a particular gas molecule M, N in a gaseous mixture can readily be determined.

In still other examples, the quantitative determination of the gas analyte concentration can be achieved with charge instead of current. Charge is the integral of current over time. In some instances, charge may be more favorable for data analysis for potential step experiments since integration decreases the noise level. According to Faraday law, Q=nFN (n is the number of electron transfer, F is the Faraday constant, and N the number of moles of the redox species). N is proportional to the moles of the gas analyte at electrode surface, which in turn is dependent on the surface coverage of the gas analyte. The charge can be obtained from the current versus time curves for both anodic and cathodic Faradic and non-Faradic processes, with or without the analyte. The quantitative analysis of the analyte can thus be achieved via charge analysis.

The method(s) disclosed herein may advantageously be achieved at room temperature (i.e., at a temperature ranging from about 18° C. to about 30° C.). It is believed, however, that the method(s) disclosed herein may be performed in any temperature up to about 300° C., based, at least in part, upon the thermal stability of the ionic liquid used. Performing the method at or near room temperature may be particularly desirable.

It is believed that the systems 10, 10', 10", 10''' shown in FIGS. 1A through 1D may be miniaturized and integrated into a wearable sensor. The sensors A, B or C, D or E, F, G, H, or I, J may be arranged in any desirable array, such as a linear array, or X number of sensors per row and Y number of sensors per column, or some other desirable configuration. Each sensor A, B or C, D or E, F, G, H, or I, J within an array may be programmed to sense the same gas, or to sense different cases, or a set of sensors in an array may be programmed to sense the same gas while another set of sensors within the same array may be programmed to sense a different gas. For example, sensor(s) A could be programmed to perform a chronoamperometry method for sensing hydrogen gas while sensor(s) B could be programmed to perform a chronoamperometry method for sensing oxygen gas. In the pre-programmed sensing systems 10, 10', 10", 10'", the pre-programmed amperometric sensor detection potential(s) may be based on preliminary cyclic voltammetry results.

Still further, in some of the examples disclosed herein, the working electrode 12, 12', 12", 12'" may be exposed to a preanodization or activation process. Preanodization is a process during which the working electrode 12, 12', 12", 12'" is equilibrated at a higher positive potential than the oxidation peak potential of the gas molecule to be sensed. This process enables oxide layers to be formed at the interface between the working electrode 12, 12', 12", 12'" and the electrolyte 14. The preanodization may alternatively or additionally include applying a more negative potential, thereby exposing the interface to a reduction process where the oxygen is removed. One or more cycles of oxidation and reduction may be performed, depending upon the type of electrode that is used.

To further illustrate the present disclosure, examples are given herein. It is to be understood that these examples are provided for illustrative purposes and are not to be construed as limiting the scope of the present disclosure.

EXAMPLES

In the following examples, a CHI 1000A electrochemical workstation (CH Instrument, Inc.) or a VersaSTAT MC electrochemical workstation (Princeton AME-TEK, USA) was used for the electrochemical characterizations (e.g., cyclic voltammetry and chronoamperometry). At least some of the current signals in these examples have been processed into current density ($\mu A/cm^2$, current divided by surface area of the working electrode used) to avoid the geometry effect of different working electrodes and to acquire accurate comparison.

Example 1

In this example, the electrochemical sensing behavior of an example of the sensor A, B shown in FIG. 1A was investigated. This type of electrochemical cell allows the gas analyte to directly reach the working electrode/ionic liquid electrolyte interface right after passing through the gas permeable membrane, and eliminates the long diffusion time of the analyte in the bulk electrolyte.

The gas permeable membrane was TEFLON®, and the working electrode was a platinum gauze electrode placed on the gas permeable membrane. The electrochemical active surface area (5.96 $cm^2$) of the Pt gauze electrode was calculated based on the charge of hydrogen adsorption/desorption (210 $\mu C\ cm^{-2}$) experiments on a platinum electrode in 0.1 M $HClO_4$. Working and reference electrodes (0.5 mm diameter platinum wires) were placed into the ionic liquid electrolyte.

Two room temperature ionic liquids, namely 1-butyl-1-methylpyrrolidinium bis(trifluoromethylsulfonyl) ([Bmpy][NTf$_2$]; viscosity=79 cp and solubility of hydrogen=0.90 mM) and 1-butyl-3-methylimidazolium bis(trifluoromethylsulfonyl)imide ([Bmim][NTf$_2$] viscosity=54 cp and solubility of hydrogen=0.77 mM) were tested in the sensor. Prior to use, the ionic liquids were dried in a vacuum oven (70° C.) until there were no visible signs of water peaks in the infrared (IR) spectrum. An amount of 150 µL of the respective ionic liquid was added into the electrochemical cell.

All potentials refer to Fc+/Fc unless specifically notified.

The total gas flow rate was maintained at 200 sccm by digital mass-flow controllers (MKS Instruments, Inc.) and the volume ratio (v/v) % of hydrogen to background gas(es) was adjusted by two mass-flow controllers, in which one was used to control the background gas flow (nitrogen or air) and the other was used to control the analyte gas flow. Volume percent concentration (v/v) % was used for the concentration of analytes in this Example. All electrochemical experiments were conducted at room temperature (22° C.±1° C.).

Real-time and continuous sensing of hydrogen in the sensor was characterized at anaerobic and aerobic experimental conditions.

Anaerobic Sensing Conditions

For anaerobic sensing, the cyclic voltammetry and chronoamperometry results were recorded in sequence with purging of nitrogen gas for 1 hour between experiments, in order to restore the electrochemical cell/sensor into the original condition.

Using each of the sensors, multiple cycles of cyclic voltammetry were performed in a nitrogen background and with the introduction of 1% (v/v) hydrogen in $N_2$ (anaerobic conditions). While not shown, these results indicated that a steady state current can be reached and maintained within only a few cycles, suggesting that the hydrogen oxidation reaction processes do not affect the ionic liquid/electrode interface structure and that the peak current, as well as the peak potential, are stable during the reactions. The results showed a broad oxidation peak at 0.20 V and a partially reversible reduction peak at 0.10 V.

Cyclic voltammetry was also performed at different scan rates (ranging from 20 mV/s to 500 mV/s) with the introduction of 1% (v/v) hydrogen in $N_2$. These results (also not shown) indicated the quasi-reversible behavior for hydrogen oxidation at all of the scan rates studied. Plots of the peak current versus the scan rate for each of the ionic liquids were linear. The linearity between peak current and scan rate indicated a surface process for hydrogen oxidation which was consistent with the Tafel reaction mechanism ($H_2$+ 2M↔2$H_{ads}$–M).

Based on these results, it was concluded that the elementary steps of hydrogen oxidation in the aprotic ionic liquids should be similar to that of the Tafel-Heyrovsky-Volmer mechanism (see eqs. 1-3 below). These results also indicated that the oxidation kinetics of atomic H on platinum in the aprotic ionic liquids should be facile since oxidation occurred at a relatively low positive potential (between 0.2V and 0.4V).

The cyclic voltammetry results indicated that the peak current of the sensor with [Bmim][NTf$_2$] as the electrolyte was about half of the peak current of the sensor with [Bmpy][NTf$_2$] as the electrolyte. Since both of the ionic liquids had the same anion, the difference in the voltammetric behavior may be attributed to the different cations, which contributes to the different hydrogen solubility (0.90 mM in [Bmpy][NTf$_2$] vs 0.77 mM in [Bmim][NTf$_2$]). The ratio of the solubility of hydrogen in [Bmim][NTf$_2$] to [Bmpy][NTf$_2$] is 0.85, which is much higher than the peak current ratio (0.50) of the two ionic liquids for hydrogen oxidation. Thus, the difference of the ionic liquid/platinum working electrode interface properties contributes, at least partially, to the smaller current signal that was observed in [Bmim][NTf$_2$]. Since the different solubility of hydrogen in [Bmpy][NTf$_2$] and [Bmim][NTf$_2$] resulted in different current response in hydrogen oxidation, the adsorption process shown below in equation (1) is believed to be the rate-determining step for the hydrogen oxidation in the ionic liquids:

$$2Pt+H_2(g) \leftrightarrow 2Pt—H_{(ad)} \quad (1)$$

$$2Pt—H_{(ad)} \leftrightarrow Pt+Pt—H^{\cdot}+H^++e^- \quad (2)$$

$$Pt—H_{(ad)} \leftrightarrow Pt+H^++e^- \quad (3)$$

$$H^++NTf_2^- \leftrightarrow HNTf_2^- \quad (4)$$

Figure 4A:
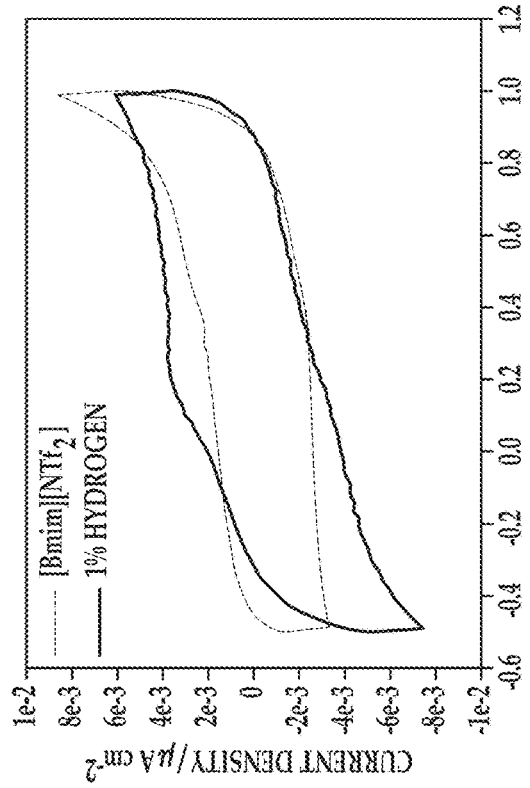
FIGS. 4A and 4B are cyclic voltammograms of sensors with different ionic liquids (1-butyl-1-methylpyrrolidinium bis(trifluoromethylsulfonyl)imide (i.e., [Bmpy][NTf$_2$]) and 1-butyl-3-methylimidazolium bis(trifluoromethylsulfonyl) imide (i.e., [Bmim][NTf$_2$]) in the presence of a nitrogen background gas and in the presence of 1% (v/v) hydrogen in nitrogen (scan rate: 500 mV/s)
Figure 4B:
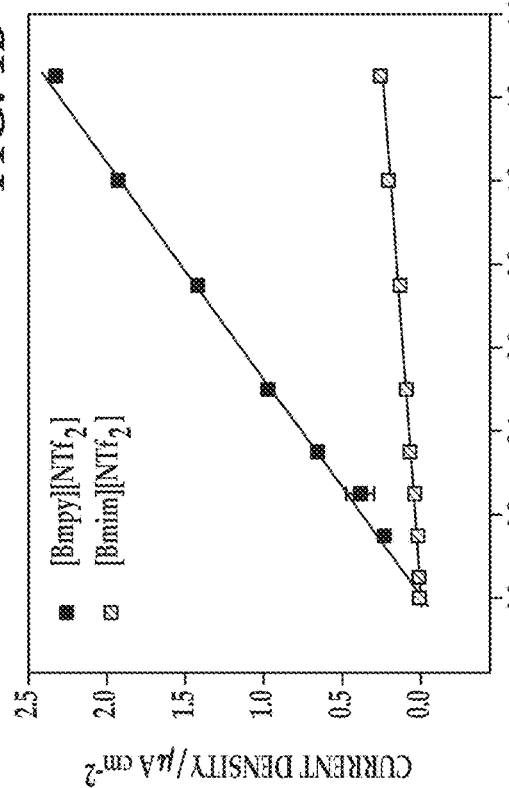

Following up to these findings, the same type of sensor was tested again in [Bmim][NTf$_2$] vs [Bmpy][NTf$_2$] using cyclic voltammetry. The results for each of the sensors are shown in FIGS. 4A and 4B. As indicated by the small positive oxidation potential (<0.4 V) observed in FIGS. 4A and 4B, these results confirm that the oxidation of hydrogen in the two ionic liquids is a facile surface process. A symmetric reduction peak appeared during the cathodic scan, confirming the reversible surface process of hydrogen oxidation in both ionic liquids.

As shown in FIGS. 4A and 4B, the oxidation and reduction peak currents are different in the two ionic liquids, which indicates that the properties of the ionic liquids play a role in the rate limiting process in hydrogen oxidation. Since the dissociation steps (eqs. 2 and 3) on platinum electrode are facile, the mass transport process of hydrogen to electrode surface and its subsequent adsorption at the surface (eqn. 1) should be the rate-limiting steps and responsible for different hydrogen oxidation current in the two ionic liquids. All of these results indicate that the ionic liquids act as solvents, which allows for tunable sensitivity in hydrogen oxidation.

The same type of sensor was tested again in [Bmim][NTf$_2$] vs [Bmpy][NTf$_2$] using amperometry. A constant potential of 0.4V was selected based on the hydrogen redox reactions and the results shown in FIGS. 4A and 4B. This potential also provided selectivity of hydrogen detection, since many ambient gases have no redox activities at this potential.

Figure 5A:
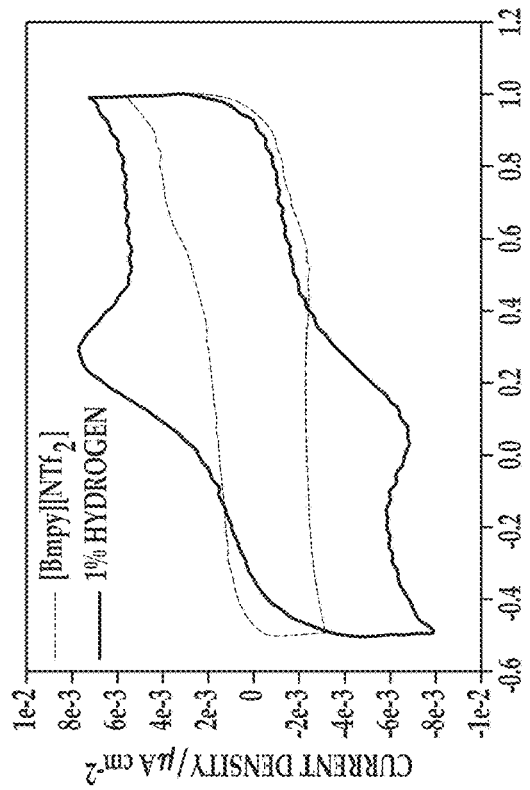
FIG. 5A is a graph depicting the amperometric response of sensors with different ionic liquids ([Bmpy][NTf$_2$]) and [Bmim][NTf$_2$]) in the presence of different and increasing concentrations of hydrogen in nitrogen (v/v) with 10 second on and off cycles.
Figure 5B:
FIG. 5B is a calibration curve generated from the data in FIG. 5A.

FIG. 5A. A calibration curve was generated from these results, which is shown in FIG. 5B. As depicted in FIG. 5B, a linear relationship of the current and the hydrogen concentration was obtained for both sensors, which demonstrates the feasibility of using the ionic liquids as the electrolytes for amperometric hydrogen sensing.

In another test, the hydrogen concentration was turned on for 20 seconds and off for 20 seconds, and three measurements were taken at each hydrogen concentration. In this test, the hydrogen concentration was increased by 0.10%, 0.15%, or 0.25%, from 0.05% up to 1.25%, and then was decreased by 0.25%, 0.15%, or 0.10%, from 1.25% down to 0.05%. The results, in terms of current density versus time are shown in FIG. 6A. A calibration curve was generated from these results, which is shown in FIG. 6B. As depicted in FIG. 6B, nearly identical linear relationships of the current and the hydrogen concentration were obtained for both sensors during increase and decrease, which demonstrates the feasibility of using the ionic liquids as the electrolytes for amperometric hydrogen sensing and the highly reversible sensor performance.

The difference in the sensitivities of the sensors with the different ionic liquids indicates the influence of the cation in the hydrogen electrode adsorption step. The higher solubility of hydrogen contributed to the higher amount of hydrogen adsorbed, which lead to higher oxidation current (for [Bmpy][NTf$_2$] as compared to Bmim][NTf$_2$]). Since the amperometric sensors were involved in the redox process of hydrogen, the reversibility of the sensor performance (described in eq. 1-3) proved that protons formed by the hydrogen oxidation can be quickly removed away from the working electrode surface in the time period of measurement. As such, there is no product accumulation at working electrode/electrolyte interfaces, which is one of the most common sensor signal drift mechanisms.

The relative standard deviation was calculated for the results shown in FIGS. 5B and 6B, and this data is shown in Table 2 below.

TABLE 2

| | Relative Standard Deviation | | | | | |
| | [Bmpy][NTf$_2$] | | | [Bmim][NTf$_2$] | | |
| Hydrogen concentration | 20 second increase | 20 second decrease | 10 second increase | 20 second increase | 20 second decrease | 10 second increase |
| --- | --- | --- | --- | --- | --- | --- |
| 0.05% | 4.27 | 4.26 | 7.11 | 5.03 | 3.94 | 8.97 |
| 0.15% | 6.54 | 4.85 | 8.28 | 6.64 | 1.27 | 5.66 |
| 0.25% | 5.71 | 2.23 | 11.58 | 8.11 | 1.74 | 3.13 |
| 0.35% | 4.33 | 3.01 | 9.21 | 6.90 | 3.76 | 4.21 |
| 0.50% | 6.60 | 3.69 | 3.48 | 4.51 | 2.58 | 4.21 |
| 0.75% | 8.31 | 1.73 | 4.56 | 8.42 | 1.36 | 5.75 |
| 1.00% | 8.46 | 3.07 | 3.94 | 2.97 | 5.47 | 2.50 |
| 1.25% | 3.55 | 3.55 | 3.32 | 2.93 | 2.93 | 4.16 |

To characterize the long-term zero and span stability and the reproducibility of the sensing responses, the amperometric sensors were exposed to periods of constant hydrogen concentration with periods of zero hydrogen concentration in between. In one test, the hydrogen concentration was turned on for 10 seconds and off for 10 seconds, and three measurements were taken at each hydrogen concentration. In this test, the hydrogen concentration was increased by 0.10%, 0.15%, or 0.25%, from 0.05% up to 1.25%. The results, in terms of current density versus time are shown in As shown in Table 2 and FIGS. 5B and 6B, generally, longer time detection (20 seconds vs. 10 seconds) will result in higher accurate current response for hydrogen detection (e.g., compare 20 second increase column with 10 second increase column in Table 2). It was also found that in the higher hydrogen concentrations (i.e., 0.50%-1.25%), the standard deviations of the hydrogen oxidation currents generally presented higher deviation compared to the lower concentrations (i.e., 0.05%-0.45%), except some large value were observed for 10 second increase stepwise detections. It was also observed that larger standard deviations were presented at both sampling times (10 seconds and 20 seconds) at earlier sampling of hydrogen concentrations, which may be due to the variations of mixing hydrogen gas at the initial sampling stage. For example, the earlier sampling stages in [Bmim][NTf$_2$] IL at the increased stepwise concentration during the 20 second time (i.e., "20 second increase" column in Table 2) presented much bigger standard deviations values at lower concentrations (0.05% to 0.75%), which were performed first, compared to later sampling stages (1.0% to 1.25%).

In general, the standard deviations obtained in [Bmpy][NTf$_2$] were larger than that of in [Bmim][NTf$_2$]. This may be due to the general higher current response of hydrogen oxidation, which might also produce higher standard deviations on certain hydrogen concentrations (0.05%-1.25%). The fast removal of oxidation product(s) is highly desirable for the repeatability of the sensor and to reduce the baseline drift of the sensor signals. Thus, the slightly higher viscosity of [Bmpy][NTf$_2$] may have a detrimental effect in the removal of protons formed by the oxidation of hydrogen, and may have contributed to the larger standard deviation in [Bmpy][NTf$_2$] compared to that in [Bmim][NTf$_2$].

Based on the calibrations for the results obtained in FIG. 6A, the sensitivities were 1.933 $\mu A \cdot cm^{-2}\%^{-1}$ and 0.230 $\mu A \cdot cm^{-2}\%^{-1}$ in [Bmpy][NTf$_2$] and [Bmim][NTf$_2$], respectively. The linearity of calibration for the hydrogen concentration range of 0.05% to 1.25% indicates the reliability of these ionic liquid based hydrogen amperometric sensors. In addition, the sensitivities in both [Bmpy][NTf$_2$] and [Bmim][NTf$_2$] at 10 second sampling times were smaller (1.914 $\mu A \cdot cm^{-2}\%^{-1}$ and 0.210 $\mu A \cdot cm^{-2}\%^{-1}$, respectively) than those at longer hydrogen sampling time (20 seconds). At the shorter hydrogen sampling time, the amount of hydrogen that dissolved in the ionic liquid electrolytes would be smaller at the dynamic flow experimental conditions, and resulted in the lower concentration of hydrogen and decreased hydrogen oxidation current. However, the measurement precision at the 10 second sampling time demonstrated the feasibility of ionic liquid amperometric hydrogen sensors for rapid hydrogen sensing.

Figure 40:
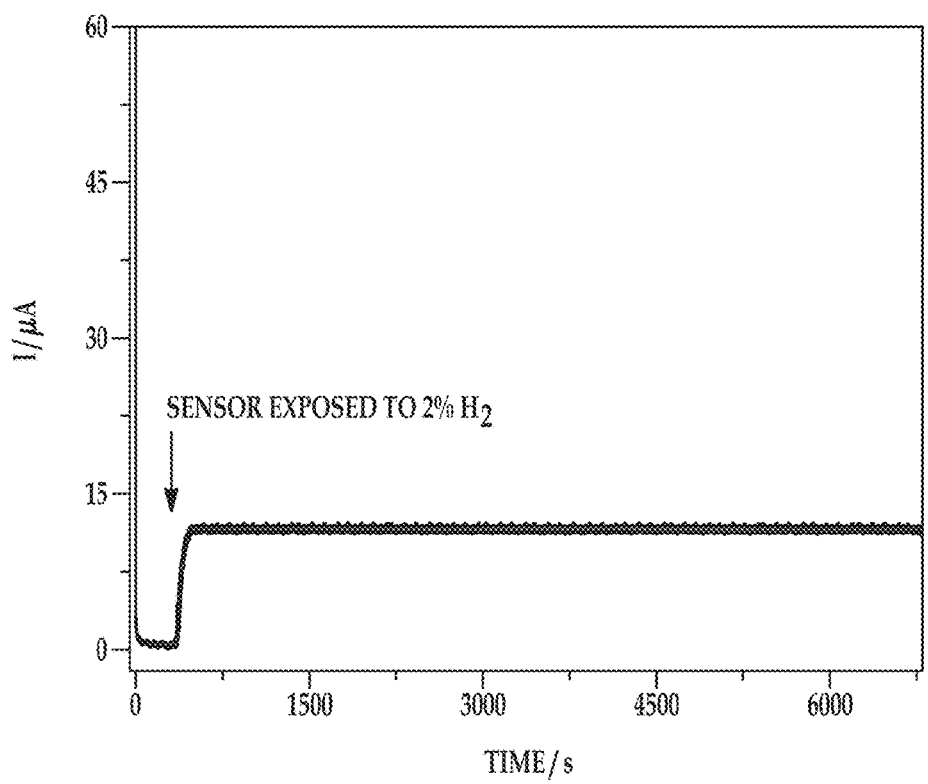
FIG. 40 is a graph depicting the amperometric response of a sensor with ([Bmpy][NTf$_2$]) that was exposed to 2% hydrogen in nitrogen (v/v) for over 6,000 seconds.

The sensor containing [Bmpy][NTf$_2$] was tested again. A constant potential of 0.4V was used. In this experiment, monitoring was initiated, and then a relatively high concentration (2%) of hydrogen (flow rate 100 sccm) was introduced to the sensor at the 300$^{th}$ second. The signal was monitored continuously for a longer sampling time (over 6000 seconds). The results are shown in FIG. 40, which shows current (I, in $\mu A$) on the Y-axis and time (in seconds) on the X-axis. The relative standard deviation (RSD) value for this experiment was 0.87%, indicating that the sensor disclosed herein is capable of functioning for a long period of time with negligible sensing error. These results also indicate that the same sensor can be used for various measurements over several weeks without having to replace the ionic liquid electrolyte or clean the electrodes. This suggests that the sensor is stable and has a desirable life span.

The ionic liquids are non-volatile solvents that provide partial selectivity based on the many types of solvent-solute interactions (e.g., hydrogen bonding, π-π interactions, dipolar interactions, ionic interactions, etc.). As examples, Bmpy][NTf$_2$] and [Bmim][NTf$_2$] have varying solubility for hydrogen gases and varying diffusion coefficients of the hydrogen. As discussed earlier, the mass transport of the analyte hydrogen to the electrode/electrolyte interface is a rate-limiting process and can be used for the quantification of the hydrogen concentration. This was tested by measuring how long it took to reach to the limiting current upon exposure of the analyte to the sensor system. The results indicate the maximum sensitivity that can be obtained, as well as the sensor response time. As such, the amperometric signal response was tested at different hydrogen gas sampling times.

Figure 7A:
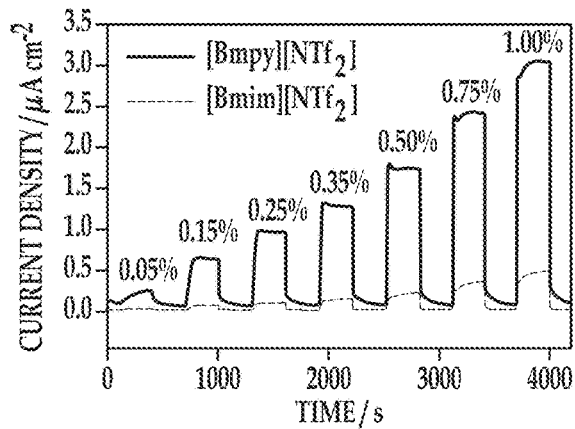
FIG. 7A is a graph depicting the amperometric response of sensors with different ionic liquids ([Bmpy][NTf$_2$]) and [Bmim][NTf$_2$]) in the presence of different and increasing concentrations of hydrogen in nitrogen (v/v) with 300 second on and off cycles.
Figure 7B:
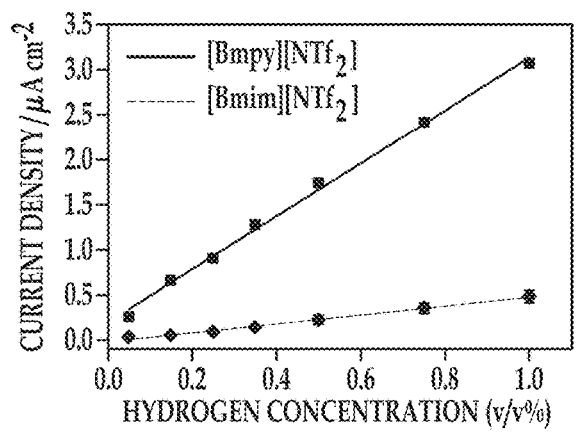
FIG. 7B is a calibration curve generated from the data in FIG. 7A.

The hydrogen sensor was tested with a 300 second sampling time to characterize the ionic liquid based hydrogen sensor performance, as shown in FIG. 7A. The hydrogen concentration was increased with each on cycle, as shown in FIG. 7A. As shown in the calibration curve of FIG. 7B, the net response to hydrogen was linear within the concentration range of 0.05% to 1.00% (v/v). It was found that the hydrogen oxidation sensitivity had a value six times higher in [Bmpy][NTf$_2$] than in [Bmim][NTf$_2$] in the hydrogen concentration range (0.05%-1.00%, v/v).

Figure 8A:
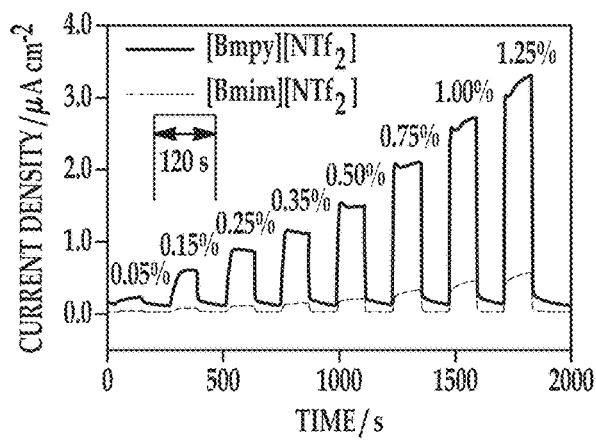
FIGS. 8A through 8D are graphs depicting (A) the amperometric response of sensors with different ionic liquids ([Bmpy][NTf$_2$]) and [Bmim][NTf$_2$]) in the presence of different, increasing and decreasing, concentrations of hydrogen in nitrogen (v/v) with 120 second on and off cycles, (B) the amperometric response of sensors with different ionic liquids ([Bmpy][NTf$_2$]) and [Bmim][NTf$_2$]) in the presence of different, increasing and decreasing, concentrations of hydrogen in nitrogen (v/v) with 60 second on and off cycles, (C) the amperometric response of sensors with different ionic liquids ([Bmpy][NTf$_2$]) and [Bmim] [NTf$_2$]) in the presence of different, increasing and decreasing, concentrations of hydrogen in nitrogen (v/v) with 30 second on and off cycles, and (D) the calibration curve generated from the data in FIGS. 8A through 8C.
Figure 8B:
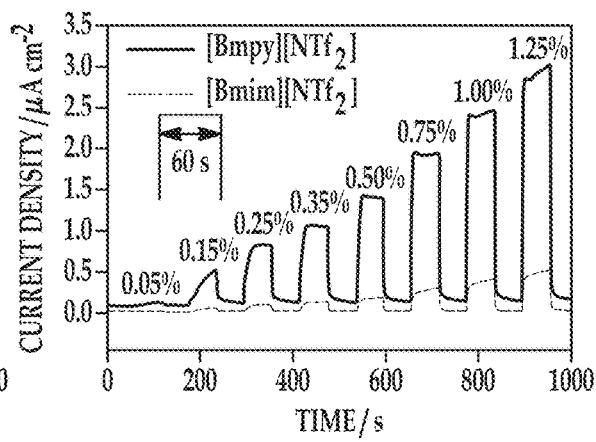
Figure 8C:
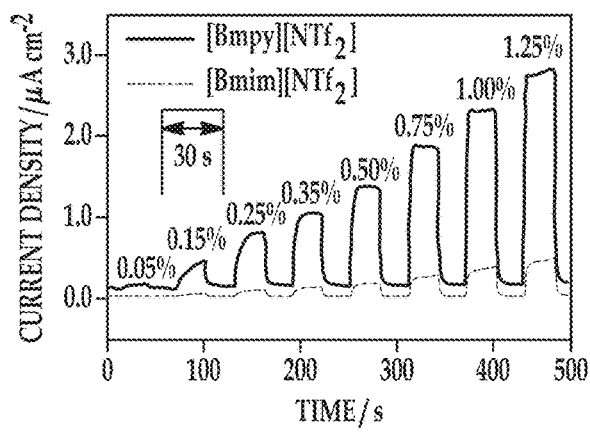
Figure 8D:
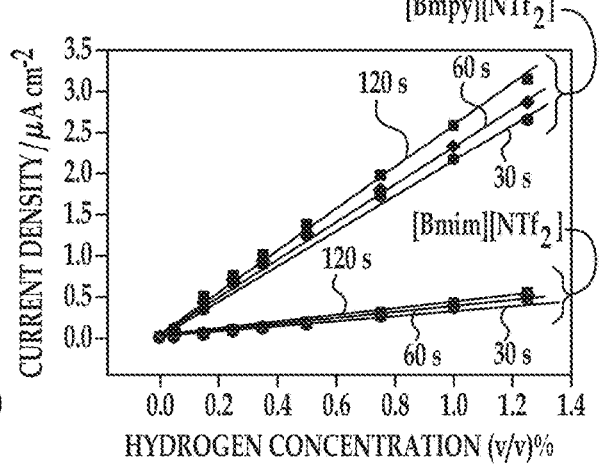

The hydrogen sensor was also tested at different sampling times, including 120 seconds (FIG. 8A), 60 seconds (FIG. 8B), and 30 seconds (FIG. 8C). It was found that the sensitivity of hydrogen detection deceased when the sampling time for hydrogen decreased, as evidenced by the calibration curves shown in FIG. 8D. Higher sampling time will increase the concentration of hydrogen dissolved in the ionic liquid electrolyte, which results in higher response current in both sensors.

Table 3 summarizes the figures of merit for two types of hydrogen sensing in different sampling times. The decreased sensitivity in shorter sampling time further validates that the amperometric hydrogen response is not in the kinetically controlled region, but rather in the mass transport region. The data shows a trade off in decreasing sensitivities but faster response times (the time to reach 90% of maximum current signal) with the shortening of the sampling time. The data also supports that ionic liquids can be used as a pre-concentration solvent allowing the gas analytes to be dissolved/adsorbed into it for gas sensing.

TABLE 3

| | FOM | | | | |
|---|---|---|---|---|---|
| IL | Exposure time (s) | Sensitivity ($\mu A \cdot cm^{-2} \cdot \%^{-1}$) | $R^2$ variance | Detection limit (v/v %) | Concentration range (v/v %) |
| [Bmpy][NTf$_2$] | 300 | 3.082 | 0.998 | 1.218e-3 | 0.05~1.00 |
| | 120 | 2.505 | 0.997 | 1.425e-3 | 0.05~1.25 |
| | 60 | 2.286 | 0.995 | 1.561e-3 | 0.05~1.25 |
| | 30 | 2.136 | 0.993 | 1.671e-3 | 0.05~1.25 |
| | 20 | 1.933 | 0.990 | 1.847e-3 | 0.05~1.25 |
| | 10 | 1.914 | 0.995 | 1.865e-3 | 0.05~1.25 |
| [Bmim][NTf$_2$] | 300 | 0.488 | 0.984 | 2.152e-3 | 0.05~1.00 |
| | 120 | 0.430 | 0.995 | 2.442e-3 | 0.05~1.25 |
| | 60 | 0.400 | 0.993 | 2.625e-3 | 0.05~1.25 |
| | 30 | 0.368 | 0.996 | 2.853e-3 | 0.05~1.25 |
| | 20 | 0.230 | 0.991 | 4.565e-3 | 0.05~1.25 |
| | 10 | 0.210 | 0.987 | 4.773e-3 | 0.05~1.25 |

The real world gaseous environment is complex with the presence of many potentially interfering compounds that can result in degradation of the sensor performance with time and lead to sensor signal drifts. As mentioned herein, the amperometric response of hydrogen in the sensor(s) of the sensing systems disclosed herein is highly selective because the potential for oxidizing hydrogen is relative low (+0.4V), which cannot drive other redox reaction aside from hydrogen. Furthermore, ionic liquids can be utilized as selective solvents, based on their wide varying gas solubility for common gases (i.e., $CH_4$, $C_2H_4$, $C_2H_6$, $CO_2$, $O_2$). As such, the ionic liquids may be used as the electrolyte, and also as a liquid gas membrane to minimize interference and increase selectivity.

Figure 9A:
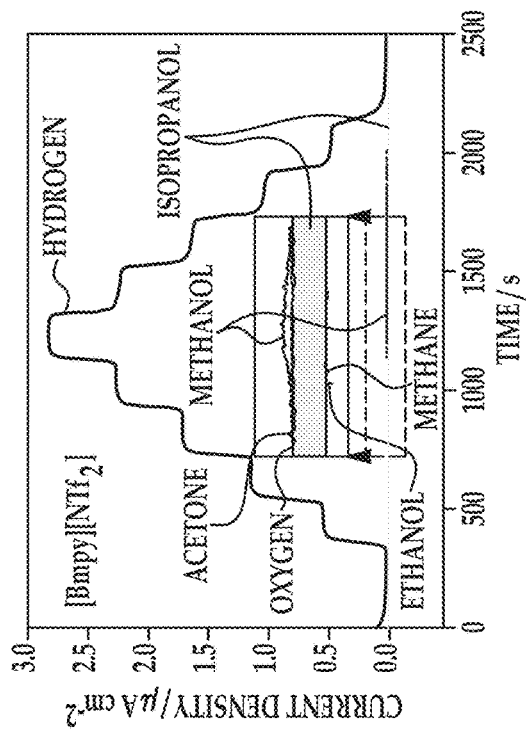
FIGS. 9A through 9D are graphs depicting (A) the amperometric response of sensors with different ionic liquids ([Bmpy][NTf$_2$]) and [Bmim][NTf$_2$]) in the presence of different, increasing and decreasing, concentrations of hydrogen in nitrogen (v/v), (B) the amperometric response of the sensor with [Bmpy][NTf$_2$] in the presence of different, increasing and decreasing, concentrations of different analytes, (C) the amperometric response of the sensor with [Bmim][NTf$_2$] in the presence of different, increasing and decreasing, concentrations of different analytes, and (D) the percent response for each sensor to each of the different analytes.

For this test, the hydrogen concentration (in a nitrogen background gas) was increased by 0.25%, from 0% up to 1.25%, and then was decreased by 0.25%, from 1.25% down to 0%. The results, in terms of current density versus time are shown in FIG. 9A. These results are consistent with the previous results set forth in this example.

Figure 9B:
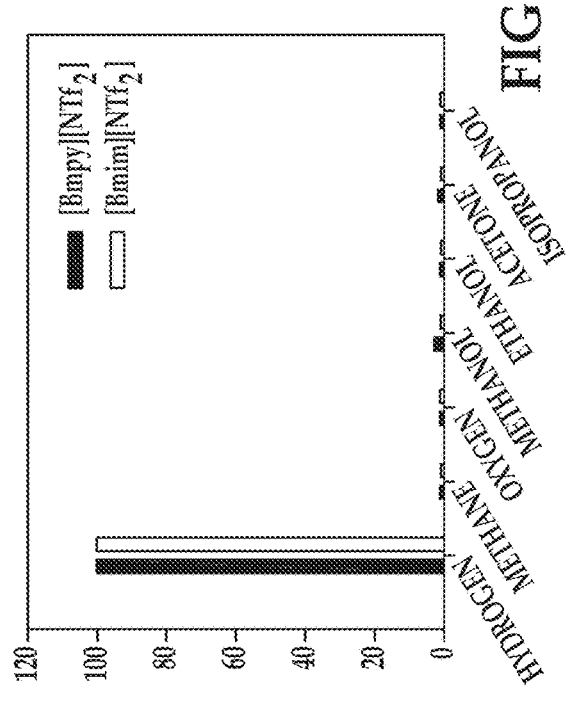
Figure 9C:
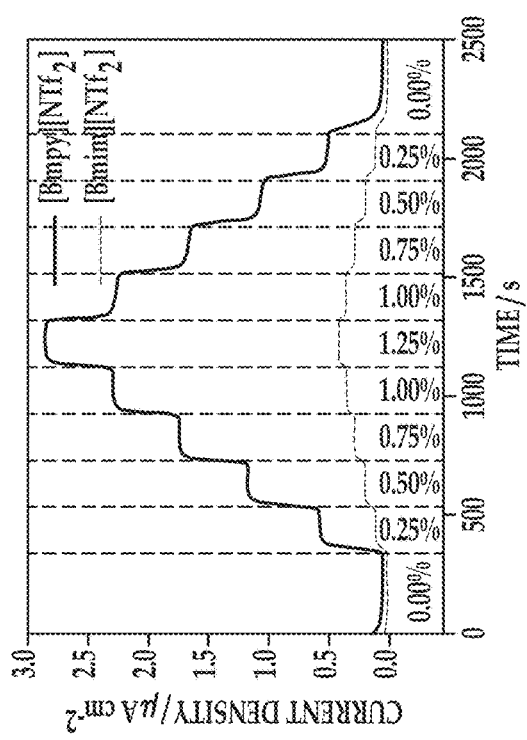
Figure 9D:
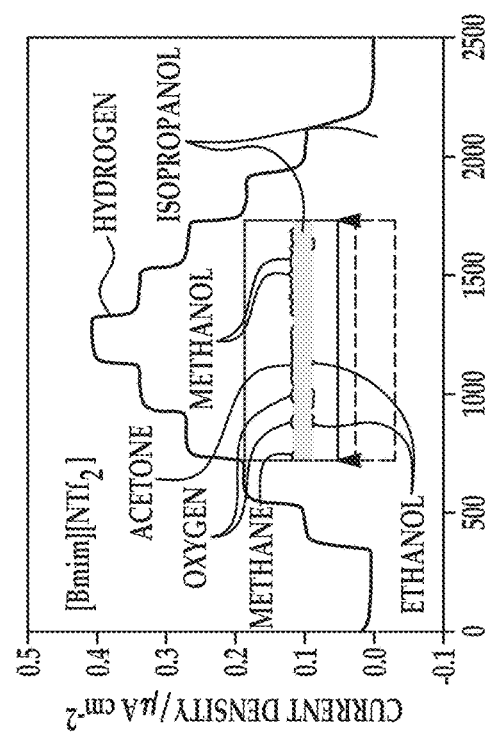

Since a positive potential was applied, potentially oxidizable interfering gases (methane, methanol, ethanol, acetone, isopropanol) were chosen for testing the selectivity of the hydrogen sensor disclosed herein. Oxygen was also used, due to its abundance in the atmosphere. Each of the gases was introduced at the same concentration with the hydrogen gas (in a nitrogen background gas). The concentration was increased by 0.25%, from 0% up to 1.25%, and then was decreased by 0.25%, from 1.25% down to 0%. FIGS. 9B and 9C are the amperometric results for all of the gases in the [Bmpy][NTf$_2$] sensor and the [Bmim][NTf$_2$] sensor, respectively. The percent response of each sensor with respect to each gas is shown in FIG. 9D. As illustrated, both of the ionic liquid based sensors exhibited high selectivity over the other gases.

Aerobic Sensing Conditions

For the aerobic experiment, the sensor cell was purged with air for 2 hours before the measurement, and the cyclic voltammetry was analyzed at the aerobic condition until an oxygen reduction peak was observed.

Figure 10A:
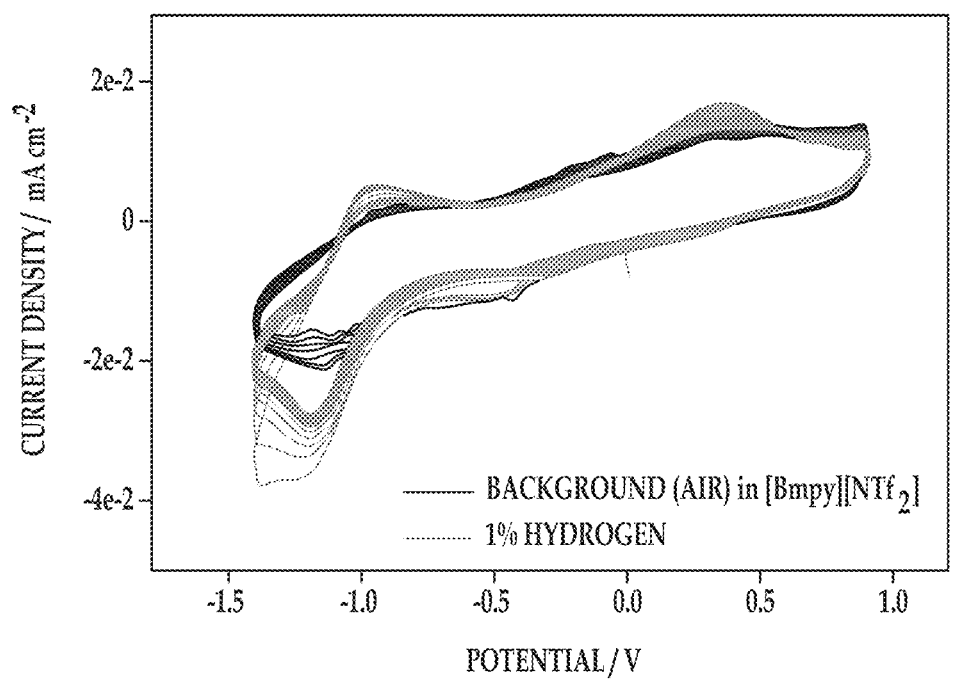
FIGS. 10A and 10B are cyclic voltammograms of sensors with different ionic liquids ([Bmpy][NTf$_2$] and [Bmim] [NTf$_2$]) in the presence of an air background (dry air, no hydrogen) and in the presence of 1% (v/v) hydrogen in air (scan rate: 500 mV/s)

Using each of the sensors, multiple cycles of cyclic voltammetry were performed in an air background and with the introduction of 1% (v/v) hydrogen in $N_2$ (aerobic conditions). The results are shown in FIGS. 10A ([Bmpy][NTf$_2$] sensor) and the and 10B ([Bmim][NTf$_2$] sensor). In addition to the anodic peak at about +0.4V, these results show an oxygen reduction peak at about −1.2V.

Figure 10B:
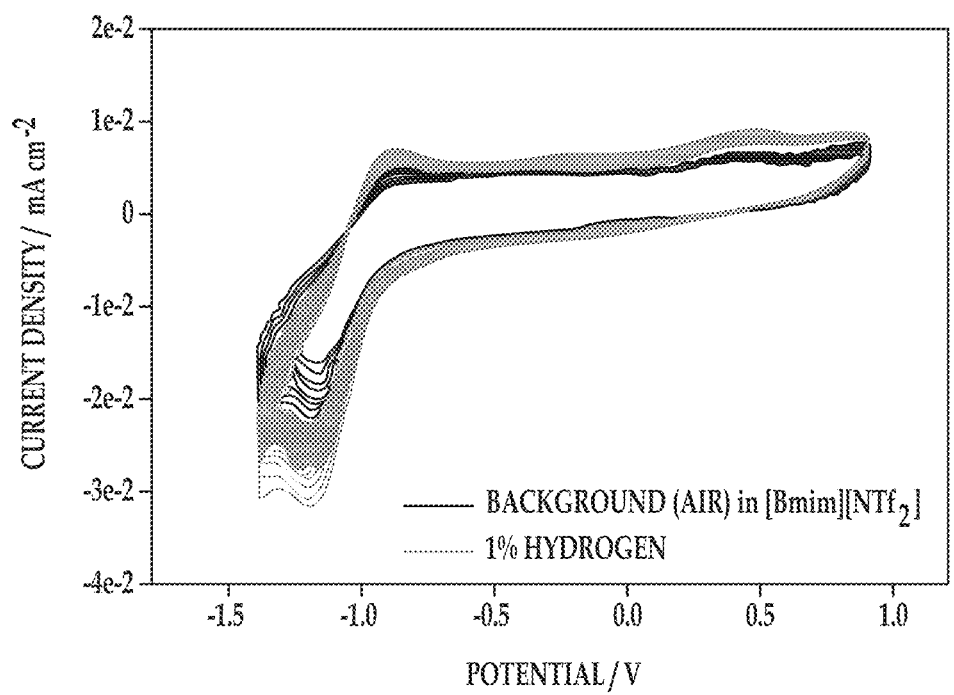

One obvious difference between the sensor results is the change of the oxygen reduction current, in which [Bmpy][NTf$_2$] shows a 2 times increase in the oxygen reduction current in the presence of hydrogen (FIG. 10A), while no obvious change was observed in [Bmim][NTf$_2$] (FIG. 10B). The increased current of oxygen reduction in [Bmpy][NTf$_2$] indicates that a new equilibrium was established when hydrogen was introduced. In the absence of hydrogen, the oxygen reduction current measured by sensors in air was similar, although the solubility of oxygen is higher in [Bmpy][NTf$_2$] (7.10 mM) than in [Bmim][NTf$_2$] (4.30 mM). However, with the presence of hydrogen, the reduction current of oxygen increased in [Bmpy][NTf$_2$].

The formation of a superoxide radical in cyclic voltammetry might lead to the formation of platinum oxide at positive potentials, which in turn would increase the reduction current of oxygen at −1.20V due to the accumulation of oxygen at electrode surface. In the results shown in FIGS. 10A and 10B, the oxidation current for the platinum working electrode at 0.50V in [Bmpy][NTf$_2$] is 2 times higher than that in [Bmim][NTf$_2$], which indicates easier surface oxide formation in the air environment in [Bmpy][NTf$_2$] compared to that of [Bmim][NTf$_2$]. The higher affinity of [Bmim]+ cation to the platinum working electrode surface is well explained by the lower oxidation current and the unchanged reduction current in the presence of hydrogen in [Bmim][NTf$_2$] sensor. In addition, isopotential points (IP) were observed at −1.10V for the oxygen reduction process in both ionic liquids, indicating a coupling reaction of the oxygen reduction process with the hydrogen oxidation process.

Thus, in aerobic conditions, the oxidation of hydrogen shows different oxidation behavior compared to the anaerobic conditions.

To determine whether coupling reactions between oxygen and the intermediate of hydrogen oxidation occur, potential step experiments were performed at various hydrogen concentrations (0.05%-1.00%, v/v) in nitrogen and air environments. +0.40 V was selected as the positive oxidation potential based on the peak potential of hydrogen oxidation from the cyclic voltammetry results in both anaerobic and aerobic conditions. At this potential, no oxygen reduction process will occur. The exposure time was 300 seconds.

Figure 11A:
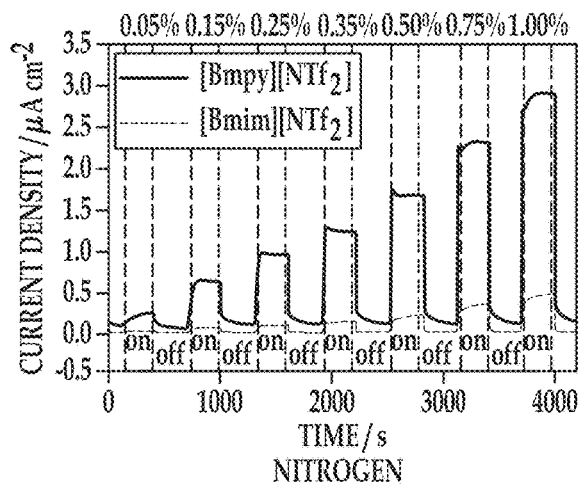
FIGS. 11A through 11D are graphs depicting (A) the amperometric response of sensors with different ionic liquids ([Bmpy][NTf$_2$]) and [Bmim][NTf$_2$]) in the presence of different and increasing concentrations of hydrogen in nitrogen (v/v) with 300 second on and off cycles, (B) the amperometric response of sensors with different ionic liquids ([Bmpy][NTf$_2$]) and [Bmim][NTf$_2$]) in the presence of different and increasing concentrations of hydrogen in air (v/v) with 300 second on and off cycles, (C) the amperometric response of a sensor with [Bmpy][NTf$_2$]) in the presence of different and increasing concentrations of hydrogen in nitrogen (v/v) or air (v/v) with 300 second on and off cycles, and (D) the amperometric response of a sensor with [Bmim][NTf$_2$]) in the presence of different and increasing concentrations of hydrogen in nitrogen (v/v) or air (v/v) with 300 second on and off cycles.
Figure 11B:
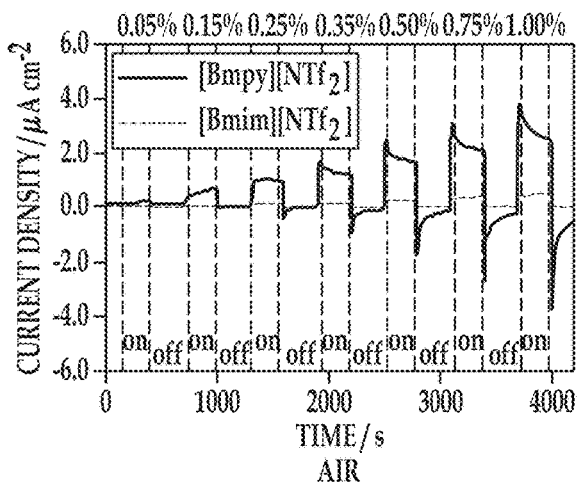

The current versus time responses are presented in FIGS. 11A through 11D. FIGS. 11A and 11B illustrate that the background gases ($N_2$ vs air) had a small effect on the hydrogen oxidation process in [Bmim][NTf$_2$], while they had a significant effect on the current signal response observed in [Bmpy][NTf$_2$].

Figure 11C:
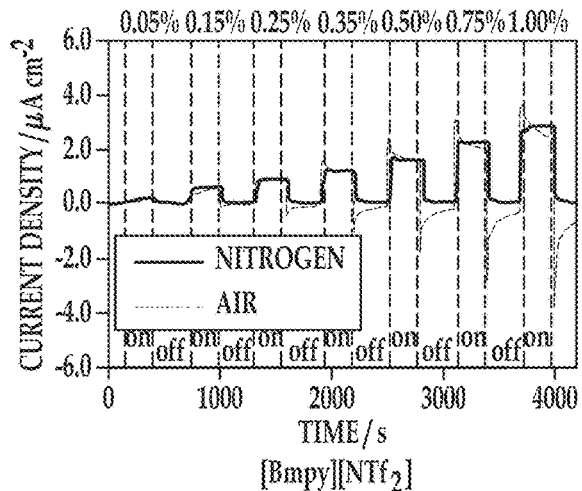

In the [Bmpy][NTf$_2$] sensor, the air background affected the current signals both at the initial introduction of hydrogen gas (i.e., the oxidation of hydrogen process) as well as at the late stage of removal of hydrogen (e.g., last off cycle) (see FIGS. 11B and 11C). In the presence of oxygen (FIGS. 11B and 11C), the hydrogen oxidation chronoamperometry data showed a positive current spike with the introduction of hydrogen and a negative current spike with the removal of hydrogen. This data indicates that the oxygen in air is involved in the hydrogen oxidation process, during which a reduction process takes place and leads to the negative current. If the hydrogen oxidation process follows the Tafel-Volmer reaction pathways, the oxidation step (eq. 3) is not the rate-determining step, i.e., the oxidation of hydrogen would be fast enough to not form any intermediates that can react with oxygen. Thus, the present inventors suggest the Heyrovsky-Volmer reaction pathways (eq. 1 and 2) for the oxidation of hydrogen in ionic liquids for forming the intermediate of Pt—H· that can react with oxygen and contribute to the negative reduction current in [Bmpy][NTf$_2$]. In the Heyrovsky-Volmer reaction mechanism, the oxygen interacts with the hydrogen oxidation intermediate (Pt—H·) to form another product that can be reduced and can contribute to the negative current when hydrogen is removed from the system. Based on these experimental observations, it is believed that the following new mechanism (involving the oxygen molecule in hydrogen oxidation) explains the reduction signal response of hydrogen oxidation in the [Bmpy][NTf$_2$] sensor in the air background:

$$Pt-H^{\cdot} + O_2 \leftrightarrow Pt-HO_2^{\cdot} \tag{5}$$

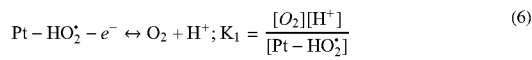

$$Pt-HO_2^{\cdot} - e^- \leftrightarrow O_2 + H^+; K_1 = \frac{[O_2][H^+]}{[Pt-HO_2^{\cdot}]} \tag{6}$$

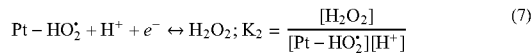

$$Pt-HO_2^{\cdot} + H^+ + e^- \leftrightarrow H_2O_2; K_2 = \frac{[H_2O_2]}{[Pt-HO_2^{\cdot}][H^+]} \tag{7}$$

At low hydrogen concentrations (e.g., 0.05%-0.25%), the amount of hydrogen radical intermediate (Pt—H·) formed and the concentration of the proton formed are relatively small; thus, a small amount of hydrogen radicals is available for the reaction with the oxygen. This can explain the little effect on the oxidation signal at low hydrogen concentration (see FIGS. 11B and 11C) (which follows the reaction mechanism in eq. 3). However, when the hydrogen concentration increases, the interaction of oxygen with Pt—H· (per eq. 5) begins to compete with the direct oxidation of the hydrogen atom, in which the reaction in eq. 7 begins to show its effect. First, at constant potential of +0.40V, the initial introduction of hydrogen to the electrochemical cell results in the formation of Pt—H˙, which can subsequently react with oxygen and the follow the redox processes of eqs. 6 and 7. The sum of the positive current due to hydrogen oxidation (eq. 6) and the negative current due to hydrogen peroxide reduction (eq. 7) will lead to a positive current spike at the beginning stage of hydrogen detection, as shown in 11B. Second, at the time period that the hydrogen gas was turned off, the oxygen consumes all the remaining of Pt—H˙ radical formed in eq. 5 and leads to the dominant reduction current in the chronoamperometry response based on eq. 7, shown as the negative current spike observed in FIG. 11B.

Figure 11D:
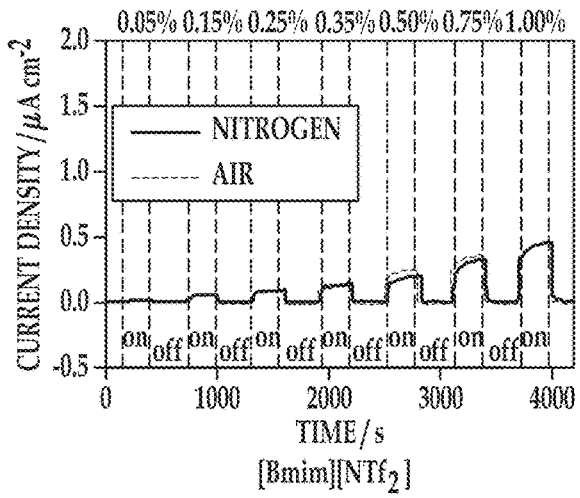

The reaction rate constants $K_1$ and $K_2$ for eqs. 6 and 7 can be relatively measured by comparing the ratio between the positive and negative current in FIG. 11B. Based on equations $K_1$ and $K_2$, the concentration of the proton [H+] is significant for determining the reaction pathways. At lower hydrogen concentrations, the oxygen interacts with the intermediate of hydrogen oxidation, in which the combination of the reactions in eqs. 5 and 6 is equal to eq. 2, which is consistent with the experimental results that, at lower concentration of hydrogen, the hydrogen oxidation in air and nitrogen are the same, as shown in FIGS. 11C and 11D. Thus, the current spike of the positive and negative currents is important to distinguish the pathway of eqs. 6 and 7. For the positive current spike, the proton concentration [H+] is at the minimal value when hydrogen was just introduced; and the current observed should only be the contribution of the reaction in eq. 6. In contrast, the negative current spike should be the contribution of the reaction in eq. 7, where the proton concentration is at the maximum value, and the radical intermediate (Pt—H˙) is almost consumed completely due to the removal of hydrogen. For FIG. 11C, the ratio of positive/negative current spike values is 2.47, 1.92, 1.39, 1.18, and 1.02 for 0.35%, 0.50%, 0.75%, and 1.00% (v/v) hydrogen, respectively. The decrease of the positive/negative current spike ratio represents a transition in hydrogen oxidation in the air environment, in which the reaction mechanism of eq. 7 gradually becomes the dominant reaction pathway with an increase of the hydrogen concentration. Thus, the mechanism presented in eqs. 6 and 7 can explain the negative current contribution in the [Bmpy][NTf$_2$] ionic liquid based hydrogen oxidation.

A similar (although not as pronounced) signal trend was observed in [Bmim][NTf$_2$] in the different background gases. The different solubility of hydrogen may be the major factor contributing to the results, because as lower concentration of hydrogen in [Bmim][NTf$_2$] results in a lower concentration of oxidation intermediate (Pt—H) and proton. The reaction mechanism of hydrogen in [Bmim][NTf$_2$] in the hydrogen concentration range (0.00%-1.00%, v/v) should follow the reaction mechanism of lower concentration hydrogen in [Bmpy][NTf$_2$], in which eq. 6 is dominant for not observing the negative response phenomenon. In addition, the steric hindrance effect of the [Bmim]+ cation, due to its adsorption at the platinum working electrode surface, can also cause the lower kinetics of reaction occurring in eq. 7.

Table 4 summarizes the integrated areas of current response in the time periods when hydrogen was introduced and removed, according to the results shown in FIGS. 11A through 11D.

TABLE 4

| | | Integrated Charge ($Q$ cm$^{-2}$) Hydrogen Concentration | | | | | | |
|---|---|---|---|---|---|---|---|---|
| | | 0.05% | | 0.15% | | 0.25% | | 0.35% | |
| Ionic Liquid | BG Gas | on | off | on | off | on | off | on | off |
| [Bmpy] | N$_2$ | 55.82 | 27.23 | 157.33 | 35.77 | 243.75 | 46.48 | 327.76 | 60.70 |
| [NTf$_2$] | Air | 37.98 | 22.67 | 135.55 | 10.82 | 261.93 | 20.41 | 377.05 | 71.16 |
| [Bmim] | N$_2$ | 1.86 | 0.79 | 11.13 | 1.44 | 19.86 | 2.46 | 29.80 | 4.09 |
| [NTf$_2$] | Air | 1.88 | 1.06 | 9.68 | 3.69 | 21.17 | 5.60 | 37.29 | 5.84 |

| | | Integrated Charge ($Q$ cm$^{-2}$) Hydrogen Concentration | | | | | |
|---|---|---|---|---|---|---|---|
| | | 0.50% | | 0.75% | | 1.00% | |
| | | on | off | on | off | on | off |
| [Bmpy] | N$_2$ | 441.31 | 86.31 | 618.29 | 83.79 | 826.20 | 69.74 |
| [NTf$_2$] | Air | 530.89 | 117.55 | 679.97 | 179.92 | 829.76 | 220.48 |
| [Bmim] | N$_2$ | 44.76 | 7.61 | 76.54 | 8.43 | 116.97 | 6.13 |
| [NTf$_2$] | Air | 64.45 | 5.02 | 93.45 | 4.48 | 119.85 | 3.32 |

The integrated current response data indicates that at low concentrations of hydrogen (0.05%-0.25%), the hydrogen oxidation response was similar in the two ionic liquid environments, which is consistent with the mechanism proposed above, in which eq. 2 (eqs. 5 and 6) are the main reaction pathway of hydrogen oxidation in ionic liquids on the platinum working electrode. The increase of hydrogen concentration did not affect the first oxidation process (eq. 1), as indicated by the relatively consistent oxidation response in Table 4 for both nitrogen and air background gases. In addition, the value of the integrated charge for the negative current spike in [Bmpy][NTf$_2$] increased with increasing hydrogen concentration and reached a 30% value compared to the positive spike in 1.00% (v/v) hydrogen concentration, which also confirms the domination of eq. 7 at high hydrogen concentrations.

Figure 12:
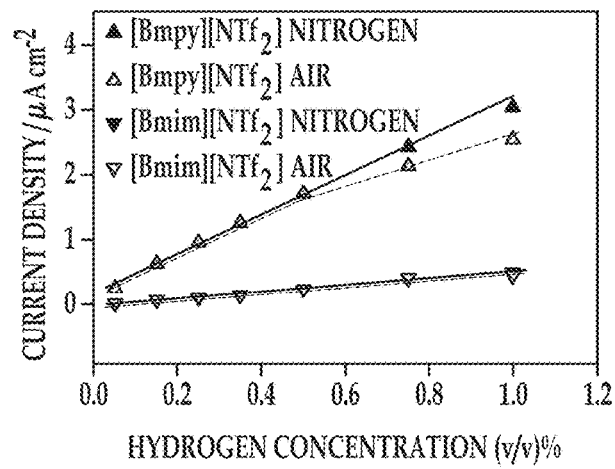
FIG. 12 is a calibration curve generated from the data in FIGS. 11A through 11D.

A calibration curve of the data in FIGS. 11A through 11D is shown in FIG. 12. Equations 8 through 11 show the linear current density response versus the different concentrations of hydrogen in the two different ionic liquids on the platinum working electrode.

$$j(\mu A\ cm^{-2})=3.08C_{H2\%}+0.12(R^2=0.99([B_{mpy}])NTf_2, N_2) \qquad (8)$$

$$j(\mu A\ cm^{-2}) = 3.07 C_{H2\%} + 0.10\ (R^2 = 0.99\ ([Bmpy])NTf_2,\ \text{Air,low[H]}) \quad (9a)$$

$$j(\mu A\ cm^{-2}) = 1.58 C_{H2\%} + 0.84\ (R^2 = 0.99\ ([Bmpy])NTf_2,\ \text{Air,high[H]}) \quad (9b)$$

$$j(\mu A\ cm^{-2}) = 0.49 C_{H2\%} - 0.03\ (R^2 = 0.98\ ([Bmim])NTf_2,\ N_2) \quad (10)$$

$$j(\mu A\ cm^{-2}) = 0.49 C_{H2\%} - 0.02\ (R^2 = 0.99\ ([Bmim])NTf_2,\ \text{Air}) \quad (11)$$

At low hydrogen concentration (0.05%-0.50%, v/v) the sensitivities of hydrogen in [Bmpy][NTf$_2$] overlap well with each other, as shown in eq. 8 (3.08 $\mu A\ cm^{-2}\%^{-1}$) and eq. 9A (3.07 $\mu A\ cm^{-2}\%^{-1}$). However, the presence of oxygen will affect the sensitivity of hydrogen oxidation in the concentration range of 0.50%-1.00%, v/v, in which lower sensitivity (1.58 $\mu A\ cm^{-2}\%^{-1}$) was observed (eq. 9b). The sensitivity deviation in higher concentrations of hydrogen in [Bmpy][NTf$_2$] further confirmed the proposed mechanism, in which oxygen was involved in the oxidation process of hydrogen, especially in the higher concentration of hydrogen (eq. 10). The almost identical sensitivities in nitrogen and air environment for hydrogen oxidation in [Bmim][NTf$_2$] (0.49 $\mu A\ cm^{-2}\%^{-1}$) also confirmed the previous observations, where the low solubility of hydrogen forces the reaction pathway in air environment through eqs. 5 and 6 due to the lack of enough proton in the electrolyte. This is consistent with the reaction pathway in eq. 2.

The unique characteristics of hydrogen redox reactions in ionic liquids in aerobic conditions (eqs. 5-7) may be used to increase the selectively of hydrogen sensing.

Another potential step experiment was performed with the two sensors at various hydrogen concentrations (0.15%-1.25%, v/v) in an air environment. +0.40 V was selected as the positive oxidation potential. The exposure time was 120 seconds.

Figure 13A:
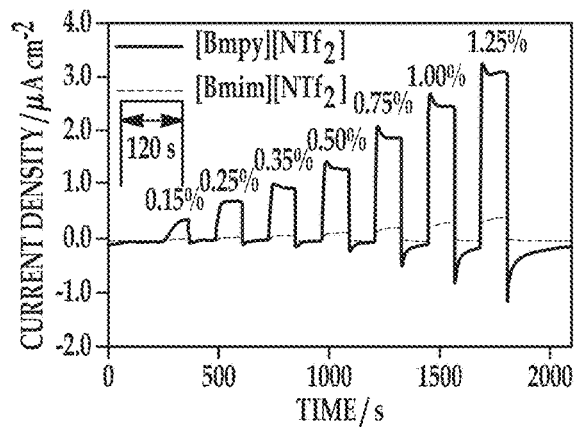
FIG. 13A is a graph depicting the amperometric response of sensors with different ionic liquids ([Bmpy][NTf$_2$]) and [Bmim][NTf$_2$]) in the presence of different and increasing concentrations of hydrogen in air (v/v) with 120 second on and off cycles.

As shown in FIG. 13A, the coupled reactions in eq. 5-7 again resulted in a current decay spike in the amperometric sensing response during hydrogen oxidation in the [Bmpy][NTf$_2$] sensor. The high concentration of hydrogen in the ionic liquid can form a relative large amount of Pt—H$^.$ to react with oxygen (eq. 5), and the new intermediate (Pt—HO$_2^.$) can either be oxidized (eq. 6) or reduced (eq. 7), contributing characteristic spike features (negative or positive) in the [Bmpy][NTf$_2$] ionic liquid.

Figure 13B:
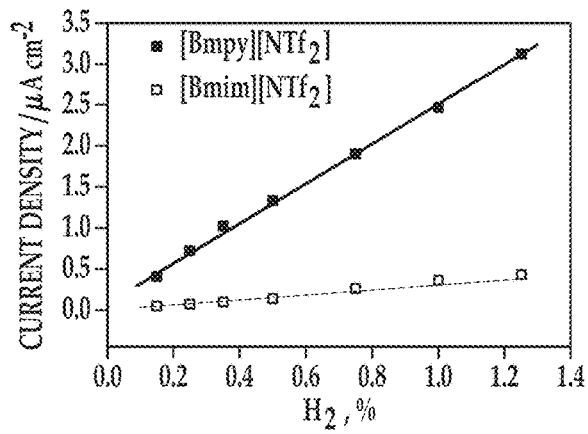
FIG. 13B is a calibration curve generated from the data in FIG. 13A.

FIG. 13B is the calibration curve of the data in FIG. 13A. The linear relationship of the hydrogen sensing spike peak currents and the hydrogen concentration further support the feasibility of using ionic liquid-based sensors in atmosphere conditions.

Figure 14A:
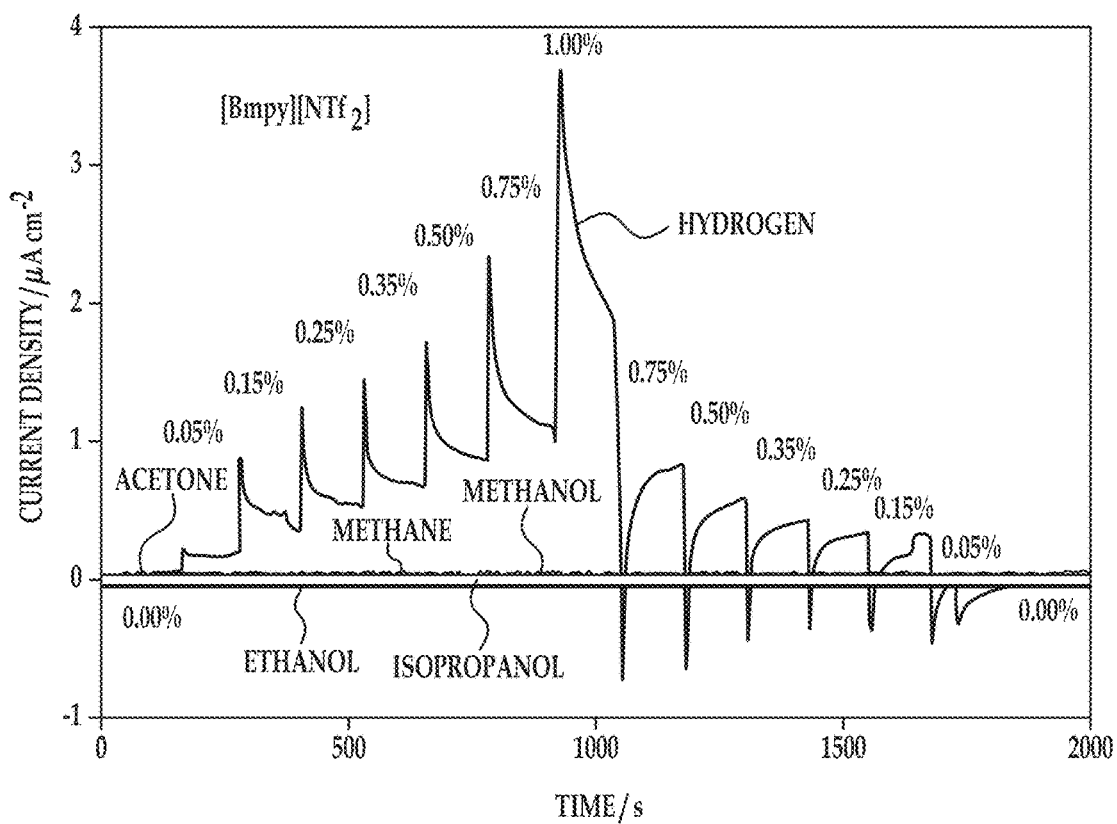
FIGS. 14A through 14D are graphs depicting (A) the amperometric response of a sensor with the ionic liquid ([Bmpy][NTf$_2$]) in the presence of different, increasing and decreasing, concentrations of different analytes in air (v/v), (B) the amperometric response of a sensor with the ionic liquid ([Bmim][NTf$_2$]) in the presence of different, increasing and decreasing, concentrations of different analytes in air (v/v), (C) the percent response for the [Bmpy][NTf$_2$] sensor to each of the different analytes, and (D) the percent response for the [Bmim][NTf$_2$] sensor to each of the different analytes.
Figure 14B:
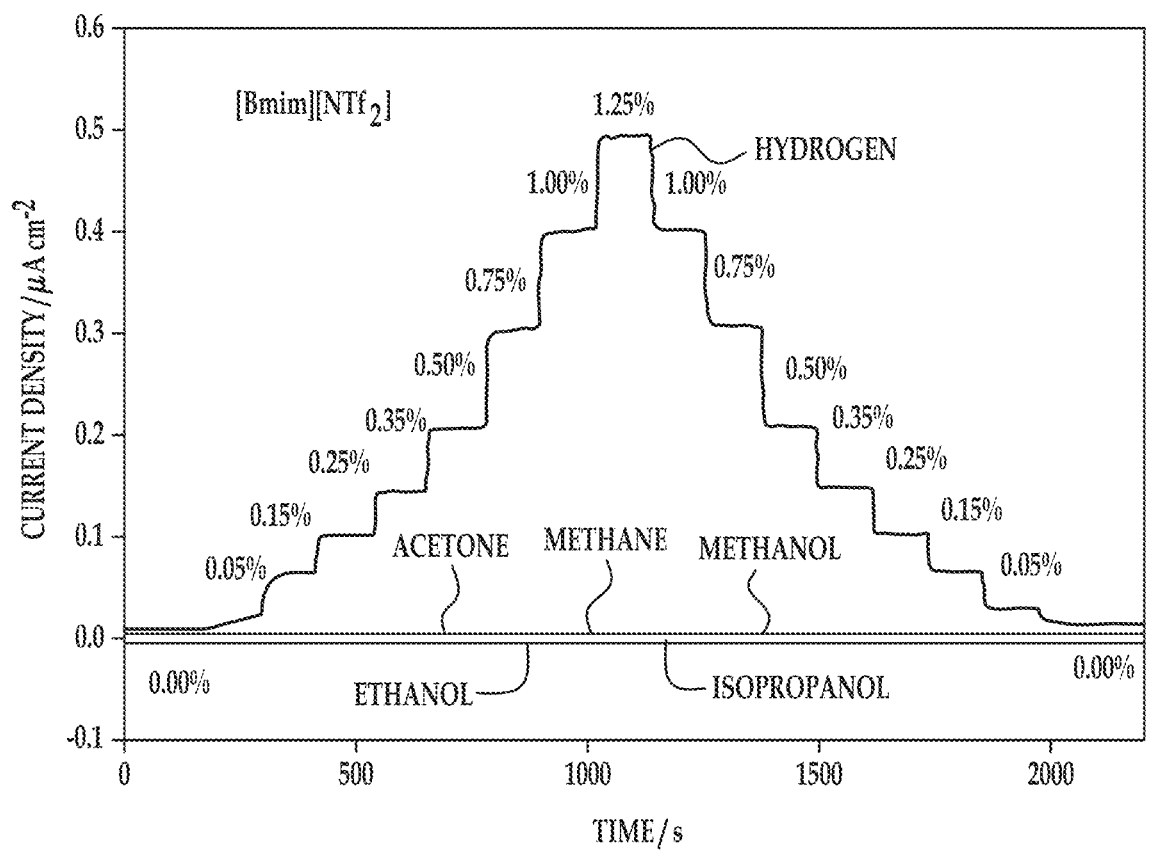
Figure 14C:
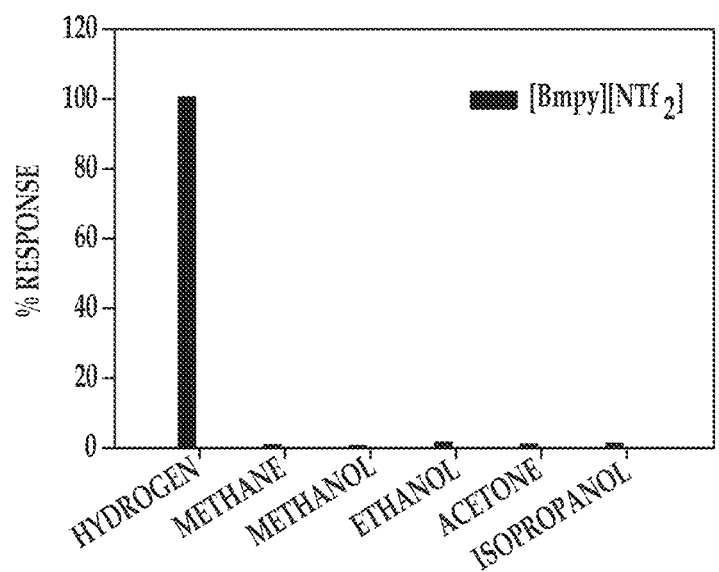
Figure 14D:
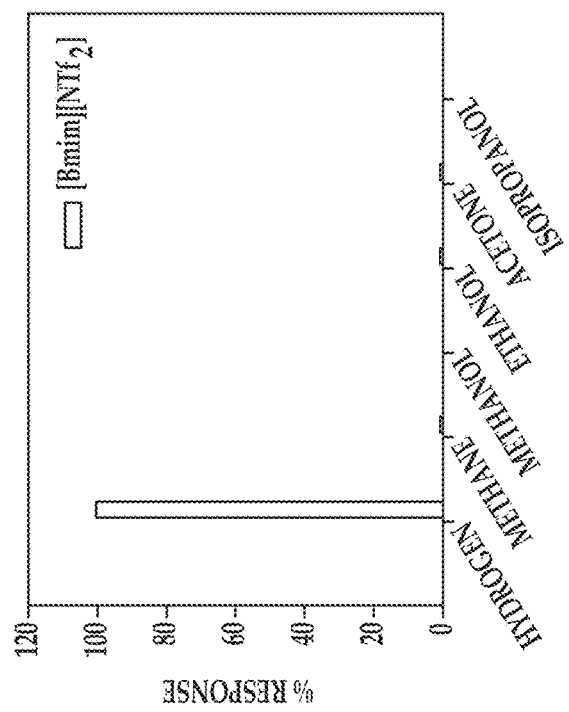

In addition, the aerobic environment was tested for validating the selectivity of the ionic liquid-based sensors. For this test, the hydrogen concentration (in an air background gas) was increased by 0.05%, 0.10%, 0.15%, or 0.25%, from 0% up to 1.00%, and then was decreased by the same percentages, from 1.00% down to 0%. The results, in terms of current density versus time are shown in FIGS. 14A and 14B. In the air environment, these two ionic liquid-based amperometric hydrogen sensors did not show any response other than hydrogen. The only difference compared to the similar test performed in the nitrogen background (see FIGS. 9A through 9D) is the sensing response of hydrogen in the [Bmpy][NTf$_2$] ionic liquid. Some current spikes were observed during the detection in concentration changes because of the formation of the Pt—HO$_2^.$ intermediate, which was consistent with the results presented herein. The characteristics patterns of hydrogen amperometric sensing signals for both ionic liquids in FIGS. 14A and 14B can be utilized to increase the selectivity for hydrogen detection in aerobic conditions, as the oxygen-containing background alone can provide such signatures for hydrogen sensing response.

Analytical Methods for Quantification

The results set forth in Example 1 indicate that the hydrogen concentration may be quantified based on the mass transport control rather than the electrode kinetic control. Three different analytical strategies were tested to quantify the hydrogen concentration. Each strategy involves the analysis of raw data from the sensors. The first strategy is based on the calibration of hydrogen concentration based on the limiting or summit current. The limiting or summit current is the maximum current reached at certain hydrogen concentration, mainly determined by the amount of hydrogen adsorption at the working electrode surface. The second strategy is based on the calibration of hydrogen concentration based on the change of the current vs. the change in time (i.e., the slope of current/time, or $\Delta I/\Delta t$). The third strategy is based on the calibration of hydrogen concentration based on the change of the current vs. square root of the change in time (i.e., slope of current/square root of time, or $\Delta I/\sqrt{\Delta t}$). Additionally, as shown in Table 5, three statistical methods were also used for some of the strategies in order to determine the best quantification methods.

Figure 15A:
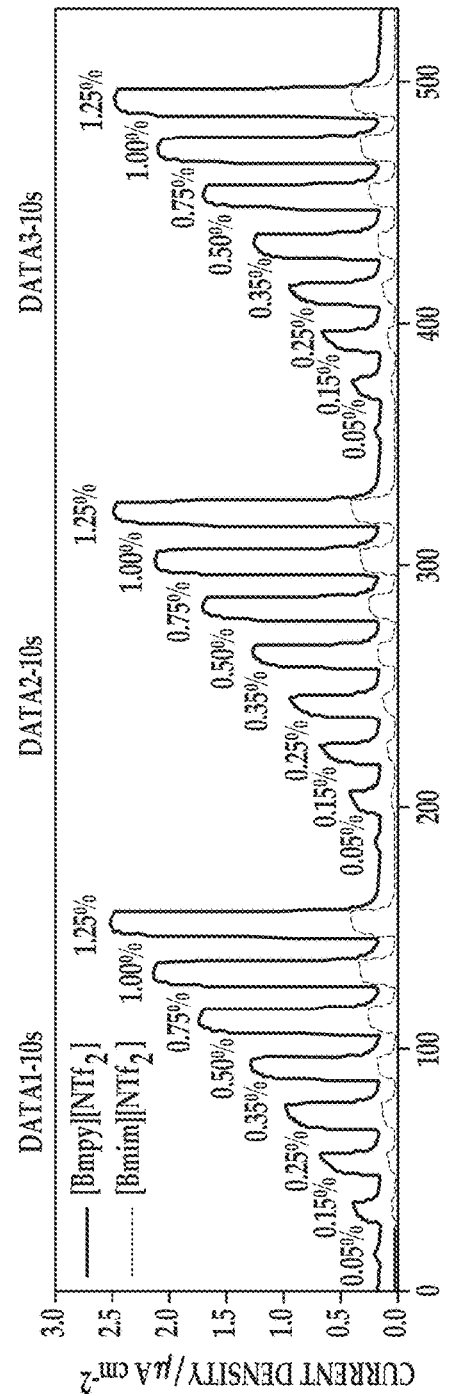
FIG. 15A includes three graphs (Data1-10s, Data2-10s, and Data3-10s) depicting the amperometric response of sensors with different ionic liquids ([Bmpy][NTf$_2$] and [Bmim][NTf$_2$]) over time in the presence of different and increasing concentrations of hydrogen in nitrogen gas in air (v/v) with 10 second on and off cycles.

The 10 second on and off cycles exhibited good sensitivity and precision, and thus three sets of data were collected at 10 second sampling times, denoted as Data1-10s, Data2-10s, and Data3-10s in FIG. 15. A sequence of current measurements was collected for the amperometric sensor from a sequential repeating experiment (repeating hydrogen concentration from low to high sequence for three times with 10 second sampling time) in two different ionic liquids (i.e., [Bmpy][NTf$_2$] and [Bmim][NTf$_2$]). These data sets were used for further analysis for the above three analytical strategies and statistical methods.

To demonstrate the existence of sensor signal drift, three linear regression models were trained on the data sets Data1-10s, Data2-10s, Data3-10s, respectively, from the sensors including [Bmpy][NTf$_2$], using the ratio of the difference of current to the square root of the difference of time $(\Delta i/(\Delta T)^{1/2})$ as a single feature, and the regression curves were plotted in FIG. 15B. From the results, there is a clear trend of model drift from Data1-10s, Data2-10s and Data3-10s, which were collected in sequential order.

The data analysis then focused on how to predict the concentration of hydrogen from the current measured, and how to model the sensor signal drift in order to improve the calibration accuracy. Data1-10s and Data2-10s were then used as training data to build a regression model, and the regression model was evaluated on Data3-10s. This was performed to determine whether taking into account the sensor signal drift would improve the prediction accuracy.

One statistical method (referred to as "Method 1") directly trained a single regression model using all examples in Data1-10s and Data2-10s. Method 1 does not model the sensor signal drift. Another statistical method (referred to as "Method 2") built a model for the Data3-10s data by using the model shift computed based on the models for Data1-10s and Data2-10s. In Method 2, two regression models were trained on Data1-10s and Data2-10s, respectively. The two regression models were denoted: $\hat{Y} = A_1 * X + B_1$ and $\hat{Y} = A_2 * X + B_2$, and from these, a model drift of $\Delta Y = \Delta A * X + \Delta B$, was computed, where $\Delta A = A_2 - A_1$, and $\Delta B = B_2 - B_1$. Then, the following prediction model was computed:

$$\hat{Y} = (A_2 + \Delta A) * X + (B_2 + \Delta B) \quad (12)$$

Method 2 considers the sensor signal drift. Still another statistical method (referred to as "Method 3") trained one model on Data3-10s. The data analysis for each of the Methods is summarized in Table 5 below.

TABLE 5

| Methods | Description | Training Data | Testing Data |
|---|---|---|---|
| Method 1 | Train one model on Data1-10s and Data2-10s and test on Data3-10s | Data1-10s, Data2-10s | Data3-10s |
| Method 2 | Train two models on Data1-10s and Data2-10s, compute a new model based on the difference between the two models and the model for Data2-10s | Data1-10s, Data2-10s | Data3-10s |
| Method 3 | Train one model on Data3-10s | Data3-10s | Data3-10s |

The previously mentioned three strategies were used with Methods 1 and 2 to calibrate the concentration of hydrogen by varying the input. The first strategy involved calibrating the concentration based on the summit of current (the value at or close to the current plateau, i.e., the limiting current). The second strategy involved calibrating the concentration based on change in current/change in time ($\Delta I/\Delta t$). The third strategy involved calibrating the concentration based on change in current/square root of change in time ($\Delta I/(\Delta t)^{1/2}$).

Strategy 1—Predicting Concentration Based on Summit of Current

Table 6 depicts the summit of the current for each of the sensors over the sensing period, thus for data sets 1-10s, 2-10s, and 3-10s.

TABLE 6

| Sensor w/[Bmim][NTf$_2$] | | | | Sensor w/[Bmpy][NTf$_2$] | | | |
|---|---|---|---|---|---|---|---|
| Dataset | Time of Summit | Current of Summit | H2 Conc. | Dataset | Time of Summit | Current of Summit | H2 Conc. |
| 1-10s | 16.2 | 0.0255 | 0.05 | 1-10s | 17 | 0.1956 | 0.05 |
| 1-10s | 37.8 | 0.0477 | 0.15 | 1-10s | 37.2 | 0.3936 | 0.15 |
| 1-10s | 57.6 | 0.085 | 0.25 | 1-10s | 57 | 0.6775 | 0.25 |
| 1-10s | 78.2 | 0.1315 | 0.35 | 1-10s | 77.6 | 0.9752 | 0.35 |
| 1-10s | 97.2 | 0.1753 | 0.50 | 1-10s | 94.8 | 1.2844 | 0.50 |
| 1-10s | 117.4 | 0.2564 | 0.75 | 1-10s | 112.6 | 1.7358 | 0.75 |
| 1-10s | 137.2 | 0.3323 | 1.00 | 1-10s | 133.2 | 2.1339 | 1.00 |
| 1-10s | 157.4 | 0.4106 | 1.25 | 1-10s | 153.6 | 2.5174 | 1.25 |
| 2-10s | 186.6 | 0.0261 | 0.05 | 2-10s | 187.2 | 0.1953 | 0.05 |
| 2-10s | 207.6 | 0.0516 | 0.15 | 2-10s | 207 | 0.4097 | 0.15 |
| 2-10s | 227.4 | 0.087 | 0.25 | 2-10s | 226.6 | 0.677 | 0.25 |
| 2-10s | 247.2 | 0.125 | 0.35 | 2-10s | 246.8 | 0.9404 | 0.35 |
| 2-10s | 267 | 0.1709 | 0.50 | 2-10s | 265.2 | 1.2578 | 0.50 |
| 2-10s | 287.2 | 0.247 | 0.75 | 2-10s | 283 | 1.7046 | 0.75 |
| 2-10s | 307.4 | 0.3251 | 1.00 | 2-10s | 303.2 | 2.1202 | 1.00 |
| 2-10s | 327 | 0.4034 | 1.25 | 2-10s | 323 | 2.489 | 1.25 |
| 3-10s | 357 | 0.0262 | 0.05 | 3-10s | 357.2 | 0.1915 | 0.05 |
| 3-10s | 378.2 | 0.0495 | 0.15 | 3-10s | 377.6 | 0.3926 | 0.15 |
| 3-10s | 397.6 | 0.0845 | 0.25 | 3-10s | 397 | 0.6602 | 0.25 |
| 3-10s | 416.8 | 0.1258 | 0.35 | 3-10s | 416.6 | 0.9431 | 0.35 |
| 3-10s | 437.6 | 0.1697 | 0.50 | 3-10s | 433.6 | 1.245 | 0.50 |
| 3-10s | 457.4 | 0.245 | 0.75 | 3-10s | 453.6 | 1.6899 | 0.75 |
| 3-10s | 477.4 | 0.3201 | 1.00 | 3-10s | 472.8 | 2.0917 | 1.00 |
| 3-10s | 497.6 | 0.4028 | 1.25 | 3-10s | 493.8 | 2.478 | 1.25 |

Linear regression was performed using Method 1 and the summit of current as the current input. While the linear regression plots are not shown, Table 7 illustrates the regression line and the prediction error (mean square error) calculated using Method 1 and the summit of current for each sensor.

TABLE 7

| | Sensor w/[Bmim][NTf$_2$] | | Sensor w/[Bmpy][NTf$_2$] | |
|---|---|---|---|---|
| | Regression Line | MSE | Regression Line | MSE |
| Method 1 | 3.114 x − 0.02694 | 0.000513682038471 | 0.512 x − 0.09311 | 0.00173651526452 |

Predictions of the $H_2$ concentration for Data3-10s were calculated from the learned model based on Method 1 and Strategy 1. These predicted values and the actual (true) $H_2$ concentrations are shown in Table 8.

TABLE 8

| | Sensor w/[Bmim][NTf$_2$] | | | | | | | |
|---|---|---|---|---|---|---|---|---|
| True $H_2$ conc. | 0.05 | 0.15 | 0.25 | 0.35 | 0.50 | 0.75 | 1.00 | 1.25 |
| Predict | 0.05464081 | 0.12719034 | 0.23617033 | 0.36476672 | 0.50145876 | 0.73592142 | 0.96976134 | 1.22726549 |
| MSE | | | | 0.000322837782969 | | | | |
| | Sensor w/[Bmpy][NTf$_2$] | | | | | | | |
| True $H_2$ conc. | 0.05 | 0.15 | 0.25 | 0.35 | 0.50 | 0.75 | 1.00 | 1.25 |
| Predict | 0.00493676 | 0.10789502 | 0.24489964 | 0.38973749 | 0.54430287 | 0.77208074 | 0.97779247 | 1.17556857 |
| MSE | | | | 0.00173651526452 | | | | |

Linear regression was performed using Method 2 and the summit of current as the current input. While the linear regression plots are not shown, Table 9 illustrates the regression line and the prediction error (mean square error) calculated using Method 2 and the summit of current for each sensor.

TABLE 9

| | Sensor w/[Bmim][NTf$_2$] | | Sensor w/[Bmpy][NTf$_2$] | |
|---|---|---|---|---|
| | Regression Line | MSE | Regression Line | MSE |
| Line of Data 1-10s (L1) | 3.07 x − 0.02439 | 0.000299844073692 | 0.5081 x − 0.09216 | 0.0019669467231 |
| Line of Data 2-10s (L2) | 3.161 x − 0.03001 | 8.49128961403e−05 | 0.516 x − 0.09424 | 0.00156432547642 |
| Difference (Δ = L2 − L1) | 0.09157559 x − 0.00561781 | NA | 0.00789315 x − 0.00207931 | NA |
| Learned Reg. Model (L2 + Δ) | 3.253 x − 0.03563 | 0.000289559547429 | 0.5239 x − 0.09632 | 0.00162685361816 |

Predictions of the $H_2$ concentration for Data3-10s were calculated from the learned model based on Method 2 and Strategy 1. These predicted values and the actual (true) $H_2$ concentrations are shown in Table 10.

TABLE 10

| | Sensor w/[Bmim][NTf$_2$] | | | | | | | |
|---|---|---|---|---|---|---|---|---|
| True $H_2$ conc. | 0.05 | 0.15 | 0.25 | 0.35 | 0.50 | 0.75 | 1.00 | 1.25 |
| Predict | 0.04959835 | 0.12539283 | 0.2392472 | 0.37359536 | 0.51640127 | 0.76135081 | 1.00564976 | 1.27467137 |
| MSE | | | | 0.000289559547429 | | | | |
| | Sensor w/[Bmpy][NTf$_2$] | | | | | | | |
| True $H_2$ conc. | 0.05 | 0.15 | 0.25 | 0.35 | 0.50 | 0.75 | 1.00 | 1.25 |
| Predict | 0.00400714 | 0.10936713 | 0.24956769 | 0.39778421 | 0.55595518 | 0.78904648 | 0.99955689 | 1.20194657 |
| MSE | | | | 0.00162685361816 | | | | |

Linear regression was performed using Method 3 and the summit of current as the current input. This graph is not shown. Predictions of the $H_2$ concentration for Data3-10s were calculated from the learned model based on Method 3 and Strategy 1. These predicted values and the actual (true) $H_2$ concentrations are shown in Table 11.

TABLE 11

| | Sensor w/[Bmim][NTf$_2$] | | | | | | | |
|---|---|---|---|---|---|---|---|---|
| True H$_2$ conc. | 0.05 | 0.15 | 0.25 | 0.35 | 0.50 | 0.75 | 1.00 | 1.25 |
| Predict | 0.05584102 | 0.12979591 | 0.24088694 | 0.37197436 | 0.51131426 | 0.75031868 | 0.98868829 | 1.25118053 |
| MSE | | | | 0.000158213183815 | | | | |
| | Sensor w/[Bmpy][NTf$_2$] | | | | | | | |
| True H$_2$ conc. | 0.05 | 0.15 | 0.25 | 0.35 | 0.50 | 0.75 | 1.00 | 1.25 |
| Predict | 0.00894742 | 0.11315519 | 0.25182251 | 0.39841813 | 0.55485932 | 0.78540152 | 0.99360978 | 1.19378612 |
| MSE | | | | 0.00160676742425 | | | | |

Table 12 compares the regression model and the mean square error for each of Methods 1, 2, and 3 using Strategy 1. FIGS. 16A and 16B respectively depict, for the sensor with [Bmpy][NTf2] and for the sensor with [Bmim][NTf$_2$], the regression lines for each of the method/strategy 1 combinations.

TABLE 12

| | Method 1/ Strategy 1 | Method 2/ Strategy 1 | Method 3/ Strategy 1 |
|---|---|---|---|
| | Sensor w/[Bmim][NTf$_2$] | | |
| Regression Line | 3.114 x − 0.02694 | 3.253 x − 0.03563 | 3.174 x − 0.02732 |
| MSE | 0.000513682038471 | 0.000289559547429 | 0.000158213183815 |
| Regression Line | 0.512 x − 0.09311 | 0.5239 x − 0.09632 | 0.5182 x − 0.09029 |
| MSE | 0.00173651526452 | 0.00162685361816 | 0.00160676742425 |

From the comparison in Table 12 and FIGS. 16A and 16B, it is clear that Method 2 is better than Method 1 when using summit of current as the input current data, indicating that considering the model shifting is better for predicting the hydrogen concentration. It is noted that Method 3 has the best performance because it directly trains the model on Data3-10s.

Strategy 2— Predicting Concentration Based on ΔCurrent/ΔTime Ratio

Table 13 depicts the data for computing the slopes (ΔI/Δt) for each of the sensors over the sensing period, thus for data sets 1-10s, 2-10s, and 3-10s.

TABLE 13

| Sensor w/[Bmim][NTf$_2$] | | Sensor w/[Bmpy][NTf$_2$] | |
|---|---|---|---|
| slope | Points (time, current) used for calculation | slope | Points (time, current) used for calculation |
| Slopes - Data1-10s | | Slopes - Data1-10s | |
| 0.002188 | (13.6, 0.0205) (13.8, 0.0209) | 0.01685 | (12.4, 0.1545) (12.6, 0.1549) |
| | (14.0, 0.0207) (14.2, 0.0216) | | (12.8, 0.1551) (13.0, 0.1593) |
| | (14.4, 0.0211) (14.6, 0.0228) | | (13.2, 0.1648) (13.4, 0.1692) |
| | (14.8, 0.0231) (15.0, 0.0233) | | (13.6, 0.1730) (13.8, 0.1763) |
| | (15.2, 0.0232) (15.4, 0.0246) | | (14.0, 0.1781) (14.2, 0.1814) |
| 0.007942 | (29.2, 0.0178) (29.4, 0.0179) | 0.07877 | (28.6, 0.1464) (28.8, 0.1501) |
| | (29.6, 0.0188) (29.8, 0.0209) | | (29.0, 0.1601) (29.2, 0.1750) |
| | (30.0, 0.0221) (30.2, 0.0241) | | (29.4, 0.1918) (29.6, 0.2117) |
| | (30.4, 0.0255) (30.6, 0.0279) | | (29.8, 0.2306) (30.0, 0.2491) |
| | (30.8, 0.0300) (31.0, 0.0307) | | (30.2, 0.2638) (30.4, 0.2766) |
| 0.001442 | (47.4, 0.0197) (47.6, 0.0200) | 0.2012 | (48.2, 0.1547) (48.4, 0.1673) |
| | (47.8, 0.0199) (48.0, 0.0199) | | (48.6, 0.2006) (48.8, 0.2548) |
| | (48.2, 0.0202) (48.4, 0.0192) | | (49.0, 0.3036) (49.2, 0.3544) |
| | (48.6, 0.0194) (48.8, 0.0198) | | (49.4, 0.3985) (49.6, 0.4311) |
| | (49.0, 0.0217) (49.2, 0.0240) | | (49.8, 0.4606) (50.0, 0.4828) |
| 0.02129 | (66.8, 0.0223) (67.0, 0.0226) | 0.3798 | (66.8, 0.1638) (67.0, 0.1684) |
| | (67.2, 0.0224) (67.4, 0.0225) | | (67.2, 0.2049) (67.4, 0.2934) |
| | (67.6, 0.0231) (67.8, 0.0270) | | (67.6, 0.4046) (67.8, 0.5103) |
| | (68.0, 0.0342) (68.2, 0.0434) | | (68.0, 0.6035) (68.2, 0.6695) |
| | (68.4, 0.0525) (68.6, 0.0611) | | (68.4, 0.7217) (68.6, 0.7528) |

TABLE 13-continued

| | Sensor w/[Bmim][NTf$_2$] | | Sensor w/[Bmpy][NTf$_2$] |
|---|---|---|---|
| slope | Points (time, current) used for calculation | slope | Points (time, current) used for calculation |
| 0.06357 | (87.8, 0.0235) (88.0, 0.0245) (88.2, 0.0296) (88.4, 0.0402) (88.6, 0.0565) (88.8, 0.0727) (89.0, 0.0898) (89.2, 0.1046) (89.4, 0.1163) (89.6, 0.1252) | 0.5921 | (87.4, 0.1686) (87.6, 0.2034) (87.8, 0.3380) (88.0, 0.5373) (88.2, 0.7361) (88.4, 0.8825) (88.6, 0.9789) (88.8, 1.0394) (89.0, 1.0789) (89.2, 1.1055) |
| 0.09939 | (107.0, 0.0233) (107.2, 0.0254) (107.4, 0.0391) (107.6, 0.0613) (107.8, 0.0896) (108.0, 0.1190) (108.2, 0.1412) (108.4, 0.1575) (108.6, 0.1696) (108.8, 0.1799) | 0.8304 | (106.6, 0.1724) (106.8, 0.2619) (107.0, 0.5463) (107.2, 0.9082) (107.4, 1.1725) (107.6, 1.3248) (107.8, 1.4119) (108.0, 1.4661) (108.2, 1.5128) (108.4, 1.5486) |
| 0.1359 | (126.6, 0.0260) (126.8, 0.0377) (127.0, 0.0669) (127.2, 0.1066) (127.4, 0.1454) (127.6, 0.1737) (127.8, 0.1964) (128.0, 0.2183) (128.2, 0.2370) (128.4, 0.2522) | 0.9715 | (126.2, 0.2044) (126.4, 0.4832) (126.6, 1.0009) (126.8, 1.4119) (127.0, 1.6330) (127.2, 1.7541) (127.4, 1.8358) (127.6, 1.8963) (127.8, 1.9394) (128.0, 1.9817) |
| 0.1697 | (147.0, 0.0264) (147.2, 0.0305) (147.4, 0.0522) (147.6, 0.0944) (147.8, 0.1445) (148.0, 0.1838) (148.2, 0.2208) (148.4, 0.2539) (148.6, 0.2788) (148.8, 0.2968) | 1.307 | (146.6, 0.1734) (146.8, 0.2432) (147.0, 0.6928) (147.2, 1.3404) (147.4, 1.7459) (147.6, 1.9550) (147.8, 2.0844) (148.0, 2.1725) (148.2, 2.2523) (148.4, 2.3101) |
| | Slopes - Data2-10s | | Slopes - Data2-10s |
| 0.002203 | (182.8, 0.0194) (183.0, 0.0202) (183.2, 0.0200) (183.4, 0.0209) (183.6, 0.0206) (183.8, 0.0217) (184.0, 0.0218) (184.2, 0.0227) (184.4, 0.0231) (184.6, 0.0233) | 0.01284 | (181.8, 0.1527) (182.0, 0.1524) (182.2, 0.1523) (182.4, 0.1521) (182.6, 0.1535) (182.8, 0.1558) (183.0, 0.1619) (183.2, 0.1667) (183.4, 0.1710) (183.6, 0.1738) |
| 0.007103 | (197.8, 0.0197) (198.0, 0.0194) (198.2, 0.0202) (198.4, 0.0210) (198.6, 0.0221) (198.8, 0.0244) (199.0, 0.0263) (199.2, 0.0279) (199.4, 0.0291) (199.6, 0.0319) | 0.07856 | (197.2, 0.1463) (197.4, 0.1467) (197.6, 0.1511) (197.8, 0.1628) (198.0, 0.1796) (198.2, 0.1983) (198.4, 0.2206) (198.6, 0.2409) (198.8, 0.2604) (199.0, 0.2747) |
| 0.01856 | (218.4, 0.0222) (218.6, 0.0213) (218.8, 0.0228) (219.0, 0.0254) (219.2, 0.0288) (219.4, 0.0338) (219.6, 0.0389) (219.8, 0.0439) (220.0, 0.0489) (220.2, 0.0520) | 0.1724 | (217.6, 0.1525) (217.8, 0.1520) (218.0, 0.1523) (218.2, 0.1616) (218.4, 0.1894) (218.6, 0.2422) (218.8, 0.2953) (219.0, 0.3494) (219.2, 0.3964) (219.4, 0.4345) |
| 0.03053 | (238.0, 0.0221) (238.2, 0.0220) (238.4, 0.0221) (238.6, 0.0252) (238.8, 0.0304) (239.0, 0.0378) (239.2, 0.0478) (239.4, 0.0567) (239.6, 0.0653) (239.8, 0.0728) | 0.3669 | (237.8, 0.1591) (238.0, 0.1784) (238.2, 0.2467) (238.4, 0.3461) (238.6, 0.4522) (238.8, 0.5449) (239.0, 0.6227) (239.2, 0.6768) (239.4, 0.7178) (239.6, 0.7434) |
| 0.01185 | (256.8, 0.0244) (257.0, 0.0241) (257.2, 0.0243) (257.4, 0.0241) (257.6, 0.0247) (257.8, 0.0245) 258.0, 0.0248) 258.2, 0.0297) (258.4, 0.0387) (258.6, 0.0533) | 0.5798 | (257.2, 0.1616) (257.4, 0.1623) (257.6, 0.1872) (257.8, 0.3038) (258.0, 0.4929) (258.2, 0.6851) (258.4, 0.8345) (258.6, 0.9321) (258.8, 0.9908) (259.0, 1.0312) |
| 0.01789 | (276.4, 0.0241) (276.6, 0.0235) (276.8, 0.0238) (277.0, 0.0234) (277.2, 0.0237) (277.4, 0.0243) (277.6, 0.0247) (277.8, 0.0287) (278.0, 0.0452) (278.2, 0.0696) | 0.7766 | (277.2, 0.1773) (277.4, 0.3225) (277.6, 0.6492) (277.8, 0.9798) (278.0, 1.1991) (278.2, 1.3239) (278.4, 1.3963) (278.6, 1.4468) (278.8, 1.4862) (279.0, 1.5239) |
| 0.1328 | (296.4, 0.0242) (296.6, 0.0286) (296.8, 0.0500) (297.0, 0.0844) (297.2, 0.1252) (297.4, 0.1580) (297.6, 0.1817) (297.8, 0.2035) (298.0, 0.2228) (298.2, 0.2388) | 1.149 | (295.8, 0.1688) (296.0, 0.1729) (296.2, 0.2957) (296.4, 0.7296) (296.6, 1.2193) (296.8, 1.5239) (297.0, 1.6789) (297.2, 1.7807) (297.4, 1.8495) (297.6, 1.9028) |
| 0.1679 | (316.8, 0.0263) (317.0, 0.0383) (317.2, 0.0715) (317.4, 0.1204) (317.6, 0.1645) (317.8, 0.2010) (318.0, 0.2364) (318.2, 0.2646) (318.4, 0.2846) (318.6, 0.3004) | 1.2 | (316.4, 0.1812) (316.6, 0.4120) (316.8, 1.0303) (317.0, 1.5661) (317.2, 1.8532) (317.4, 2.0064) (317.6, 2.1119) (317.8, 2.1872) (318.0, 2.2569) (318.2, 2.3064) |
| | Slopes - Data3-10s | | Slopes - Data3-10s |
| 0.002212 | (353.4, 0.0202) (353.6, 0.0198) (353.8, 0.0210) (354.0, 0.0210) (354.2, 0.0214) (354.4, 0.0221) (354.6, 0.0222) (354.8, 0.0231) (355.0, 0.0231) (355.2, 0.0241) | 0.01688 | (352.6, 0.1498) (352.8, 0.1533) (353.0, 0.1590) (353.2, 0.1634) (353.4, 0.1681) (353.6, 0.1713) (353.8, 0.1737) (354.0, 0.1757) (354.2, 0.1775) (354.4, 0.1798) |
| 0.003824 | (368.6, 0.0196) (368.8, 0.0194) (369.0, 0.0192) (369.2, 0.0199) (369.4, 0.0193) (369.6, 0.0208) (369.8, 0.0212) (370.0, 0.0233) (370.2, 0.0246) (370.4, 0.0267) | 0.07607 | (368.6, 0.1416) (368.8, 0.1414) (369.0, 0.1473) (369.2, 0.1591) (369.4, 0.1751) (369.6, 0.1933) (369.8, 0.2133) (370.0, 0.2336) (370.2, 0.2522) (370.4, 0.2663) |

TABLE 13-continued

| | Sensor w/[Bmim][NTf$_2$] | | Sensor w/[Bmpy][NTf$_2$] |
|---|---|---|---|
| slope | Points (time, current) used for calculation | slope | Points (time, current) used for calculation |
| 6.97e−05 | (386.4, 0.0220) (386.6, 0.0222) (386.8, 0.0221) (387.0, 0.0223) (387.2, 0.0218) (387.4, 0.0221) (387.6, 0.0222) (387.8, 0.0221) (388.0, 0.0224) (388.2, 0.0221) | 0.1993 | (388.2, 0.1493) (388.4, 0.1544) (388.6, 0.1761) (388.8, 0.2184) (389.0, 0.2748) (389.2, 0.3222) (389.4, 0.3727) (389.6, 0.4103) (389.8, 0.4431) (390.0, 0.4686) |
| 0.038 | (408.2, 0.0246) (408.4, 0.0296) (408.6, 0.0367) (408.8, 0.0455) (409.0, 0.0554) (409.2, 0.0642) (409.4, 0.0718) (409.6, 0.0783) (409.8, 0.0841) (410.0, 0.0887) | 0.3724 | (407.4, 0.1570) (407.6, 0.1660) (407.8, 0.2114) (408.0, 0.3031) (408.2, 0.4136) (408.4, 0.5145) (408.6, 0.6016) (408.8, 0.6625) (409.0, 0.7088) (409.2, 0.7391) |
| 0.06288 | (427.2, 0.0244) (427.4, 0.0300) (427.6, 0.0416) (427.8, 0.0564) (428.0, 0.0722) (428.2, 0.0876) (428.4, 0.1011) (428.6, 0.1123) (428.8, 0.1215) (429.0, 0.1279) | 0.5638 | (426.6, 0.1642) (426.8, 0.2052) (427.0, 0.3465) (427.2, 0.5417) (427.4, 0.7275) (427.6, 0.8628) (427.8, 0.9495) (428.0, 1.0018) (428.2, 1.0404) (428.4, 1.0670) |
| 0.09494 | (447.8, 0.0225) (448.0, 0.0260) (448.2, 0.0377) (448.4, 0.0594) (448.6, 0.0865) (448.8, 0.1132) (449.0, 0.1351) (449.2, 0.1508) (449.4, 0.1633) (449.6, 0.1728) | 0.7992 | (447.4, 0.1663) (447.6, 0.2496) (447.8, 0.5219) (448.0, 0.8703) (448.2, 1.1229) (448.4, 1.2688) (448.6, 1.3550) (448.8, 1.4119) (449.0, 1.4523) (449.2, 1.4890) |
| 0.09942 | (466.2, 0.0236) (466.4, 0.0234) (466.6, 0.0236) (466.8, 0.0246) (467.0, 0.0354) (467.2, 0.0613) (467.4, 0.0982) (467.6, 0.1371) (467.8, 0.1652) (468.0, 0.1874) | 1.101 | (466.2, 0.1671) (466.4, 0.1874) (466.6, 0.4201) (466.8, 0.9114) (467.0, 1.3303) (467.2, 1.5624) (467.4, 1.6853) (467.6, 1.7743) (467.8, 1.8367) (468.0, 1.8862) |
| 0.1637 | (486.0, 0.0258) (486.2, 0.0266) (486.4, 0.0376) (486.6, 0.0689) (486.8, 0.1183) (487.0, 0.1623) (487.2, 0.1992) (487.4, 0.2349) (487.6, 0.2633) (487.8, 0.2839) | 1.205 | (485.8, 0.1783) (486.0, 0.3850) (486.2, 0.9862) (486.4, 1.5385) (486.6, 1.8367) (486.8, 1.9945) (487.0, 2.1000) (487.2, 2.1734) (487.4, 2.2413) (487.6, 2.2890) |

Table 14 illustrates the regression model and the training prediction error (mean square error) calculated for each raw data set. The raw data analysis using strategy 2 did not result in a clear trend.

TABLE 14

| Data Set | Regression Model | Training MSE |
|---|---|---|
| | Sensor w/[Bmim][NTf$_2$] | |
| Data1-1 (slopes from Data1-10s) | 0.1523 x − 0.01917 | 9.36478985164e−05 |
| Data1-2 (slopes from Data2-10s) | 0.1331 x − 0.02293 | 0.000769829902492 |
| Data1-3 (slopes from Data3-10s) | 0.134 x − 0.01391 | 0.000149442267282 |
| Data1-1 (slopes from Data1-10s) | 1.073 x − 0.02965 | 0.00260844493763 |
| Data1-2 (slopes from Data2-10s) | 1.079 x − 0.03806 | 0.00455185533992 |
| Data1-3 (slopes from Data3-10s) | 1.061 x − 0.02866 | 0.00293103574298 |

Strategy 3—Predicting Concentration Based on Current/Square Root of Time

Table 15 depicts the calculated current/square root of time for each of the sensors over the sensing period, thus for data sets 1-10s, 2-10s, and 3-10s.

TABLE 15

| Sensor w/[Bmim][NTf$_2$] | | Sensor w/[Bmpy][NTf$_2$] | |
|---|---|---|---|
| Dataset | ΔCurrent/√Δtime | Dataset | ΔCurrent/√Δtime |
| 1-10s | 0.01664 | 1-10s | 0.1228 |
| 1-10s | 0.08711 | 1-10s | 0.8553 |
| 1-10s | 0.02 | 1-10s | 2.82 |
| 1-10s | 0.35 | 1-10s | 6.25 |
| 1-10s | 1.197 | 1-10s | 11.13 |
| 1-10s | 2.065 | 1-10s | 17.23 |
| 1-10s | 3.07 | 1-10s | 21.91 |
| 1-10s | 4.127 | 1-10s | 31.76 |
| 2-10s | 0.05972 | 2-10s | 0.3471 |
| 2-10s | 0.2002 | 2-10s | 2.211 |
| 2-10s | 0.5496 | 2-10s | 5.095 |
| 2-10s | 0.9437 | 2-10s | 11.34 |
| 2-10s | 0.3805 | 2-10s | 18.63 |
| 2-10s | 0.5956 | 2-10s | 25.91 |
| 2-10s | 4.58 | 2-10s | 39.59 |
| 2-10s | 5.986 | 2-10s | 42.77 |
| 3-10s | 0.08327 | 3-10s | 0.6347 |
| 3-10s | 0.147 | 3-10s | 2.924 |
| 3-10s | 0.002743 | 3-10s | 7.861 |
| 3-10s | 1.537 | 3-10s | 15.05 |
| 3-10s | 2.602 | 3-10s | 23.32 |
| 3-10s | 4.022 | 3-10s | 33.85 |
| 3-10s | 4.297 | 3-10s | 47.61 |
| 3-10s | 7.223 | 3-10s | 53.18 |

Linear regression for each raw data set was performed using ΔI/√Δt as the current input. These plots, based on strategy 3, are shown in FIGS. 18A and 18B for the sensor including [Bmpy][NTf$_2$] and [Bmim][NTf$_2$], respectively. Table 16 illustrates the regression model and the prediction error (mean square error) calculated each data set.

TABLE 16

| Data Set | Regression Model | MSE |
|---|---|---|
| Sensor w/[Bmim][NTf$_2$] | | |
| Data1-1 ($\Delta$I/$\sqrt{\Delta t}$ from Data1-10s) | 3.644 x − 0.5918 | 0.0542564140514 |
| Data1-2 ($\Delta$I/$\sqrt{\Delta t}$ from Data2-10s) | 4.753 x − 0.8927 | 0.959421576454 |
| Data1-3 ($\Delta$I/$\sqrt{\Delta t}$ from Data3-10s) | 5.892 x − 0.6774 | 0.273869786943 |
| Data1-1 ($\Delta$I/$\sqrt{\Delta t}$ from Data1-10s) | 26.4 x − 2.683 | 1.17738026329 |

TABLE 16-continued

| Data Set | Regression Model | MSE |
|---|---|---|
| Data1-2 ($\Delta$I/$\sqrt{\Delta t}$ from Data2-10s) | 38.45 x − 2.43 | 3.8760239067 |
| Data1-3 ($\Delta$I/$\sqrt{\Delta t}$ from Data3-10s) | 46.87 x − 2.141 | 3.92367549064 |

Linear regression was then performed using Method 1 (trained a single regression model using all examples in Data1-10s and Data2-10s) and the $\Delta$I/$\sqrt{\Delta t}$ as the current input. The regression model and prediction error using Method 1 are shown in Table 17.

TABLE 17

| | Sensor w/[Bmim][NTf$_2$] | | Sensor w/[Bmpy][NTf$_2$] | |
|---|---|---|---|---|
| | Regression Line | MSE | Regression Line | MSE |
| Method 1 | 4.198 x − 0.7423 | 1.15523590327 | 32.43 x − 2.556 | 39.2278721202 |

Predictions of the $\Delta$I/$\sqrt{\Delta t}$ for Data3-10s were calculated from the learned model based on Method 1 and Strategy 3. These predicted values and the actual $\Delta$I/$\sqrt{\Delta t}$ are shown in Table 18.

TABLE 18

| Sensor w/[Bmim][NTf$_2$] | | | | | | | | |
|---|---|---|---|---|---|---|---|---|
| $\Delta$I/$\sqrt{\Delta t}$ of 3-10s | 0.08327 | 0.147 | 0.002743 | 1.537 | 2.602 | 4.022 | 4.297 | 7.223 |
| Predict | −0.5323791 | −0.11255685 | 0.3072654 | 0.72708765 | 1.35682103 | 2.40637666 | 3.45593229 | 4.50548792 |
| MSE | | | | 1.68100771341 | | | | |
| Sensor w/[Bmpy][NTf$_2$] | | | | | | | | |
| $\Delta$I/$\sqrt{\Delta t}$ of 3-10s | 0.6347 | 2.924 | 7.861 | 15.05 | 23.32 | 33.85 | 47.61 | 53.18 |
| Predict | −0.93474961 | 2.30790672 | 5.55056305 | 8.79321938 | 13.65720388 | 21.7638447 | 29.87048553 | 37.97712635 |
| MSE | | | | 104.073835686 | | | | |

Linear regression was performed using Method 2 and the $\Delta$I/$\sqrt{\Delta t}$ as the current input. While the linear regression plots are not shown, Table 19 illustrates the regression line and the prediction error (mean square error) calculated using Method 2 and the $\Delta$I/$\sqrt{\Delta t}$ for each sensor.

TABLE 19

| | Sensor w/[Bmim][NTf$_2$] | | Sensor w/[Bmpy][NTf$_2$] | |
|---|---|---|---|---|
| | Regression Line | MSE | Regression Line | MSE |
| Line of Data 1-10s (L1) | 3.644 x − 0.5918 | 0.0542564140514 | 26.4 x − 2.683 | 1.17738026329 |
| Line of Data 2-10s (L2) | 4.753 x − 0.8927 | 0.959421576454 | 38.45 x − 2.43 | 3.8760239067 |
| Difference ($\Delta$ = L2 − L1) | 1.109 x + 0.3009 | NA | 12.04 x + 0.2529 | NA |
| Predicted Line of Data 3-10s = (L2 + $\Delta$) | 5.862 x − 1.194 | 0.557048220066 | 50.49 x − 2.177 | 9.65781710694 |
| Line of Data 3-10s | 5.892 x − 0.6774 | 0.273869786943 | 46.87 x − 2.141 | 3.92367549064 |

Predictions of the ΔI/√Δt for Data3-10s were calculated from the learned model based on Method 2 and Strategy 3. These predicted values and the actual ΔI/√Δt are shown in Table 20.

TABLE 20

| | | | | | | | | |
|---|---|---|---|---|---|---|---|---|
| Sensor w/[Bmim][NTf$_2$] | | | | | | | | |
| ΔI/√Δt of 3-10s | 0.08327 | 0.147 | 0.002743 | 1.537 | 2.602 | 4.022 | 4.297 | 7.223 |
| Predict | −0.90052133 | −0.31431465 | 0.27189204 | 0.85809872 | 1.73740874 | 3.20292545 | 4.66844216 | 6.13395887 |
| MSE | | | | 0.557048220066 | | | | |
| Sensor w/[Bmpy][NTf$_2$] | | | | | | | | |
| ΔI/√Δt of 3-10s | 0.6347 | 2.924 | 7.861 | 15.05 | 23.32 | 33.85 | 47.61 | 53.18 |
| Predict | 0.34797885 | 5.39731909 | 10.44665932 | 15.49599956 | 23.07000991 | 35.6933605 | 48.31671109 | 60.94006168 |
| MSE | | | | 9.65781710694 | | | | |

Table 21 compares the regression model and the mean square error for each of Methods 1, 2, and 3 using Strategy 3.

TABLE 21

| | Method 1/ Strategy 3 | Method 2/ Strategy 3 | Method 3/ Strategy 3 |
|---|---|---|---|
| Sensor w/[Bmim][NTf$_2$] | | | |
| Regression Line | 4.198 x − 0.7423 | 5.862 x − 1.194 | 5.892 x − 0.6774 |
| MSE | 1.15523590327 | 0.557048220066 | 0.273869786943 |
| Regression Line | 32.43 x − 2.556 | 50.49 x − 2.177 | 46.87 x − 2.141 |
| MSE | 39.2278721202 | 9.65781710694 | 3.92367549064 |

From the comparison in Table 21, it is clear that Method 2 is better than Method 1 when ΔI/√Δt as the input current data, indicating that considering the model shifting is better for predicting the hydrogen concentration. It is noted that Method 3 has the best performance because it directly trains the model on Data3-10s.

As can be seen from the quantitative data, the mean square error for prediction performance of the two learned models (Method 1 vs. Method 2) on the Data3-10s is lower when signal drift is taken into account (Method 2). By modeling the signal drift, the performance of predicting the absolute concentration of $H_2$ is dramatically improved.

Example 2

In this example, multiple gas sensing was performed with a mixture of two gases or four gases.

Two Gases—Hydrogen and Oxygen

For sensing the two gases, an example of the array disclosed herein similar to the example shown in FIG. 1C was used. The array included four sensors arranged in series, with the analyte gas first entering the first sensor, and then the second sensor, and then the third sensor, and then the fourth sensor. Each sensor included a platinum working electrode, a platinum reference electrode, and a platinum counter electrode, which were arranged using a Clark type cell as described herein. Each sensor also included 1-butyl-1-methylpyrrolidinium bis(trifluoromethylsulfonyl)imide as the ionic liquid electrolyte.

The applied DC potential input at each sensor was different, sensor 1=−1.2V, sensor 2=−0.8V, sensor 3=0.4V, and sensor 4=1.0V. 0.4V was selected based on the hydrogen sensing potential identified in Example 1.

In an air environment (which contains oxygen), hydrogen gas was introduced to each of the sensors (i.e., flowed from one sensor to the next). The introduced hydrogen gas concentration ranged from 0.0% to about 2.5%, and was increased in 0.5% increments. After a certain time period, the hydrogen gas was turned off and the air environment was switched to a nitrogen environment (i.e., nitrogen gas was flowed through the sensors). Then, hydrogen gas was again introduced to the sensors. The introduced hydrogen concentration ranged from 0.0% to about 2.5%, and was increased in 0.5% increments.

Figure 19:
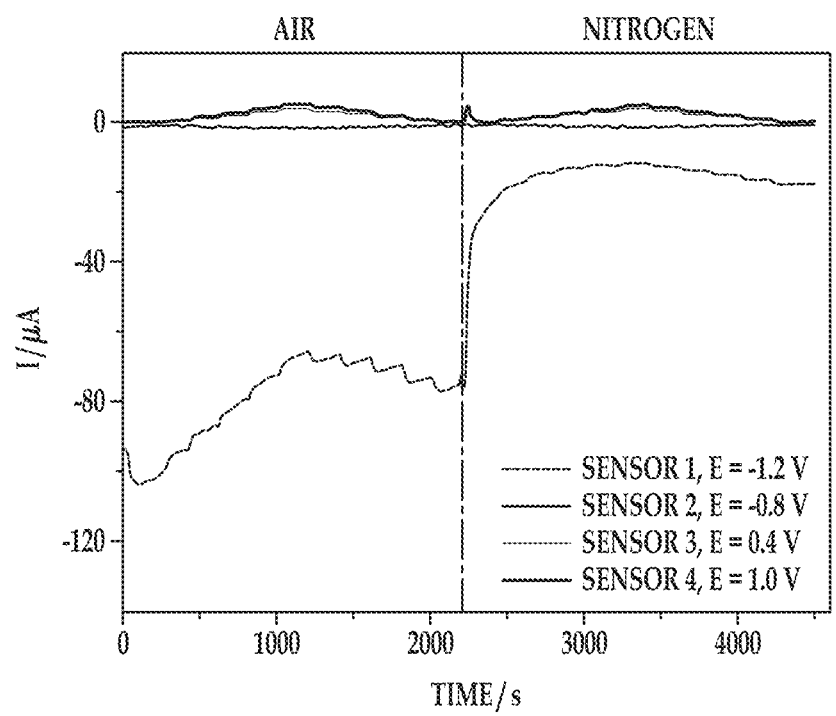
FIG. 19 is a graph depicting the amperometric response of four different sensors with [Bmpy][NTf$_2$] and with four different applied potentials in the presence of different and increasing concentrations of hydrogen in air (v/v) or nitrogen (v/v)

The results are shown in FIG. 19 as current density over time. As illustrated, sensor 3, set at the anodic potential 0.4V, responded to the variation in hydrogen concentration due to hydrogen oxidation. Sensor 1 set at the cathodic potential of −1.2V also exhibited a signal change in the air environment, due to oxygen reduction. The results in air are illustrative of the following hydrogen and oxygen coupling reactions:

$$Pt + \tfrac{1}{2}H_2 \leftrightarrow Pt\text{---}H^\cdot \qquad (13)$$

$$Pt\text{---}H^\cdot + O_2 \leftrightarrow Pt\text{---}HO_2^\cdot \qquad (5)$$

$$Pt\text{---}HO_2^\cdot - e^- \leftrightarrow O_2 + H^+ \qquad (7)$$

As described in Example 1, the hydrogen-oxygen coupling reactions depend on the hydrogen concentration, and thus the concentration of the hydrogen gas can be determined from the results in aerobic and anaerobic conditions. The results shown in FIG. 19 indicate that the reversibility of the sensing system is good, in terms of sensing sensitivity values of hydrogen concentration when ramping up (1.613 μA/%) and ramping down (1.580 μA/%).

Sensor 4 was set at the anodic potential 1.0V to detect methane. However, at this potential and in the absence of methane, the platinum electrode can be oxidized. This oxidation may explain the current shown in FIG. 19 for sensor 4. In the presence of methane, the current should be a little higher, as it contains the methane oxidation current and the platinum oxidization current.

Four Gases—Hydrogen, Oxygen, Sulfur Dioxide and Methane

For sensing the four gases, the first three sensors included the previously described Clark type cell assembly with stacks of platinum working, reference, and counter electrodes, and the fourth sensor was a commercialized KWJ cell with a planar structure and a platinum black working electrode. Each sensor also included 1-butyl-1-methylpyrrolidinium bis(trifluoromethylsulfonyl)imide as the ionic liquid electrolyte.

The applied DC potential input at each sensor was different, and depended upon the gas to be sensed by that sensor. In particular, the applied DC potentials were: sensor 1=−1.2V (oxygen), sensor 2=−1.5V (sulfur dioxide), sensor 3=0.4V (hydrogen), and sensor 4=−1.2V (oxygen). The potential of sensor 4 was set the same as sensor 1 to test the different geometries and compare the parallel sensing.

Due to the results with regard to hydrogen sensing set forth in Example 1, hydrogen was used as the reference gas, and thus acted as the internal standard. The four sensors were set to operate simultaneously and obtain the sensing signal of a fixed concentration of each gas component (added one after the other) in the mixture gas. A total of six repetitive loops were conducted in series. Each repetitive loop started from a nitrogen environment, and then hydrogen (3%) was introduced. Each of the target gases was then introduced one after the other at the set concentration in the order of oxygen (21%), methane (2%), and sulfur dioxide (0.075%). Before each new gas was introduced, the hydrogen gas was turned off, so that oxygen alone, or oxygen and methane, or oxygen and methane and sulfur dioxide were flowing through the sensors without the hydrogen gas. Once measurements were recorded for each of these gas flows, the hydrogen was reintroduced, so that oxygen and hydrogen, or oxygen and methane and hydrogen, or oxygen and methane and sulfur dioxide and hydrogen were flowing through the sensors.

Figure 20:
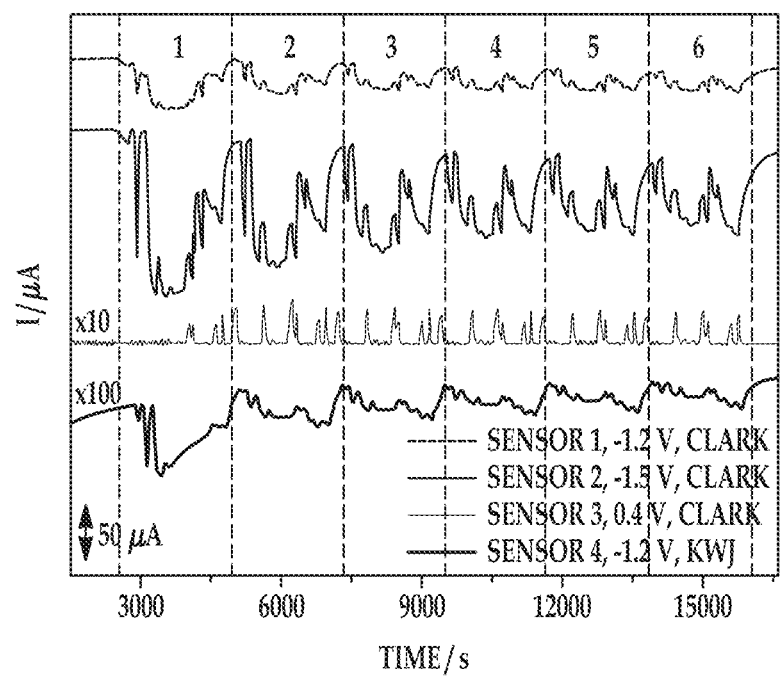
FIG. 20 is a graph depicting the amperometric response for six repetitive tests of four different sensors with [Bmpy][NTf$_2$] and with four different applied potentials in the presence of a fixed concentration of hydrogen, oxygen, methane, and sulfur dioxide in nitrogen (v/v)

The results from the six repetitive tests are shown in FIG. 20 as current versus time. The current has a scale bar of 50 μA, which is used to compare data originally recorded on different scales. The results for sensors 3 and 4 have been respectively magnified by 10 times (10×) and 100 times (100×) because otherwise, they were too small to see. For the results of each of the sensors, it is clear that the sensing sensitivity decreased with time. However, it is also clear that the sensing pattern of each of the sensors was similar across the tests, especially the last five.

Figure 21:
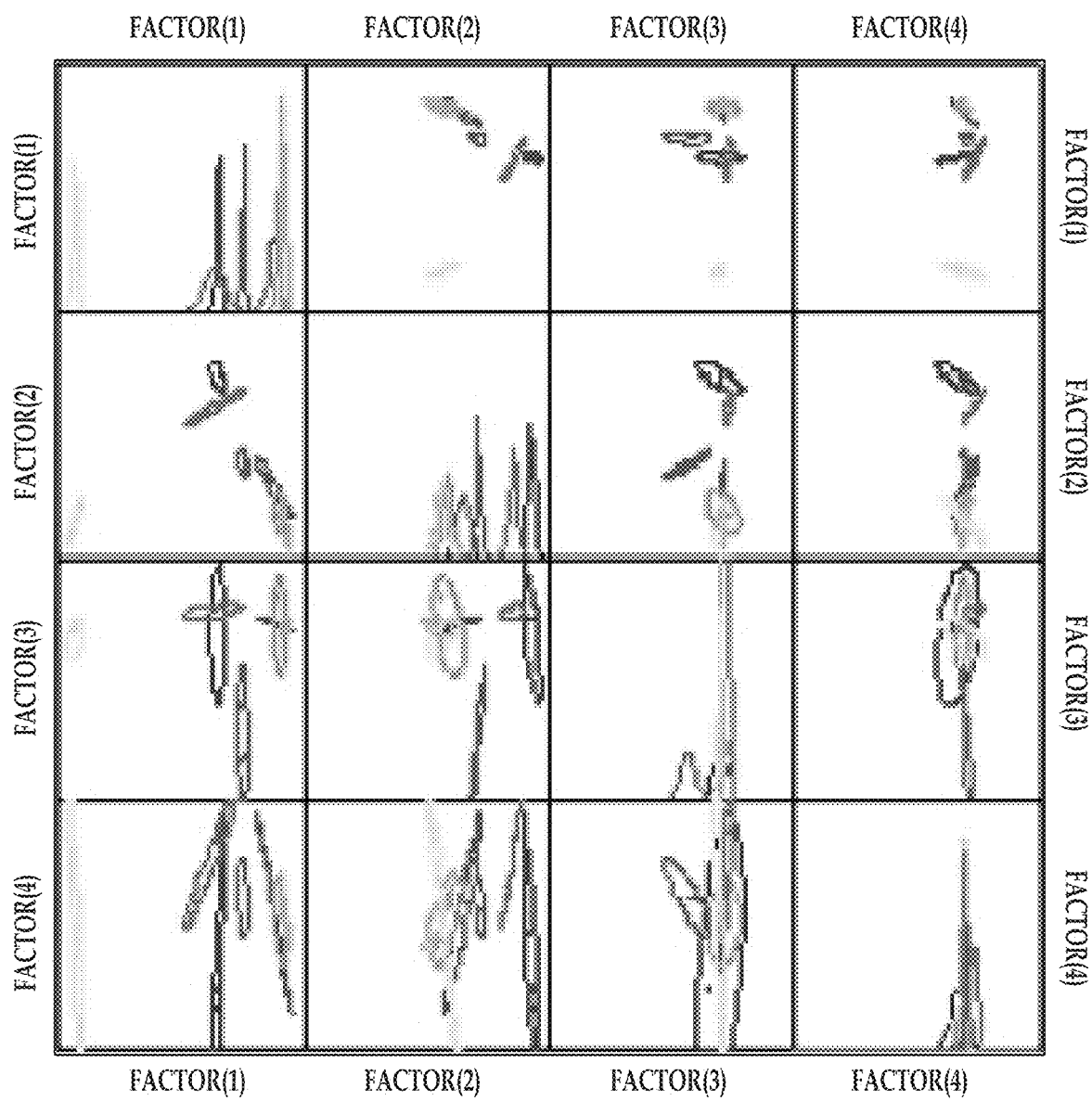
FIG. 21 is a canonical score plot generated by linear discriminant analysis (LDA) showing the separation of seven different mixture gas groups.

With the aid of linear discriminant analysis (LDA), all seven mixture gas groups (i.e., $H_2$ and $N_2$; air ($O_2$) and $N_2$; $H_2$ and air ($O_2$); air ($O_2$) and $CH_4$; $H_2$, air ($O_2$), and $CH_4$; air ($O_2$), $CH_4$, and $SO_2$; and $H_2$, air ($O_2$), $CH_4$, and $SO_2$ were able to be distinguished. FIG. 21 is a plot of the canonical scores for all of the groups resulting from the LDA. This plot shows the separation of the seven different mixture gas groups.

Example 3

In this example, hydrogen gas sensing was performed in aerobic conditions using examples of the sensors J, I shown in the sensing system 10''' of FIG. 1D using a protic and hydrophobic ionic liquid. This example demonstrates that some species (e.g., oxygen and water) that may potentially interfere with hydrogen sensing in aerobic conditions may actually undergo reactions similar to those in a hydrogen fuel cell to enable continuous sensing and enhance analytical performance. More specifically, this example shows that the protons can be oxidized to water at the counter electrode in the presence of oxygen. As shown in FIG. 1D, the oxygen is provided by the ambient air because the counter electrode is open to the ambient air. The water solubility equilibrium in the ionic liquid can be maintained since only trace of amount of water can be present in the ionic liquid, in part because the excess of water is evaporated in the ambient air.

Platinum Wire Counter Electrode Versus Platinum Gauze Counter Electrode

As evidenced by Example 1, hydrogen oxidation at the working electrode in an ionic liquid generates protons. The sensitivity of the hydrogen sensing should depend on the rate of the proton reactions at counter electrode. Different geometries of the counter electrode (Pt wire versus Pt gauze) were tested to verify their effects on the sensor performances.

Both of the tested sensors included platinum gauze as the working electrode (100 mesh) and a platinum wire as quasi-reference electrode (0.25 mm diameter). In one cell, the open counter electrode was polycrystalline platinum gauze (100 mesh), and in the other cell, it was a platinum wire (0.25 mm diameter). In each sensor, the working electrode was supported on a TEFLON® membrane that allows gas to permeate and that supports the ionic liquid. The other electrodes were stacked with glass fiber separators separating them, and all of the layers were mechanically pressed together.

While protons can be formed during hydrogen oxidation in both aprotic and protic ionic liquids, the protons generated from a proton source (e.g., a protic ionic liquid) may have a key role in the oxidation process of hydrogen. As such, in this example, a protic ionic liquid, namely diethylmethylammonium trifluoromethanesulfonate ([Dema][TfO] having a high conductivity close to $10^{-2}$ S/cm), was used in each of the sensors. This ionic liquid allows the oxidation of hydrogen at a potential as low as 0.2V at the working electrode and also allows oxygen reduction into water at the counter electrode.

Hydrogen and air were homogenously mixed in a 100 mL three-necked glass flask to generate various concentrations (volume percentage, v/v) of the hydrogen via two mass flow controllers (MKS Instruments Inc.) with a total flow rate of 100 mL/min.

Figure 22:
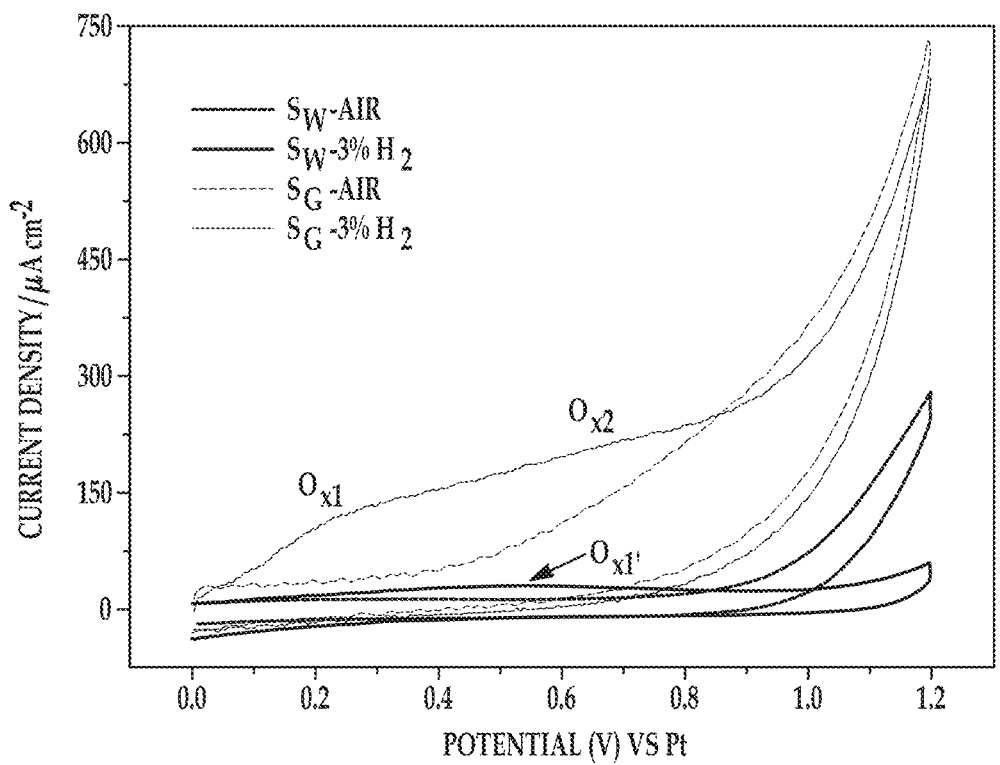
FIG. 22 shows cyclic voltammograms of sensors with an open air design and different types of counter electrodes (Pt wire (sensor labeled S$_W$) or Pt gauze (sensor labeled S$_G$) and a protic ionic liquid (diethylmethylammonium trifluoromethanesulfonate ([Dema][TfO])) in the presence of air or 3% (v/v) hydrogen in air (scan rate: 100 mV/s)

Each sensor (referred to as "$S_G$" (for the sensor including the gauze counter electrode) and "$S_W$" (for the sensor including the wire counter electrode) was exposed to air (i.e., without any hydrogen) and to a gas stream of 3% hydrogen in air. Cyclic voltammetry was performed. The results are shown in FIG. 22, as current density versus potential (v) versus Pt (the quasi-reference electrode).

When sensor $S_W$ was exposed to air, no redox peak was observed until the scanned potential was up to 1.0V, where a large oxidation current was seen. It is believed that this is due to the trace amount of water present in the [Dema][TfO] ionic liquid. The platinum working electrode could be partially oxidized in the presence of the trace water. When hydrogen was introduced into the interface between the platinum working electrode and the [Dema][TfO] ionic liquid of the sensor $S_W$, the oxidation of platinum was inhibited, to some degree, by the adsorption of hydrogen on the working electrode. In FIG. 22, an oxidation peak ($O_{x1}$') beginning from 0.1V and centering at 0.48V appeared, indicating hydrogen oxidation process also takes place.

Comparing the air exposure of $S_W$ and $S_G$ (i.e., $S_W$-Air versus $S_G$-Air in FIG. 22), a much larger current response was observed when sensor $S_G$ was exposed to air. This may have been due to the fact that the platinum gauze counter electrode possesses a higher surface area than the platinum wire counter electrode. Similarly to the $S_W$ sensor, a wide oxidation peak ($O_{x1}$) was observed with $S_G$ when hydrogen gas was introduced, but at lower potential (0.23V). This peak ($O_{x1}$) could also be ascribed to hydrogen oxidation, because this peak is not present in the air environment. The results in FIG. 22 indicate that hydrogen can be easily oxidized in the [Dema][TfO] ionic liquid, and especially in the sensor $S_G$.

The [Dema][TfO] ionic liquid has a lower oxidation potential and better reversibility towards hydrogen oxidation than $NTf_2$-, FAP- and $BF_4$-based ionic liquids, in part because the [TfO]⁻ anions have a lower affinity to the platinum working electrode than other anions. The weaker adsorption of [TfO]⁻ anions on the platinum working electrode may increase the surface availability for hydrogen adsorption and may facilitate $H_2$ oxidation on the platinum working electrode. The trace water in the [Dema][TfO] ionic liquid may be beneficial for maintaining the reactivity of the platinum working electrode, in that it facilitates the hydrogen oxidation at a relatively low potential.

Moreover, the protons formed from the hydrogen oxidation at the working electrode can be quickly transported to counter electrode. This process is significantly promoted by the [Dema][TfO] ionic liquid, in which the protons are mobile from the molecular structure of this ionic liquid. Accordingly, the oxygen from the ambient atmosphere can be reduced in the presence of the protons to form water.

The reaction mechanisms for these sensors $S_G$, $S_W$ include:

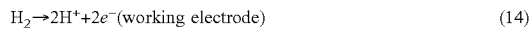

$$H_2 \rightarrow 2H^+ + 2e^- \text{(working electrode)} \tag{14}$$

$$\tfrac{1}{2}O_2 + 2H^+ + 2e^- \rightarrow H_2O \text{(counter electrode)} \tag{15}$$

Additionally, the platinum oxidation process (see $O_{x2}$ in FIG. 22) is slightly enhanced in the presence of hydrogen, due to the generation of water in the system, which could facilitate the platinum oxidation process. This indirectly confirms the reaction mechanisms shown above.

The kinetics for oxygen reduction are generally slower than the kinetics for the hydrogen oxidation. The depressed and broad oxidation peak ($O_{x1}$) for hydrogen in sensor $S_G$ may be evidence that the oxidation of hydrogen was limited to some extent by the reduction of oxygen at counter electrode.

Figure 23:
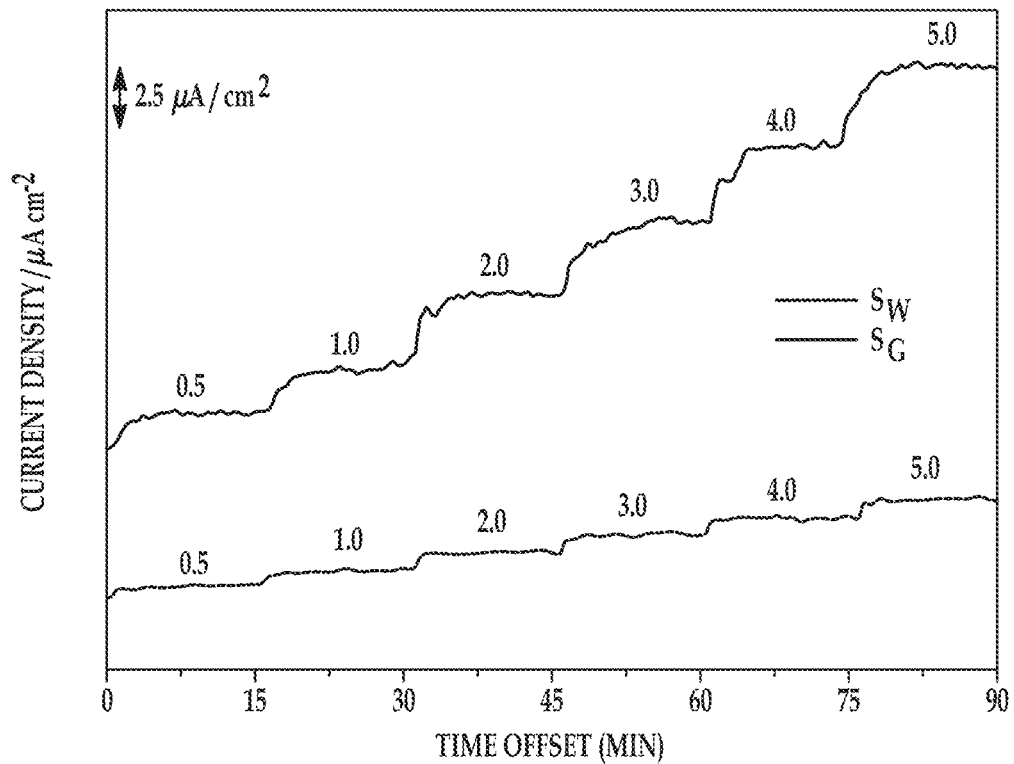
FIG. 23 is a graph depicting the amperometric response of sensors S$_W$ and S$_G$ at different applied potentials in the presence of different and increasing concentrations of hydrogen in air (v/v)

Based on the results shown in FIG. 22, constant potentials of 0.5V and 0.2V were respectively applied at the working electrodes of the sensors $S_W$ and $S_G$. When hydrogen was continuously introduced into these two sensors $S_G$ and $S_W$, the current versus time curves were recorded. The introduced hydrogen concentration ranged from 0.5% to about 5%, and was increased in 0.5% or 1% increments. The results are shown in FIG. 23 as current density (μA/cm²) versus time offset (in minutes). The current density has a scale bar of 2.5 μA/cm²' and the scale bar is used to compare data originally recorded on different scales.

Both of the sensors $S_G$, $S_W$ responded to hydrogen, which further confirmed the proposed hydrogen oxidation mechanisms. However, the current signal for sensor $S_W$ was much smaller than the current signal for sensor $S_G$. Even when the hydrogen concentration is up to 5.0%, the current response was of sensor $S_W$ was lower than 1 μA, which is unfavorable for hydrogen detection since the lower explosive limit for hydrogen is ~4%.

Platinum Black Working Electrode Versus Sensor $S_G$

Since sensor $S_G$ was more sensitive to hydrogen, it was used for comparison with yet another sensor, referred to as sensor $S_{G-PB}$. Sensor $S_{G-PB}$ had the same set up as sensor $S_G$, except that the platinum gauze working electrode (surface area of about 10⁻³ m²/g) was replaced with a platinum black working electrode (having a higher specific surface area ranging from about 25 m²/g to about 34 m²/g).

The platinum black electrode was prepared by depositing platinum black powders with a loading amount of about 7 mg/cm² to about 8 mg/cm² onto a TEFLON® membrane and annealed at 300° C. to enhance adhesion to the membrane.

Figure 24A:
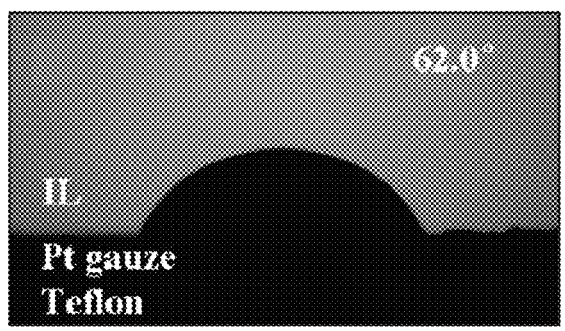
FIGS. 24A and 24B are pictures of the contact angles of [Dema][TfO] ionic liquid on a platinum gauze working electrode/TEFLON® membrane (A) and a platinum black working electrode Pt black/TEFLON® membrane.
Figure 24B:
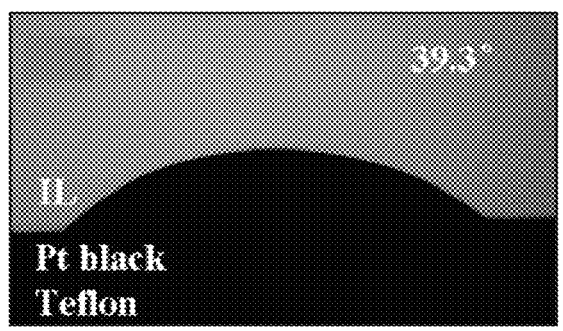

The wettability of the ionic liquid on platinum gauze/ TEFLON® membrane as well as on the platinum black/ TEFLON® membrane was measured with the contact angle meter (DM-CE1, Kyowa, Japan). FIGS. 24A and 24B depict the contact angle pictures of [Dema][TfO] ionic liquid electrolyte on the two different electrodes. The significantly decreased contact angle value from 62.0° for the platinum gauze to 39.3° for the platinum black suggests better wettability of the ionic liquid electrolyte on the Pt black working electrode. In other words, introduction of powdered platinum black allows a more uniform ionic liquid layer to form on the working electrode, thus facilitating the contact between the gas analyte and the sensing interface, and (as demonstrated below) improving sensor performance.

Chronoamperometry was utilized to characterize the hydrogen sensing of sensors $S_G$ and $S_{G-PB}$. A potential of 0.2V was used as the constant applied potential based on the results in FIG. 22. The hydrogen concentration was increased from 0.5% to 5.0%, and to test the reproducibility, the hydrogen concentration was then decreased from 5.0% down to 0.5%. The current signals were monitored in real-time when different concentrations of hydrogen in air were introduced into the sensors $S_G$ and $S_{G-PB}$.

Figure 25A:
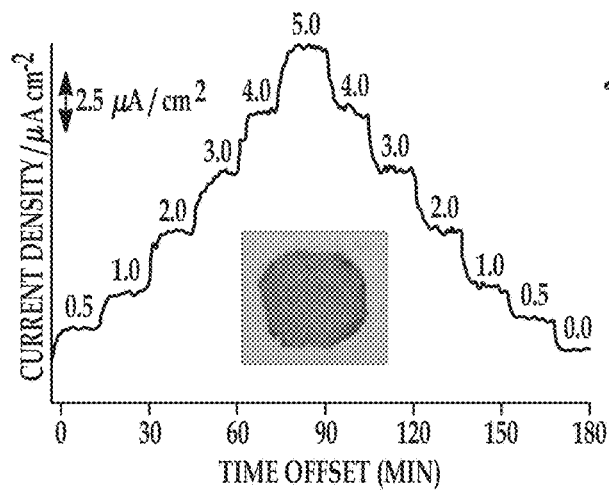
FIGS. 25A through 25D are graphs depicting (A) the amperometric response of the sensor S$_G$ in the presence of different, increasing and decreasing, concentrations of hydrogen in air (v/v), where the inset is a picture of the Pt gauze working electrode, (B) a calibration curve generated from the data in FIG. 25A, (C) the amperometric response of the sensor S$_{G-PB}$ (sensor S$_G$ with a platinum black working electrode) in the presence of different, increasing and decreasing, concentrations of hydrogen in air (v/v), where the inset is a picture of the Pt black working electrode, and (D) a calibration curve generated from the data in FIG. 25C.
Figure 25B:
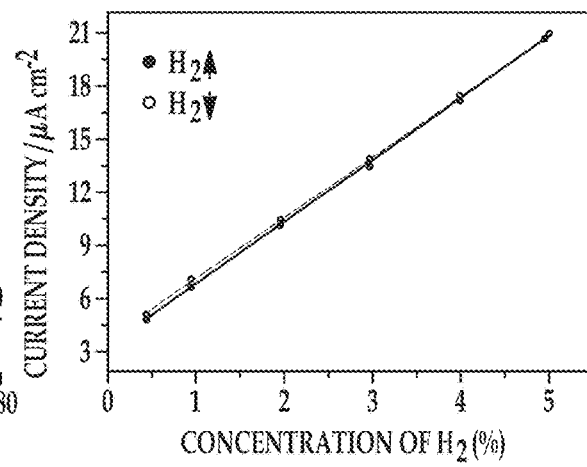
Figure 25C:
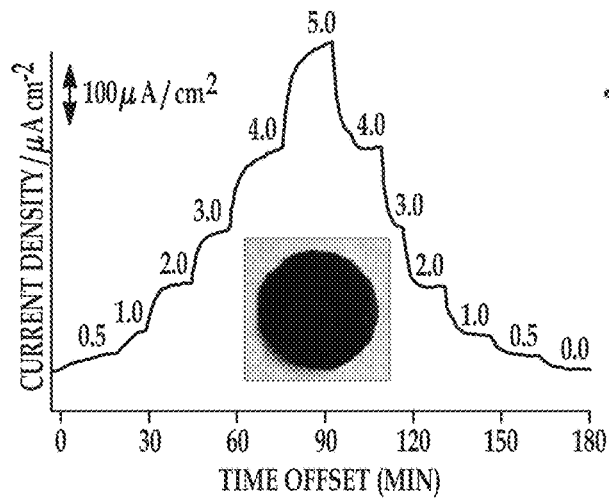

The current density versus time curves for the sensors $S_G$ and $S_{G-PB}$ are respectively shown in FIGS. 25A and 25C. The current density in FIG. 25A has a scale bar of 2.5 μA/cm² and the current density in FIG. 25C has a scale bar of 100 μA/cm².

These results clearly depict that the anodic current in both of the sensors $S_G$ and $S_{G-PB}$ has a linear relationship with the hydrogen concentration. When the hydrogen concentrations descended, the current signal response decreased correspondingly.

Figure 25D:
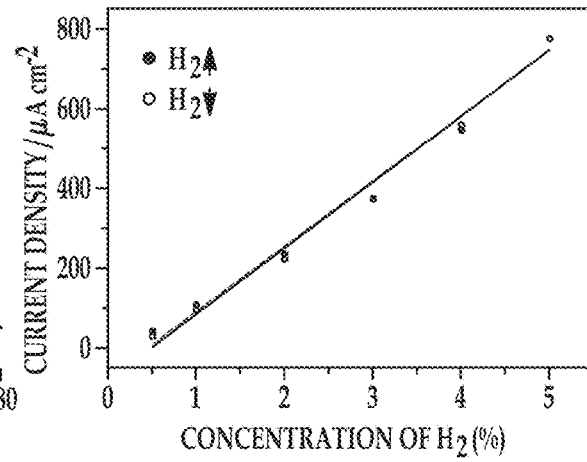

Calibration curves were generated for each of the sensors $S_G$ and $S_{G-PB}$, and are respectively shown in FIGS. 25B and 25D. Clearly, a linear relationship ($R^2 > 0.99$) between the anodic current and hydrogen concentrations was obtained, which validates the application of the sensors $S_G$ and $S_{G-PB}$ for hydrogen detection. As shown in FIGS. 25B and 25D, almost identical current values were obtained at the same concentration of hydrogen during the increase in hydrogen concentration ($H_2\uparrow$) and the decrease in hydrogen concentration ($H_2\downarrow$). These results indicate good reversibility of both sensors $S_G$ and $S_{G-PB}$, even with the generation of water as the product in the sensing process. This may be attributed to the open design that can facilitate the removal of water directly to outer air, thus avoiding the problems of water product influence on sensor $S_G$ and $S_{G-PB}$ performance.

Although the sensor $S_G$ exhibited good reversibility in hydrogen sensing, the signal to noise ratio (for example, S/N=62 for 1.0% hydrogen) was relatively small, as shown in FIG. 25A. This may result from two aspects: physical and chemical factors. The former is attributed to the mechanical sensor assembly which is not compact enough and thus causes relatively large noise. At the same time, the loosely packed structure could also extend the diffusion distance of the hydrogen from the air phase to the reaction interface, which will also influence the sensor response. As to the latter, the limited surface area of the platinum gauze working electrode may be unfavorable for the oxidation of hydrogen, which may result in the relatively small signal.

Compared to sensor $S_G$, sensor $S_{G-PB}$ exhibited more promising analytical performance (compare FIGS. 25A and 25C). First, the platinum black working electrode was more sensitive to hydrogen with a much higher response signal. Secondly, the current versus time curve in FIG. 25C shows much higher S/N ratio (for example, S/N=248 for 1.0% hydrogen), which suggests that the platinum black working electrode is effective for both increasing response signal and decreasing noise (when compared to the platinum gauze working electrode). The increase of response signal may be attributed to the faster electron transfer efficiency and higher catalytic activity of platinum black, resulting, in part, from the smaller particle size and higher specific surface area. Furthermore, as seen in the inset of FIG. 25C, there is better adhesion between platinum black and the membrane after annealing, which not only extensively eliminates the noise interference from physically mechanical pressing, but also considerably shortens the diffusion distance of gas molecules to the electrode surface, which could facilitate electrochemical reactions.

recovery to the original state. The response time and recovery time may further be shortened (i.e., to <20 seconds at 50° C.) by varying the working temperature, since the ionic liquid has the unique advantage of good thermal stability up to about 300° C., at which water based hydrogen gas sensors could not function. For comparison, the performances of sensor $S_{G-PB}$ as well as other representative amperometric hydrogen gas sensors with different types of electrolytes are summarized in Table 22.

TABLE 22

| $H_2$ sensor types | Electrolyte | Sensing Electrode (WE) | Sensitivity (μA/ppm) | Detection Limit (ppm) | $t_{90}$ Response time (s) | Working temperature (° C.) & humidity (RH) |
|---|---|---|---|---|---|---|
| Water | $H_2SO_4$ | Pt black | 2.04E−4 | 7900 | 50 | RT & N/A |
| Polymer | Nafion | Pt/C | 1.03E−2 | 200 | 20-50 | RT & 76% |
| Solid | $CaZr_{0.9}In_{0.1}O_{3-\delta}$ | ZnO | 5.892E−2 | <50 | 126 | >500 & N/A |
| $S_{G-PB}$ | [Dema][TfO] | Pt black | 9.12E−3 | 29 | 52 | RT & N/A |

Figure 26:
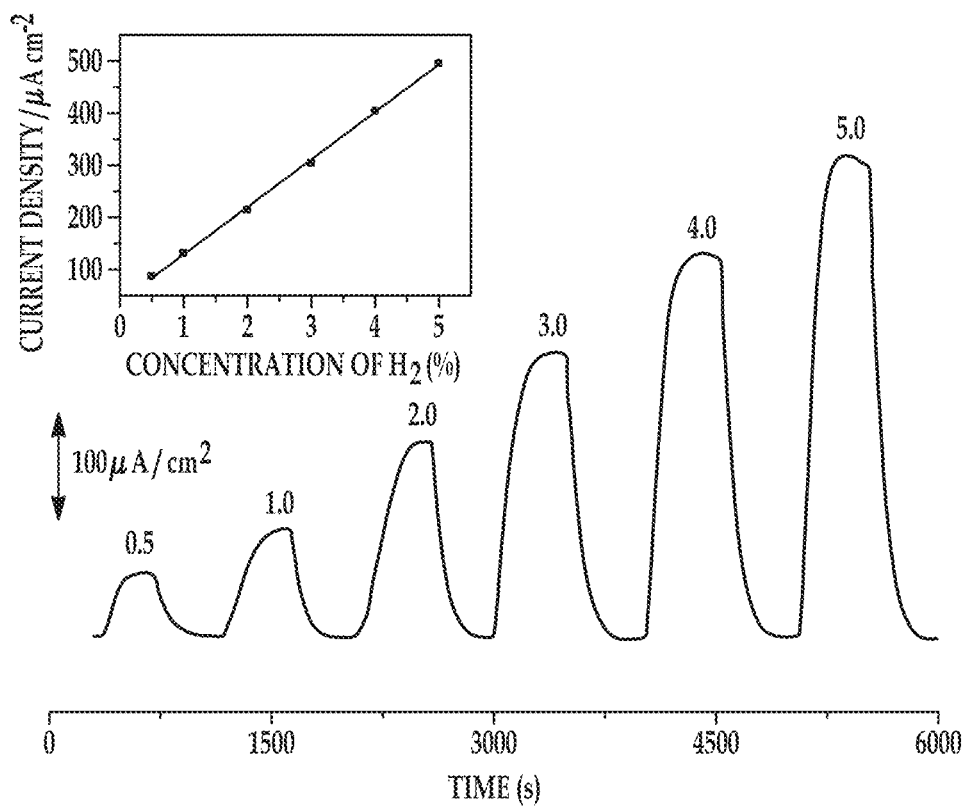
FIG. 26 is a graph depicting the amperometric response of the sensor S$_{G-PB}$ in the presence of different and increasing concentrations of hydrogen in air (v/v) with on and off cycles, where the inset is the calibration curve generated from the data.

The response and recovery performance of the sensor $S_{G-PB}$ to different concentrations of hydrogen gas was tested. A constant potential of 0.2V was used. The hydrogen concentration was turned on and off, and after each off cycle was increased by 0.5% or by 1.0% from the previous on cycle. The current signals were monitored in real-time, and the results and the corresponding calibration curve (inset) are shown in FIG. 26. The current density (Y-axis in FIG. 26) has a scale bar of 100 μA/cm². It is apparent that the sensor $S_{G-PB}$ rapidly responds to hydrogen and also returns to the baseline. The current response is linearly related to hydrogen concentration within the range of 0.5% to 5.0% with the equation expressed below:

$$j(\text{current density}, \mu A/cm^2) = 91.2 * c(H_2 \text{ concentration}, \%) + 36.6$$

Hydrogen sensitivity for this sensor was 91.2 μA/ (cm².%), which may be attributed to the higher sensing activity of platinum black compared to platinum gauze. Based on the equation, DL=3σ/S, where σ is the standard deviation and S is the sensitivity, the detection limit (DL) is 0.0029% (29 ppm), which is effective for detecting hydrogen leakage in real world application, since the exploration limit of hydrogen in air is about 4% to about 74%.

Figure 27:
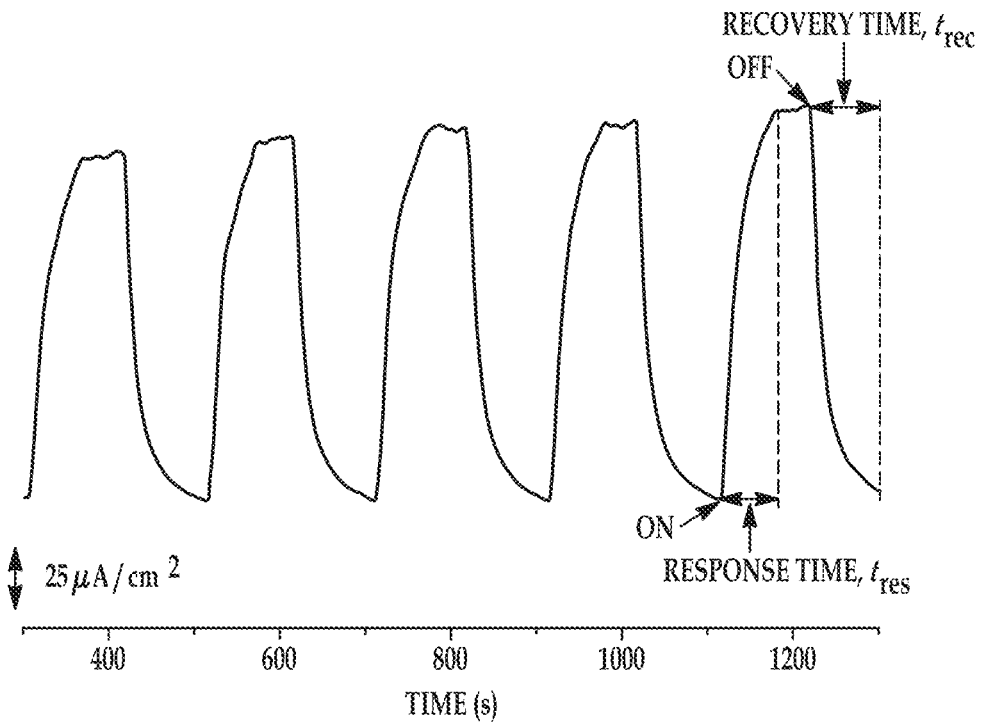
FIG. 27 is a graph depicting the amperometric response of the sensor S$_{G-PB}$ in the presence of a fixed concentration of hydrogen in air (v/v) with on and off cycles.

To further validate the reversibility of the sensor $S_{G-PB}$, the sensor $S_{G-PB}$ was repeatedly exposed to 1.0% hydrogen and pure air. The corresponding current density versus time (seconds) curve is shown in FIG. 27. The current density (Y-axis in FIG. 27) has a scale bar of 2.5 μA/cm². The sensor $S_{G-PB}$ exhibits the same response after being cycled for five times, which demonstrates its high reversibility.

Even though the high viscosity of the ionic liquid may cause some delay in gas diffusion, dissolution and reaction, the sensor $S_{G-PB}$ exhibited comparable response speed to an aqueous system. The response time ($t_{res}$) obtained from FIG. 27 is about 75 seconds, which is much smaller than the 280 seconds for the sensor $S_G$ based on the platinum gauze working electrode. The $t_{90}$ (time to reach 90% of a stable signal) is about 52 seconds. The faster gas diffusion and shorter gas diffusion distance to the electrode/electrolyte interface mainly contributes to the considerable elevation of response speed of the sensor $S_{G-PB}$. The recovery time ($t_{rec}$) was slightly longer than the response time due, at least in part, to the gradual self-evaporation of water product and From Table 22, it is clear that sensor $S_{G-PB}$ possesses very promising sensing performances (sensitivity, response time, detection limit, etc.) and no limitations for the working temperatures or humidity, as compared to other hydrogen gas sensors with other electrolytes and solvents.

Figure 28:
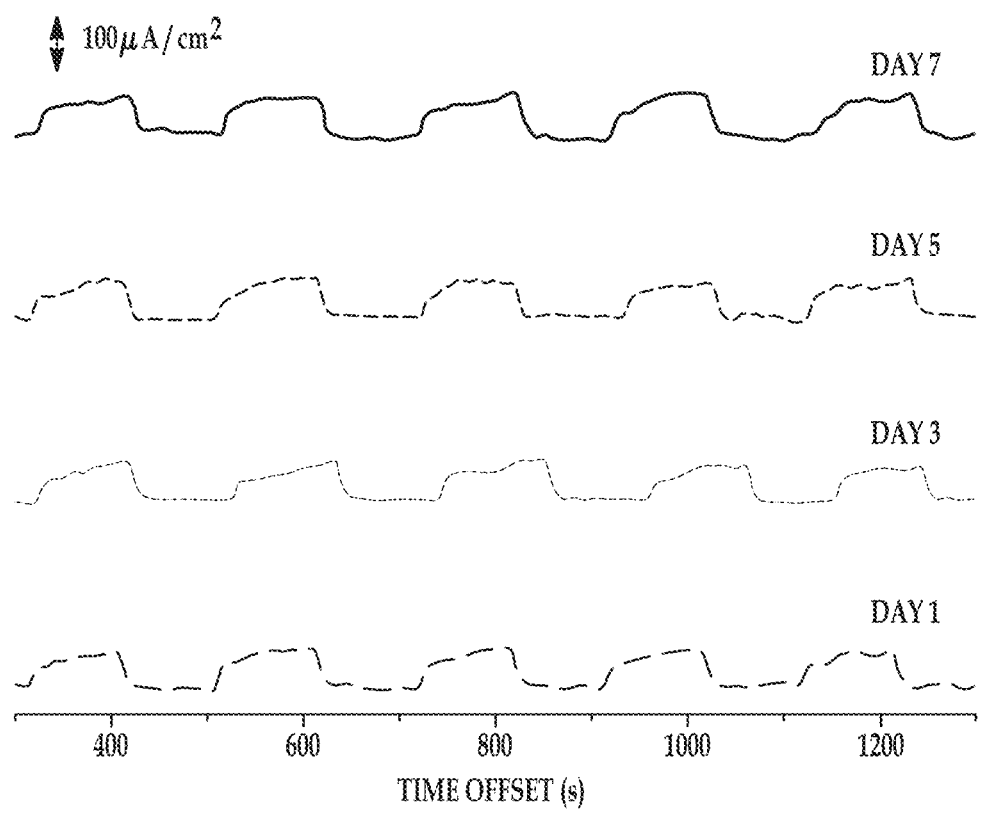
FIG. 28 is a graph depicting the amperometric response of the sensor S$_{G-PB}$ in the presence of a fixed concentration of hydrogen in air (v/v) with on and off cycles over a period of 7 days.

The sensor $S_{G-PB}$ also exhibits excellent long-term stability. FIG. 28 shows the current density response of the sensor $S_{G-PB}$ within one week. The current density (Y-axis in FIG. 28) has a scale bar of 100 μA/cm². There was negligible change of the sensor signals after storing the sensor $S_{G-PB}$ to ambient conditions and then using the sensor $S_{G-PB}$ for hydrogen sensing. This may be attributed two aspects: one is that the ionic liquid has negligible vapor pressure at room temperature and hardly changes in ambient air, and two is that the open counter electrode structure enables the fast removal of products, which further contributes to the excellent long-term stability.

In industrial applications, hydrogen is generally prepared by the electrolysis of water and reforming or pyrolysis of natural gas. In these applications, water, methane, and the byproduct of carbon monoxide coexist with hydrogen in the hydrogen tank. The leakage of hydrogen is usually accompanied with these gases, which may influence the hydrogen detection for the hydrogen sensor $S_{G-PB}$.

Figure 29:
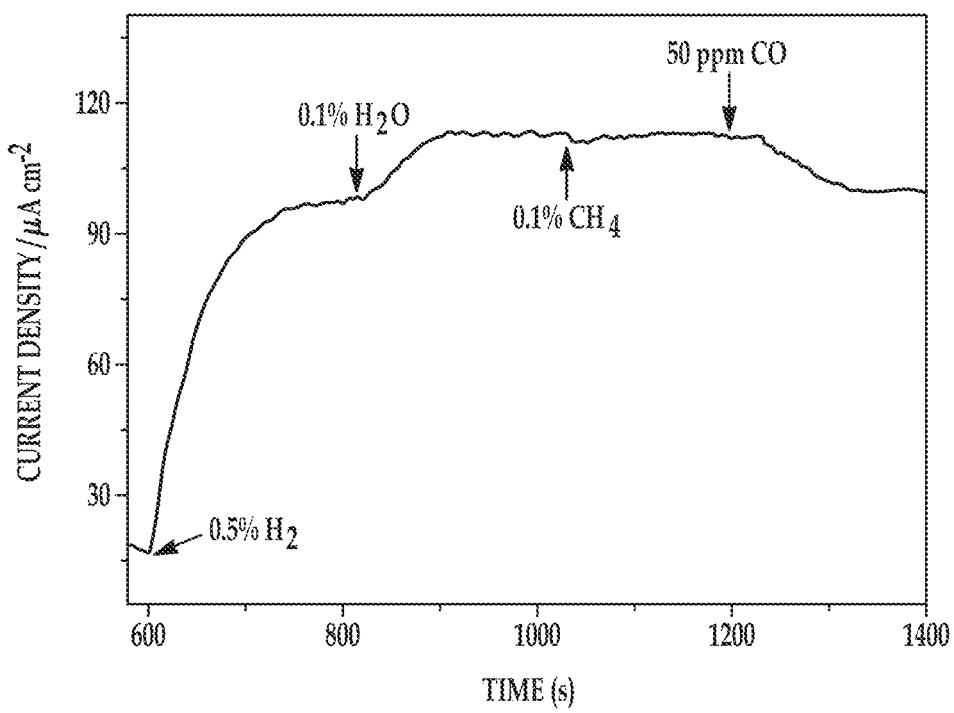
FIG. 29 is a graph depicting the amperometric response of the sensor S$_{G-PB}$ in the presence of 0.1% H$_2$O, 0.1% CH$_4$, and 50 ppm CO in addition to 0.5% H$_2$ in air.

In order to evaluate the possible influence, the sensor $S_{G-PB}$ was continuously exposed to 0.1% $H_2O$, 0.1% $CH_4$, and 50 ppm CO, in which the $H_2$ concentration was maintained at 0.5%. The change of response is shown in FIG. 29. When 0.5% $H_2$ was introduced, the sensor $S_{G-PB}$ exhibited an identical response signal as that shown in FIG. 28. This indicates that the sensor $S_{G-PB}$ functions well for hydrogen detection after multiple experiments. The response slightly increased in the presence of 0.1% $H_2O$, which may be due to the decrease of viscosity and the increase of conductivity for the ionic liquid in the interface. Therefore, different calibration curves at different humidity can be developed to calibrate the change.

A negligible change could be distinguished when the sensor $S_{G-PB}$ was exposed to 0.1% $CH_4$, which suggests that the sensor $S_{G-PB}$ shows no response to $CH_4$ (at least at the applied potential). Further, the introduction of 50 ppm CO into the sensor $S_{G-PB}$ results in some decrease of response. This means that CO may adsorb on the platinum electrode and inhibit the hydrogen oxidation process. The interference of CO may be eliminated by adding some polymers, such as DuPont fluorinated ethylene propylene (FEP).

In summary, the sensor $S_{G-PB}$ with the platinum black working electrode exhibited a high sensitivity of 91.2 µA/(cm²·%) with a detection limit of 29 ppm within a $t_{90}$ of about 52 seconds due, at least in part, to better adhesion between the platinum black and the gas permeable membrane, higher catalytic activity and better wettability with the ionic liquid. Therefore, the performance of the sensor shown in FIG. 1D can be significantly improved by substituting platinum gauze with platinum black as the working electrode.

Example 4

In this example, hydrogen gas sensing was performed in anaerobic conditions using examples of the sensors C, D shown in the sensing system 10' of FIG. 1B. The planar electrodes included two platinum working electrodes, a platinum counter electrode, and a quasi-platinum reference electrode. Some of the sensors (generally labeled $S_{SD}$) having the planar electrodes had smaller spacing between two working electrodes, and some others of the sensors (generally labeled $S_{LD}$) having the planar electrodes had larger spacing between two working electrodes. In each of the sensors $S_{SD}$, $S_{LD}$, a reservoir was created for the ionic liquid and the electrodes were soldered in order to have wires connected to the electrochemical workstation. In some of the experiments, a stacked (Clark type) platinum electrode structure (similar to that described in Example 2) was used for comparison.

Sensors $S_{SD}$, $S_{LD}$ with 1-butyl-3-methylimidazolium bis(trifluoromethylsulfonyl)imide ([Bmim][NTf$_2$])

The stacked platinum electrode structure and examples of the sensors $S_{SD}$, $S_{LD}$ were each tested for hydrogen sensing with 1-butyl-3-methylimidazolium bis(trifluoromethylsulfonyl)imide as the ionic liquid electrolyte. A potential of 0.4V was used as the constant applied potential at one of the working electrodes. 5 minute on cycles were followed by 5 minute off cycles, and hydrogen gas in nitrogen gas was introduced during the 5 minute on cycles. After each off cycle, the hydrogen concentration was increased by 0.25 from the previous on cycle. As such, over time, the hydrogen concentration was increased from 0.25% to 1.25%. The current signals were monitored in real-time when different concentrations of hydrogen in N$_2$ were introduced into the sensors.

The 5 minute interval results are shown in FIGS. 30A through 30C. FIG. 30A shows the results for the stacked platinum electrode structure, FIG. 30B shows the results for the sensor $S_{LD}$ (with the large spacing working electrodes), and FIG. 30C shows the results for the sensor $S_{SD}$ (with the small spacing working electrodes). The results indicate that the planar electrodes are suitable for hydrogen gas sensing, and that the small spacing sensor $S_{SD}$ is more sensitive than the large spacing sensor $S_{LD}$. It is believed that the sensitivity of both the planar electrode sensors $S_{SD}$, $S_{LD}$ may be improved when incorporated into a plug and play type of device, rather than with soldered wires.

Sensors $S_{SD}$, $S_{LD}$ 1-butyl-3-methylimidazolium bis(trifluoromethylsulfonyl)imide ([Bmim][NTf$_2$]) at Different Detection Time Examples of the sensors $S_{SD}$, $S_{LD}$ were tested for hydrogen sensing with 1-butyl-3-methylimidazolium bis(trifluoromethylsulfonyl)imide at different detection times. A potential of 0.4V was used as the constant applied potential at one of the working electrodes. 1 minute or 2 minute on cycles were followed, respectively, by 1 minute or 2 minute off cycles, and hydrogen gas in nitrogen gas was introduced during the 1 minute or 2 minute on cycles. After each off cycle, the hydrogen concentration was increased by 0.25% from the previous on cycle. As such, over time, the hydrogen concentration was increased from 0.25% to 1.25%. The current signals were monitored in real-time when different concentrations of hydrogen in N$_2$ were introduced into the sensors.

Figure 31A:
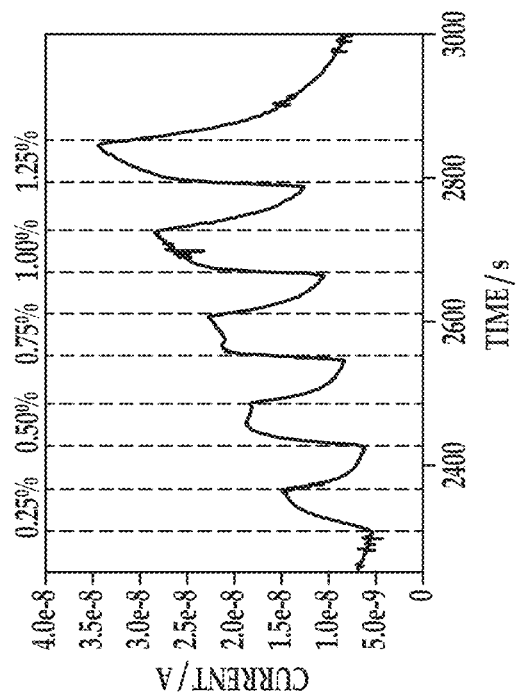
FIGS. 31A and 31B are graphs depicting the amperometric response of one working electrode of the sensor S$_{LD}$ with [Bmim][NTf$_2$] in the presence of different and increasing concentrations of hydrogen in nitrogen (v/v) with (A) 2 minute on and off cycles and (B) 1 minute on and off cycles.
Figure 31B:
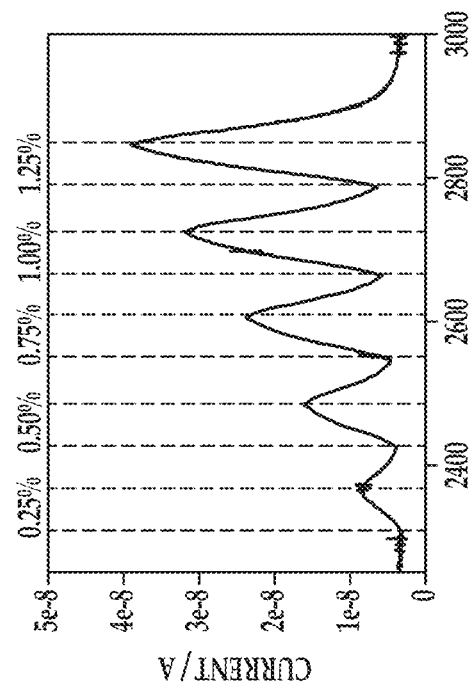
Figure 32A:
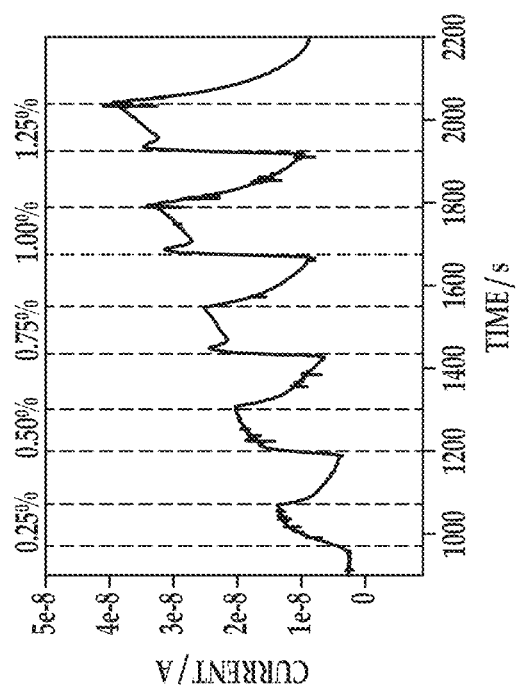
FIGS. 32A and 32B are graphs depicting the amperometric response of one working electrode of the sensor S$_{SD}$ with [Bmim][NTf$_2$] in the presence of different and increasing concentrations of hydrogen in nitrogen (v/v) with (A) 2 minute on and off cycles and (B) 1 minute on and off cycles.
Figure 32B:
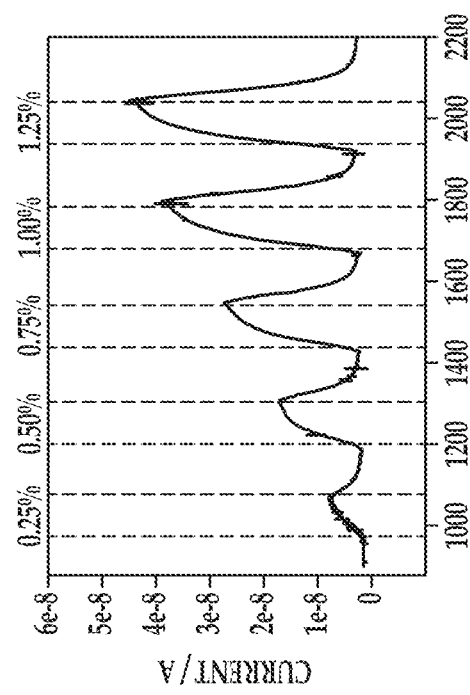

The 2 minute or 1 minute interval results for the larger spacing sensor $S_{LD}$ are shown, respectively, in FIGS. 31A and 31B. The 2 minute or 1 minute interval results for the smaller spacing sensor $S_{SD}$ are shown, respectively, in FIGS. 32A and 32B. The results at the 1 minute intervals for both planar electrode sensors $S_{LD}$, $S_{SD}$ were not as sensitive as the results at the 2 minute intervals, indicating that the 2 minute interval may be more desirable for both large and small spacing planar electrodes.

Examples of the sensors $S_{SD}$, $S_{LD}$ were exposed to continuous 5 minute on cycles followed by 5 minute off cycles with the hydrogen concentration remaining the same for three on cycles, and then the hydrogen concentration being increased by 0.25% for the next three on cycles. Over time, the hydrogen concentration was increased from 0.25% to 1.25%. The current signals were monitored in real-time when different concentrations of hydrogen in N$_2$ were introduced into the sensors. These results, which are shown in FIGS. 33A and 33B, illustrate the reproducibility of the planar electrode sensors $S_{LD}$ (FIG. 33A), $S_{SD}$ (FIG. 33B).

Examples of the planar electrode sensors $S_{SD}$, $S_{LD}$ were also tested using both of the working electrodes. For these tests, the potential applied at the first working electrode (WE1) in each sensor $S_{SD}$, $S_{LD}$ was 0.4V for hydrogen sensing, and the potential applied at the second working electrode (WE2) in each sensor $S_{SD}$, $S_{LD}$ was 0.05V. The potential applied at the second electrode was to initiate the reduction process of the proton generated by the hydrogen sensing reaction in order to facilitate continuous hydrogen sensing.

In one test, 2 minute on cycles were followed 5 minute off cycles, and hydrogen gas in nitrogen gas was introduced during the 2 minute on cycles. After each off cycle, the hydrogen concentration was increased by 0.25% from the previous on cycle. As such, over time, the hydrogen concentration was increased from 0.25% to 1.25%. The current signals were monitored in real-time when different concentrations of hydrogen in N$_2$ were introduced into the sensors. FIG. 34A shows the results for the working electrodes in the sensor $S_{LD}$ with the large spacing planar electrodes, while FIG. 34B shows the results for the working electrodes in the sensor $S_{SD}$ with the smaller spacing planar electrodes. The results from one concentration to the next indicate that the signal changes may be too small to observe in this concentration range. The opposite results at the working electrodes in each of the sensors $S_{SD}$, $S_{LD}$ are indicative of the opposite reactions taking place at the working electrodes (i.e., hydrogen oxidation at WE1 and proton (H$^+$) reduction at WE2).

Figure 35A:
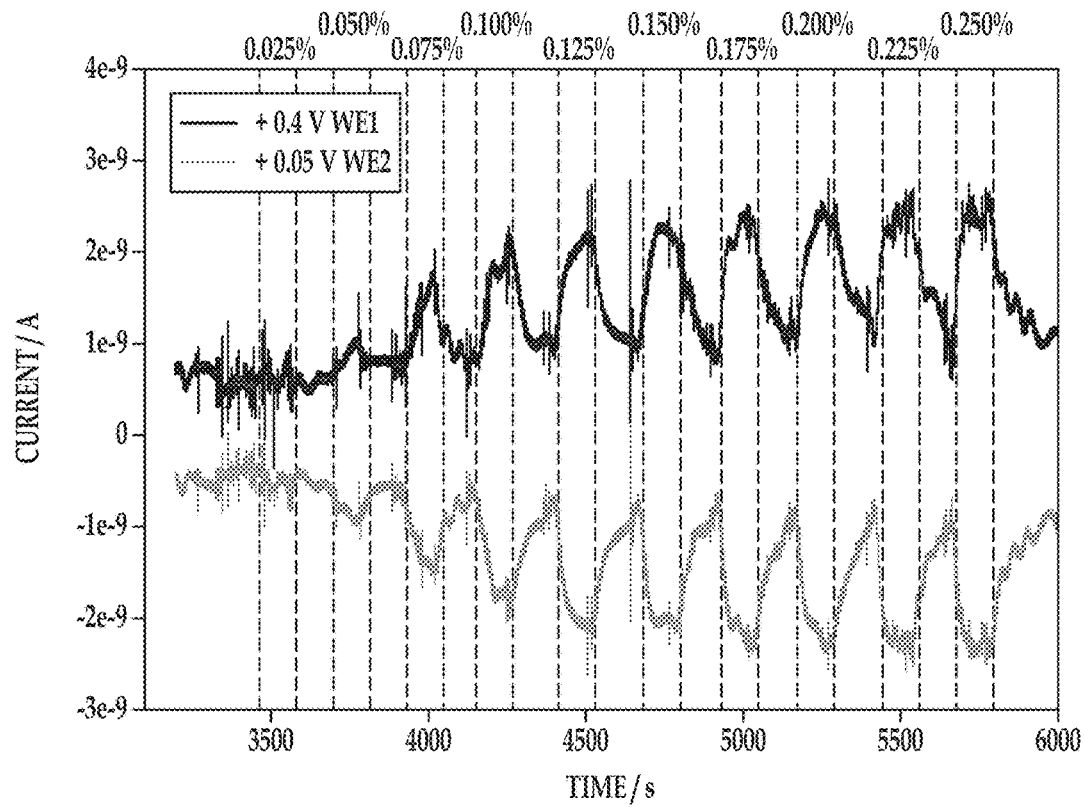
FIGS. 35A and 35B are graphs depicting the (A) amperometric response of two workings electrodes (at two different applied potentials) of the sensor $S_{LD}$ with [Bmim][NTf$_2$] in the presence of different and increasing concentrations of hydrogen in nitrogen (v/v) with 2 minute on and off cycles, and (B) amperometric response of two workings electrodes (at two different applied potentials) of the sensor $S_{SD}$ with [Bmim][NTf$_2$] in the presence of different and increasing concentrations of hydrogen in nitrogen (v/v) with 2 minute on and off cycles.
Figure 35B:
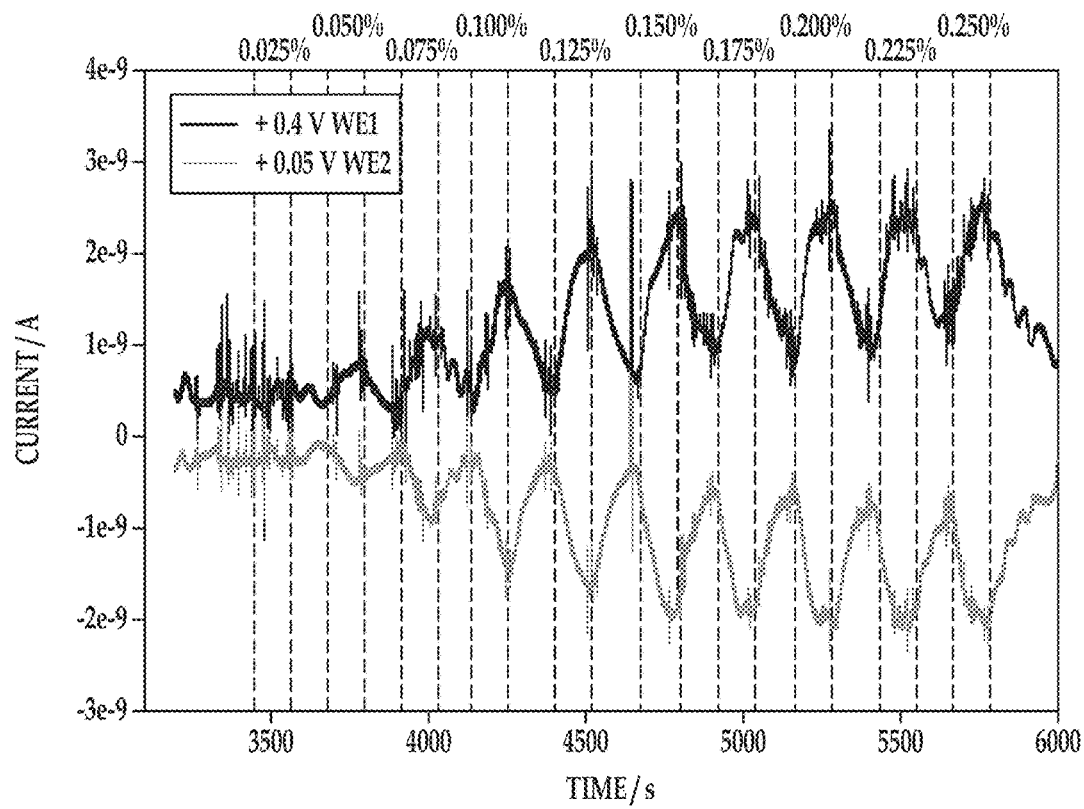

In another test, 2 minute on cycles were followed 2 minute off cycles, and hydrogen gas in nitrogen gas was introduced during the 2 minute on cycles. After each off cycle, the hydrogen concentration was increased by 0.025% from the previous on cycle. Over time, the hydrogen concentration was increased from 0.025% to 0.25%. The current signals were monitored in real-time when different concentrations of hydrogen in $N_2$ were introduced into the sensors. FIG. 35A shows the results for the working electrodes in the sensor $S_{LD}$ with the large spacing planar electrodes, while FIG. 35B shows the results for the working electrodes in the sensor $S_{SD}$ with the smaller spacing planar electrodes. Similar to FIGS. 34A and 34B, the opposite results at the working electrodes in each of the sensors $S_{SD}$, $S_{LD}$ are indicative of the opposite reactions taking place at the working electrodes (i.e., hydrogen oxidation at WE1 and proton ($H^+$) reduction at WE2). These results also indicate that the planar electrodes are capable of sensing very small hydrogen concentrations (0.05%).

Example 5

This example illustrates that a radical intermediate formed by the oxidation of the ionic liquid anion at an anodic potential can catalyze the hydrogen oxidation processes and enhance the reaction rate.

The same type of electrochemical cell and experimental conditions (e.g., gas flow rate, potential versus $Fc^+/Fc$, measurement instrument, etc.) described in Example 1 were used in this example.

A potential of 2V was selected as the preanodization potential to oxidize the $NTf_2$ anion of the [Bmpy][$NTf_2$] ionic liquid electrolyte. One sensor was not exposed to this preanodization potential and another sensor was exposed to this preanodization potential. Preanodization occurred for 5 minutes at 2V. Cyclic voltammetry was performed on the pure ionic liquid, after preanodization was performed, and while each of the sensors was exposed to 1% hydrogen in a nitrogen background (v/v).

Figure 36A:
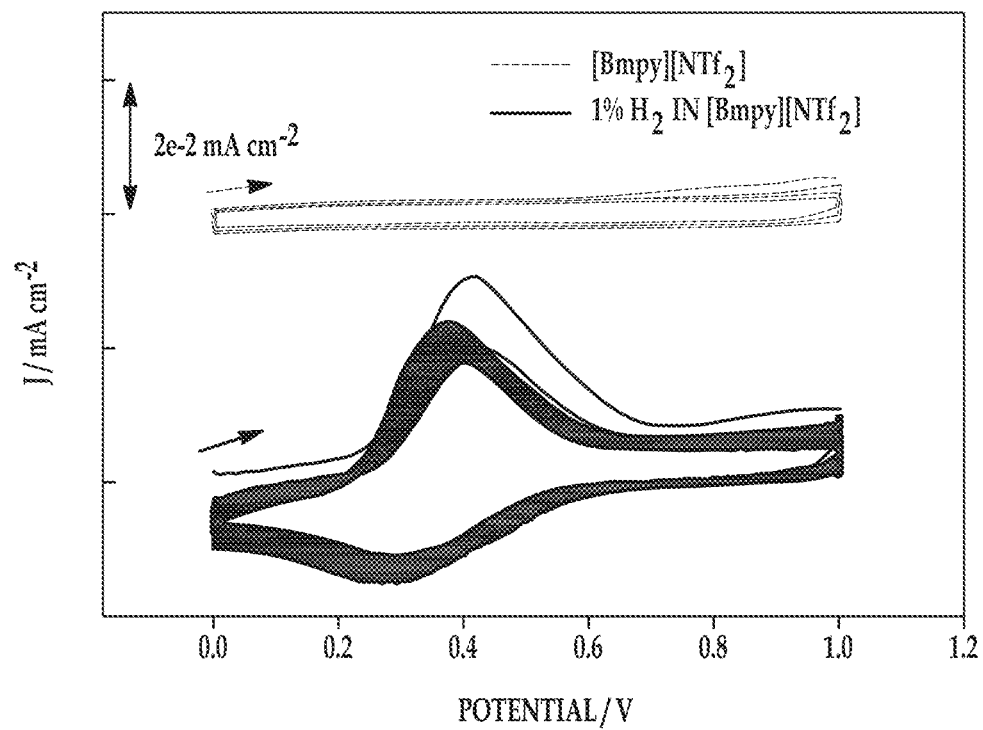
FIGS. 36A and 36B are cyclic voltammograms of sensors with [Bmpy][NTf$_2$] ionic liquid in the presence of a nitrogen background and in the presence of 1% (v/v) hydrogen in nitrogen (scan rate: 100 mV/s), where (A) the sensor was not exposed to preanodization and (B) the sensor was exposed to a preanodization process for 5 minutes at +2.0V.

FIG. 36A shows multiple cyclic voltammograms of the sensor not exposed to preanodization. FIG. 36A depicts current density (J, $mA\ cm^{-2}$) versus potential (V), with the current density having a scale bar of $2e^{-2}\ mA\ cm^{-2}$. In FIG. 36A, the cyclic voltammograms in the pure ionic liquid background shows only the charging current, and the presence of hydrogen lead to an oxidation peak at +0.4V and a reduction peak +0.3V. The peak current $I_{pa}/I_{pc}$ ratio obtained for these oxidation and reduction peaks is at the value of unity, which indicates a reversible redox reaction of hydrogen in [Bmpy][NTf2]. The mechanism of hydrogen oxidation at the platinum electrode without the preanodization step should be similar to that described in eqs. 1 and 4.

Although the $NTf_2$ anion is widely used as an ionic liquid forming anion, which has electrochemical stability, by applying an anodic potential at the platinum working electrode, $NTf_2$ anions can be oxidized to $NTf_2$', which can adsorb at the platinum working electrode and exhibit redox behavior. The oxidation of the anions required high anodic potential; and thus, the electrode was preanodization at 2V.

Figure 36B:
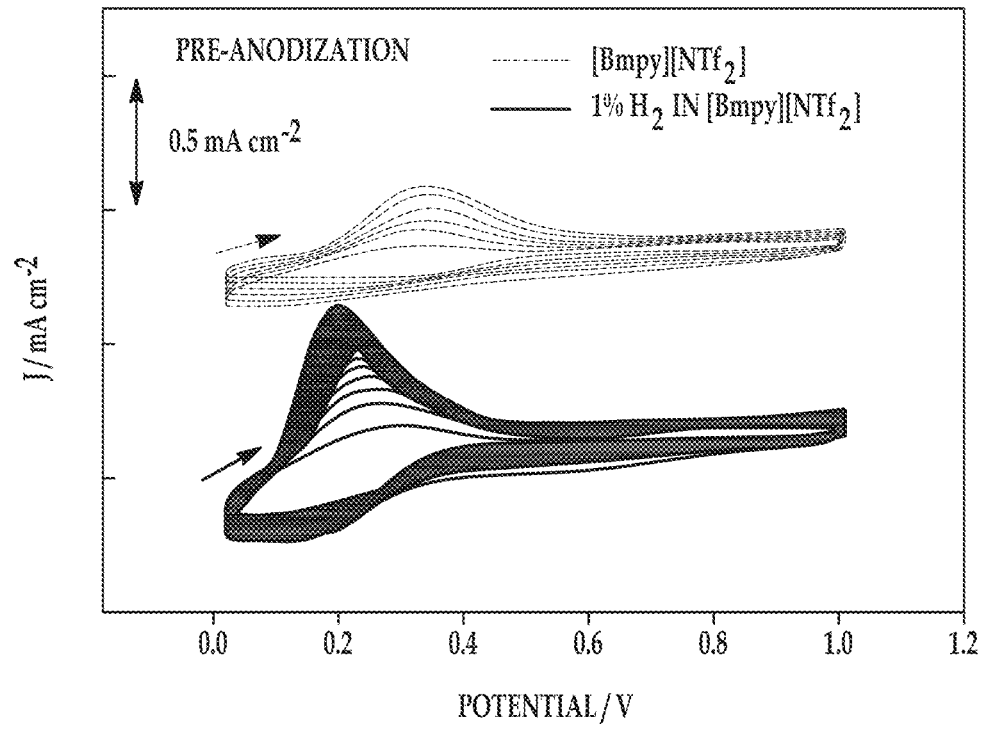

FIG. 36B shows the multiple cyclic voltammograms in [Bmpy][NTf2] with or without the presence of hydrogen but after the preanodization potential (2.0V) has been applied for 5 minutes. FIG. 36B depicts current density (J, $mA\ cm^{-2}$) versus potential (V), with the current density having a scale bar of 0.5 $mA\ cm^{-2}$. At this potential, the anions of the ionic liquid are oxidized. This is evidenced by the oxidation peak that appeared at 0.3V. There was also a negligible reduction peak. Because there is no hydrogen in this experiment, the oxidation peak at 0.3V is attributed to a Pt—$NTf_2^·$ intermediate formed in the $NTf_2$ oxidation processes. During the multiple cyclic voltammetry cycles, the redox peak gradually increased to a constant value at which the saturated coverage of Pt—$NTf_2^·$ at the platinum working electrode had been reached.

FIG. 36B also shows the multiple cyclic voltammograms of 1% hydrogen in [Bmpy][$NTf_2$] after the 2V preanodization step has been performed. With the preanodizing process, the peak current density of hydrogen oxidation was three times higher (comparing FIGS. 36B and 36A). A slightly negative potential shift (200 mV) was also observed for the oxidation peak of hydrogen. These results support the conclusion that the Pt—$NTf_2^·$ radical has catalytic activity that enhances the oxidation of hydrogen.

As such, the reaction mechanism for the catalytic hydrogen oxidation in $NTf_2$ based ionic liquids is proposed as shown in equations 16-19:

$$NTf_2^- \leftrightarrow NTf_2^· + e^- \quad (16)$$

$$Pt—NTf_2^- \leftrightarrow Pt—NTf_2^· + e^- \quad (17)$$

$$2Pt—NTf_2^· + H_2 \leftrightarrow 2H-Pt—NTf_2 \quad (18)$$

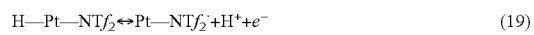

$$H—Pt—NTf_2 \leftrightarrow Pt—NTf_2^· + H^+ + e^- \quad (19)$$

The negative shift of hydrogen oxidation potential observed in FIG. 36B with the preanodization condition should be directly related to the hydrogen adsorption and radical formation process in eq. 18, in which highly active surface adsorbates (Pt—$NTf_2$') promote the oxidation process of hydrogen and thus decrease the potential needed for oxidation of hydrogen.

Figure 37A:
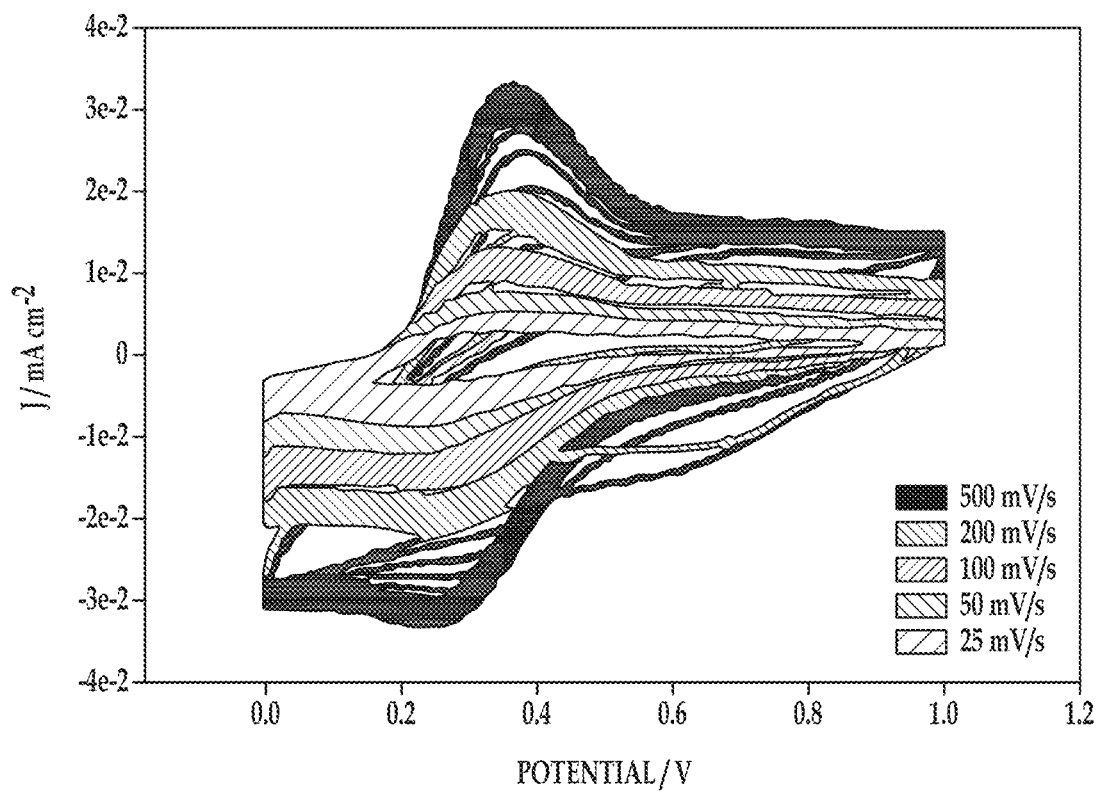
FIG. 37A depicts cyclic voltammograms of a sensor (not exposed to preanodization) with [Bmpy][NTf$_2$] ionic liquid in the presence of 1% (v/v) hydrogen in nitrogen at different scan rates and a potential window ranging from 0V to 1.0V.

FIG. 37A summarizes the results of different scan rates of cyclic voltammetry experiments of 1% (v/v) hydrogen in [Bmpy][NTf2] without the preanodization condition. The anodic or cathodic redox peak current density had a linear relationship with the scan rates (data not shown). The linear relationship of peak currents versus scan rates validates the surface adsorption during the hydrogen oxidation process in the ionic liquid, which is also consistent with the high catalytic properties of the platinum electrode for surface proton redox reactions.

Figure 37B:
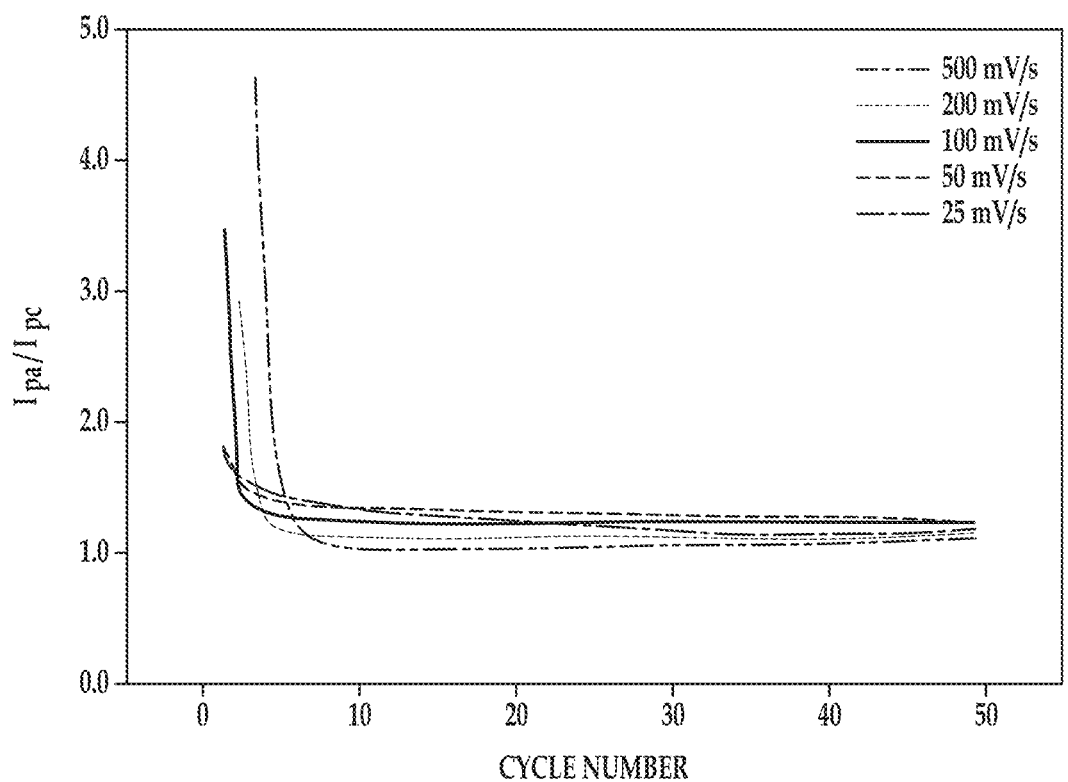
FIG. 37B is a graph depicting the peak current $I_{pa}/I_{pc}$ ratio obtained (at different scan rates) for the oxidation and reduction peaks versus the cycle number (for the sensor used to generated FIG. 37A)

FIG. 37B shows that $I_{pa}/I_{pc}$ decreases from a value bigger than unity to reach a value close to unity with increasing cycle numbers. The initial higher than unity value of $I_{pa}/I_{pc}$ may be related to the association of a proton with the $NTf_2$ anion to form $HNTf_2$, which decreased the reduction current of proton in cyclic voltammetry. It took more cycle numbers to reach the equilibrium of plateau value of $I_{pa}/I_{pc}$ at a high scan rate (e.g., 500 mV/s) versus a low scan rate (e.g., 25 mV/s). This result further supports the conclusion that the hydrogen mass transport rate is slow and is the rate-determining step in the high viscosity ionic liquid compared to the facile electrode oxidation of hydrogen on platinum.

Figure 38A:
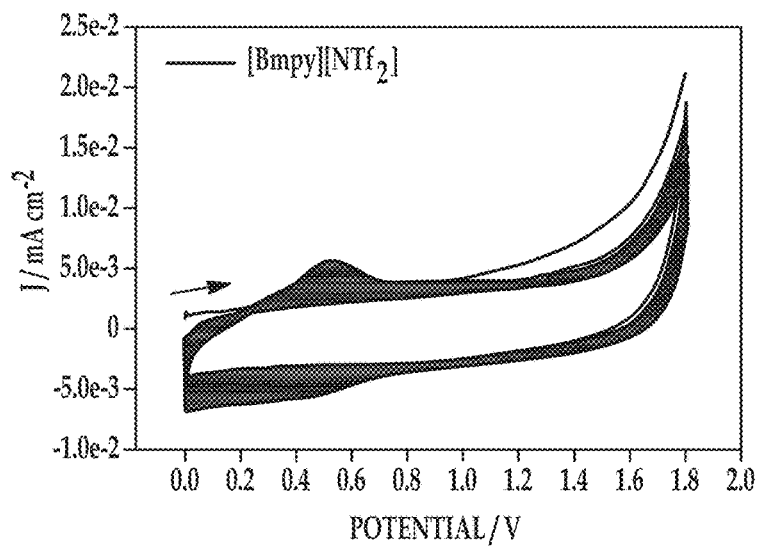
FIGS. 38A and 38B are cyclic voltammograms of (A) a sensor with pure [Bmpy][NTf$_2$] ionic liquid in the presence of a nitrogen background, and (B) the sensor in the presence of 1% (v/v) hydrogen in nitrogen, where the potential window was widened to 0V to 1.8V (scan rate: 100 mV/s)

The preanodization step was carried out by cyclic voltammetry to study the catalytic hydrogen oxidation processes. A wide potential (0-1.8V) window was used for generating the Pt—$NTf_2^·$ radical that mimics a preanodization condition. FIG. 38A shows the multiple cyclic voltammograms at the potential window in [Bmpy][NTf2]. Comparing these results to the results in FIG. 36A, an oxidation peak starting at 1.4V was observed, which validates the oxidation of the $NTf_2$ anion (corresponding to the reaction in eq. 19). The oxidation peak at 0.4V related to the formation of surface adsorbate Pt—$NTf_2^·$ radicals, which is consistent with the peak observed in the experiments with an applied preanodization potential in FIG. 36B and supports the proposed mechanism in eq. 17. A smaller oxidation current (20%) of the Pt—$NTf_2^·$ radical formed during cyclic voltammetry experiments (as opposed to that of electrolysis at fixed preanodization potential (2.0 V) in FIG. 36B). The dynamic cyclic voltammetry scanning results in less accumulation of Pt—NTf$_2$· radicals on the electrode surface because some of the Pt—NTf$_2$· radicals formed can be reduced back to NTf$_2$· anions.

Figure 38B:
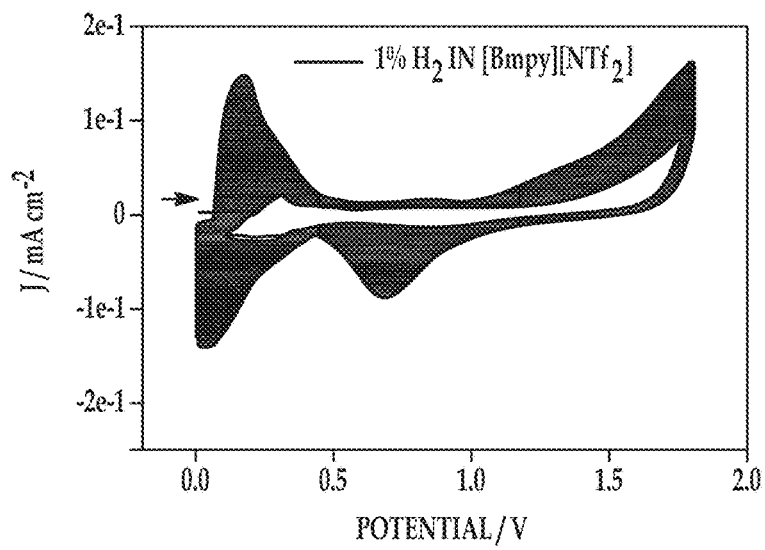

As shown in the FIG. 38B, the introduction of hydrogen increases the oxidation current and causes a negative shift of the oxidation peak from 0.4V to 0.2 V, which relates to the formation of H—Pt—NTf$_2$ from the interaction between Pt—NTf$_2$· radicals and H$_2$ in eq. 18. These results are consistent with the observation in the preanodization potential experiments shown in FIG. 36B.

Figure 38C:
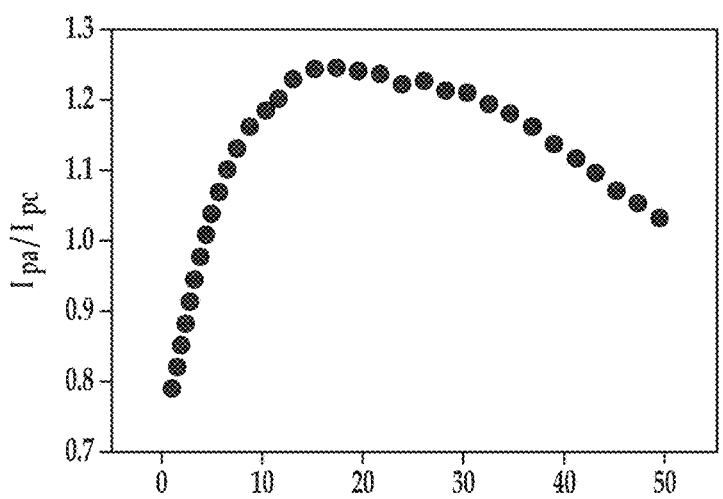
FIG. 38C is a graph depicting the peak current $I_{pa}/I_{pc}$ ratio obtained (at different scan rates) for the hydrogen oxidation versus the cycle number (for the sensor used to generated FIG. 38B)

In addition, the hydrogen oxidation with the coupling with the Pt—NTf$_2$· radical reactions in the multiple cyclic voltammetry experiments show a different trend of the $I_{pa}/I_{pc}$ value vs cyclic voltammetry cycling numbers. In FIG. 37B, without the preanodization step (narrow potential window), the $I_{pa}/I_{pc}$ values at the initial cycles were larger than unity due to the formation of HNTf$_2$, which reduced the number of free protons, but reached a constant value about one after cycle number six. As shown in FIG. 38C, however, when Pt—NTf$_2$· radicals were involved in the oxidation process of hydrogen in the wider potential window experiments, the $I_{pa}/I_{pc}$ values for hydrogen oxidation were smaller than that at the initial CV cycle numbers, and then increased from cycle number one to cycle number ten, and then decreased from cycle number ten to cycle number 50. The characteristics of $I_{pa}/I_{pc}$ versus cycle numbers in these experiments support an irreversible process which accounts for the decrease at high cycle number and the modification of the reversible mechanism in eq. 18.

Figure 39A:
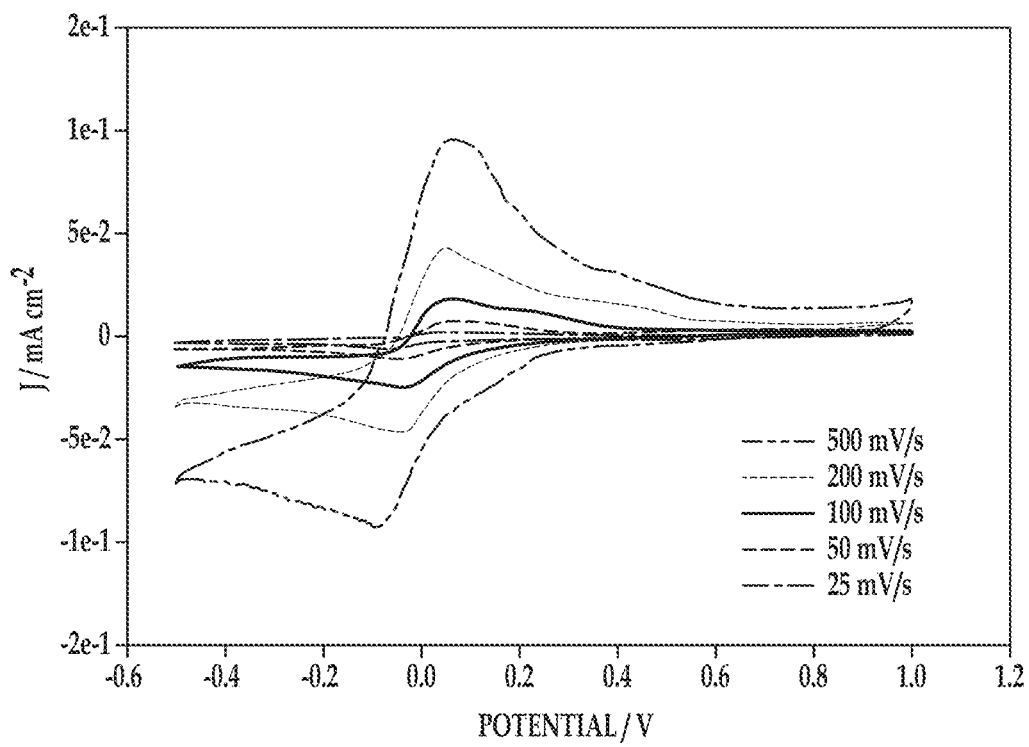
FIG. 39A depicts cyclic voltammograms of a sensor (exposed to a 5 minute preanodization step at 2.0V) with [Bmpy][NTf$_2$] ionic liquid in the presence of 1% (v/v) hydrogen in nitrogen at different scan rates and a potential window ranging from 0V to 1.0V.

The NTf$_2$· radical catalytic mechanism was further tested using potential step methods to apply a preanodization potential at 2V for 5 minutes. FIG. 39A shows the currents versus scan rates for 1% hydrogen oxidation with the preanodization condition. While not shown, the data of $I_{pa}/I_{pc}$ versus cycle numbers in the preanodization condition were similar to those observed in FIG. 37B. Also while not shown, a linear relationship for the peak current versus the scan rate was observed. These results also demonstrate the surface adsorption process of hydrogen oxidation with the preanodization step.

Figure 39B:
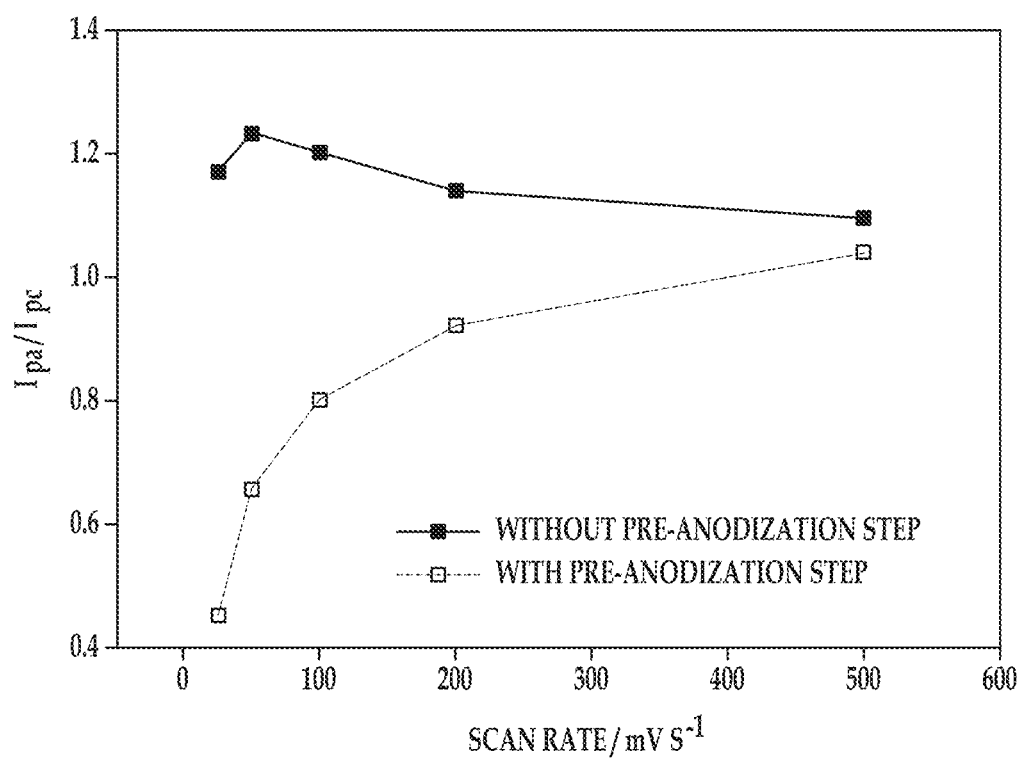
FIG. 39B is a graph depicting the peak current $I_{pa}/I_{pc}$ values versus the scan rate with and without a pre-anodization step at the last cyclic voltammetry cycle.

FIG. 39B compares $I_{pa}/I_{pc}$ versus the scan rate value with and without the preanodization step. At the preanodization condition, the $I_{pa}/I_{pc}$ ratio of the oxidation and reduction peak current versus the scan rates increases from a value at 0.45 to reach a constant value close to unity. This verifies the higher reversibility of the hydrogen redox process in [Bmpy][NTf2] at high scan rates compared to that at low scan rates. FIG. 39B supports the notion that the peak current ratio versus scan rate can serve as an indicator for electrochemical mechanisms that involve coupled reactions. At a fast scan rate (500 mV/s), the hydrogen redox process is an ErCr mechanism with a reversible electron transfer electrochemical reaction followed by a reversible chemical reaction, as demonstrated by the near unity value of current versus scan rate curves with and without the preanodization step in FIG. 39B. At slow scan rates, the reaction mechanism is changed to a reversible electron transfer followed by an irreversible chemical reaction, which corresponds to the formation of Pt—NTf$_2$· radical and further protonation with hydrogen (eq. 18). This is consistent with the results obtained in FIG. 39B with the existence of the preanodization step at slow scan rate, in that larger deviation value of $I_{pa}/I_{pc}$ (<1) was presented. However, the general trend of $I_{pa}/I_{pc}$ versus scan rate is consistent with the wide potential widow data shown in FIG. 37B. This confirms that the reaction mechanism is changed from a reversible electron transfer followed by a reversible chemical reaction mechanism to a reversible electron transfer followed by an irreversible chemical reaction.

Theoretical calculations were performed to further verify i) the reaction mechanism observed by cyclic voltammetry and amperometry and ii) the ability of the NTf$_2$· radical reaction to catalyze hydrogen oxidation. These results are not shown, but they showed high binding energies of the NTf$_2$· radical to platinum, which enables their efficient adsorption. Density functional theory (DFT) calculations predicted exergonic coupling reactions between the NTf$_2$· radical and H$_2$ on the platinum surface, as well as a lowering of the oxidative potential. This was consistent with the experimental observation of the catalytic process involving the NTf$_2$· radical.

Example 6

This example illustrates the quantitative method described in reference to equations A through H. This example demonstrates that control of the sensing (working) electrode potential is an effective way to control the kinetics of redox reactions and can be used to change or optimize the performance of the sensor.

In this example, a sensor similar to the sensor A, B shown in FIG. 1A was used. The gas permeable membrane was TEFLON®, and the working electrode was a platinum gauze electrode placed on the gas permeable membrane. The electrochemical active surface area of the Pt gauze electrode was 1.1 cm$^2$. Working and reference electrodes (0.5 mm diameter platinum wires) were placed into the ionic liquid electrolyte. The electrodes were polished by micropolish paper (Buehler Inc.) in order to remove the impurities and any oxide film, rinsed with ethanol and acetone, and then dried in a vacuum. 150 μL of [Bmpy][NTf$_2$] ionic liquid was added into the electrochemical cell as the electrolyte.

The total gas flow rate was maintained at 200 sccm by digital mass-flow controllers (MKS Instruments, Inc.) and the volume ratio (v/v) % of hydrogen to other gas(es) was adjusted by four mass-flow controllers, where one was used to control nitrogen gas flow, one was used to control hydrogen gas flow, one was used to control oxygen gas flow, one was used to control carbon dioxide gas flow. Volume percent concentration (v/v) % was used for the concentration of analytes in this Example. All electrochemical experiments in this Example were conducted at room temperature (23° C.±1° C.).

Before the inception of this experiment, the nitrogen gas (which was used as the background gas) was purged through the electrochemical cell overnight in order to remove the oxygen and other impurities from inside the cell. Using this preparation process, the experimental environment of cell was considered to be anaerobic, containing less than 0.03% oxygen.

At the beginning of each experiment, the pure nitrogen gas was purged for 30 minutes in order to achieve a baseline signal. Then, purging of the various gas mixtures took place. The sampling time of the various gas mixtures was 300 seconds. After sampling of a particular analytic gas mixture took place for the given time, three valves of the mass-flow controller were switched off to close the target gas flowing pathway. One valve as opened and pure nitrogen gas at 200 sccm flow rate was used to rinse the system for 10 minutes, before the next gas mixture was purged into the sensor.

Hydrogen

Multiple cycles of cyclic voltammetry were performed in a nitrogen background and with the introduction of 1% (v/v)

hydrogen in N$_2$ (anaerobic conditions) at a potential range from 0V to 1.2 V. While not shown, these results showed a pair of relatively reversible redox peaks and broad oxidation peaks at 0.4V, which indicates that the hydrogen oxidation reaction is electrochemically reversible in the ionic liquid. In addition, the separation of the hydrogen gas oxidation potential and the hydrogen proton reduction potential was 0.10V, which indicated that a relatively good reversible redox process had occurred in [Bmpy][NTf2].

From the cyclic voltammetry results, it was apparent that the current increased with an increase of voltage in the potential range from 0V to 0.4V, and that the current value had reached maximum at 0.4V. Thus, three different potentials of 0.4V, 0.2V, 0V were selected for further analysis.

Figures 41A, 41B:
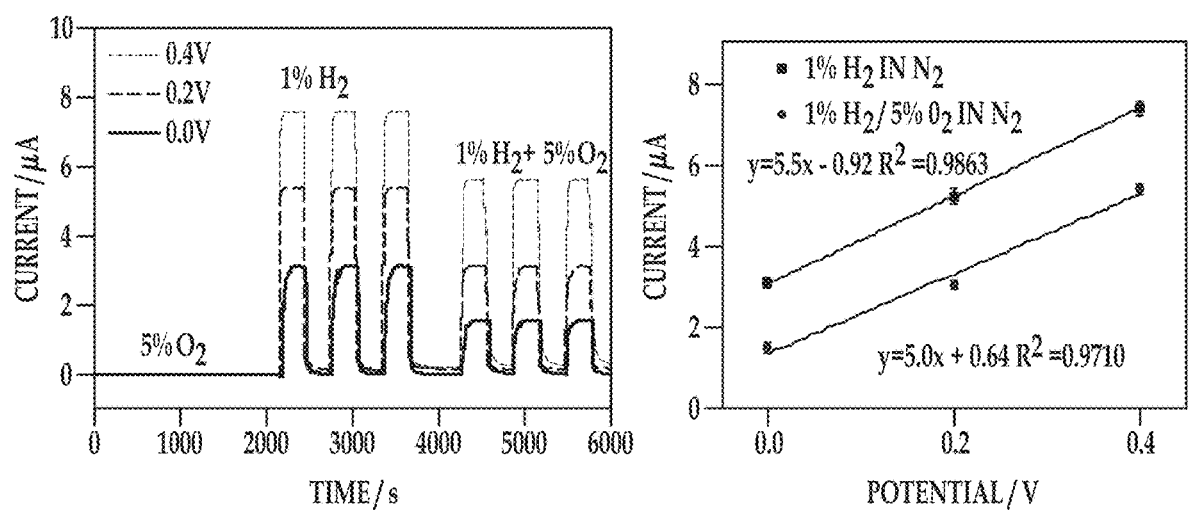
FIGS. 41A and 41B are graphs depicting A) the amperometric response of a sensor with ([Bmpy][NTf$_2$]) in the presence of 5% $O_2$ in $N_2$ (v/v), 1% $H_2$ in $N_2$ (v/v), and 1% $H_2$ and 5% $O_2$ in $N_2$ (v/v) at different potentials, and B) the corresponding calibration curve.
Figure 42A:
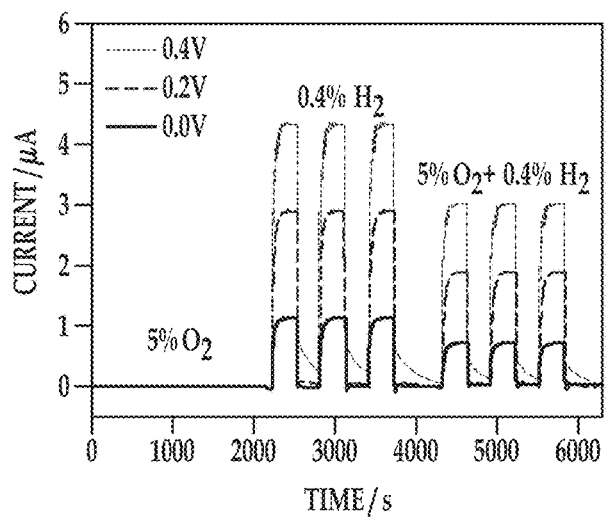
FIGS. 42A and 42B are graphs depicting A) the amperometric response of a sensor with ([Bmpy][NTf$_2$]) in the presence of 5% $O_2$ in $N_2$ (v/v), 0.4% $H_2$ in $N_2$ (v/v), and 0.4% $H_2$ and 5% $O_2$ in $N_2$ (v/v) at different potentials, and B) the corresponding calibration curve.
Figure 42B:
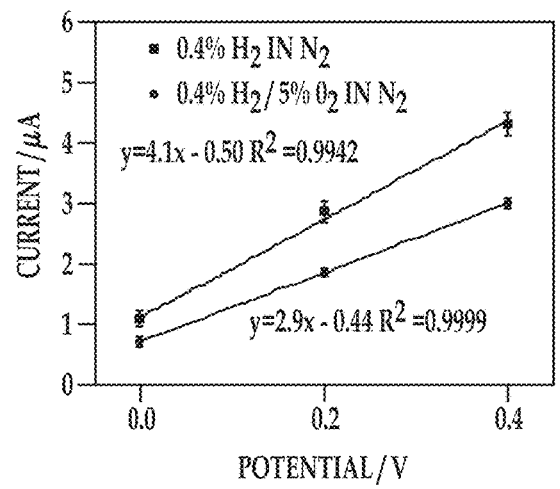

FIG. 41A shows the chronoamperometry responses of 5% (v/v) oxygen in a nitrogen (N$_2$) environment (without any hydrogen), of 1% (v/v) hydrogen in an N$_2$ environment, and of 1% (v/v) hydrogen in a nitrogen/oxygen (N$_2$/O$_2$) environment in the [Bmpy][NTf$_2$] at the three different potentials (0.4V, 0.2V, 0.0V). The calibration curve is shown in FIG. 41B.

FIG. 41C shows the chronoamperometry responses of 5% (v/v) oxygen in a nitrogen (N$_2$) environment (with no hydrogen), of 0.4% (v/v) hydrogen in an N$_2$ environment, and of 0.4% (v/v) hydrogen in a nitrogen/oxygen (N$_2$/O$_2$) environment in the [Bmpy][NTf$_2$] at the three different potentials (0.4V, 0.2V, 0.0V). The calibration curve is shown in FIG. 41D.

As shown in FIG. 41A, the 1% hydrogen in nitrogen exhibited significantly increased current signal responses with the increase in potential, with the highest current response recorded at 0.4V. In addition, the linearity between the current signal response of hydrogen (in nitrogen) and the potential (as shown in FIG. 41B) suggests that the current value increase due to the electron transfer rate can be influenced by the applied potential. In FIG. 41B, the slope is 5.5 and the R$^2$ is 0.9863. A similar relationship between the current signal response and the potential was observed for the 0.4% hydrogen in nitrogen (see FIGS. 41C and 41D). In FIG. 41D, the slope is 4.1 and the R$^2$ is 0.9942.

Also as shown in FIGS. 41A and 41C, there is also a significantly higher current response of hydrogen in the nitrogen background than in the background with the presence of 5% (v/v) oxygen.

Table 23 shows the calculated average current value of hydrogen at the two different concentrations (1% and 0.4%) in the nitrogen background (N$_2$) or the nitrogen and oxygen background (N$_2$/O$_2$) at the three different potentials (0.4V, 0.2V, 0V).

TABLE 23

| | Average Current μA | | | | | |
|---|---|---|---|---|---|---|
| | 0.4% (v/v) hydrogen | | | 1% (v/v) hydrogen | | |
| Background gas(es) | 0.4 V | 0.2 V | 0 V | 0.4 V | 0.2 V | 0 V |
| N$_2$ | 4.31 | 2.87 | 1.09 | 7.51 | 5.22 | 3.12 |
| N$_2$/O$_2$ | 3.01 | 1.87 | 0.71 | 5.49 | 3.09 | 1.51 |

As shown in Table 23, the average current value of 0.4% (v/v) hydrogen was significantly lower than that of 1% (v/v) hydrogen at the same potential. This can also be explained by the Bulter-Volmer equation, and indicates that the current value could also be enhanced by the concentration of analytic gas.

From Table 23, it was noted that in the nitrogen environment, the average current signal of 1% (v/v) hydrogen was 1.74 times higher than that of 0.4% (v/v) hydrogen. According to the Bulter-Volmer equation, the average current signal of 1% (v/v) hydrogen is supposed to be 2.5 times higher than that of 0.4% (v/v) hydrogen. Both of the solubility of hydrogen in the ionic liquid and the surface adsorption of hydrogen on platinum electrode should contribute to the hydrogen current signal, and thus the responses of hydrogen obtained may be due to these two factors together.

Also as shown in Table 23, the current signals of the 0.4% (v/v) hydrogen in the N$_2$ gas background were 44.8%, 54.5% and 57.7% higher than those in the N$_2$/O$_2$ gas background, respectively. The current signals of the 1% (v/v) hydrogen in the N$_2$ gas background were 27.5%, 37.0% and 56.7% higher than those in the N$_2$/O$_2$ gas background, respectively. These results demonstrate that oxygen could participate in the hydrogen oxidation process.

The decline of the hydrogen current signal in N$_2$/O$_2$ gas background indicates that a reduction reaction occurred during the hydrogen oxidation process, which led to the production of negative current and thus the decline of the positive current. The steps of hydrogen oxidation process in the ionic liquid are outlined herein at eqs. 1-4. In the presence of oxygen, the intermediate, Pt—H, can react with oxygen and contribute to the negative reduction current in [Bmpy][NTf$_2$] (see eqs. 5-7). The sum of the positive current due to hydrogen oxidation and the negative current due to reduction reaction leads to a lower positive current. Thus, in the presence of oxygen, the current signal response of hydrogen would be lower than that without the presence of oxygen.

Repeated cycles of chronoamperometry with 0.4% (v/v) hydrogen in the N$_2$ and N$_2$/O$_2$ mixture backgrounds were performed twice at a potential of 0V. Table 24 summarizes the average current value for the two cycles. As shown in Table 24, the difference between the two cycles is negligible. Comparing the 0.4% (v/v) hydrogen results at 0V in Table 23 with the results for the two cycles in Table 24 also indicates that the results are similar. These results demonstrate that the oxygen coupling hydrogen oxidation reaction process has a stable and repeatable response.

TABLE 24

| | Average Current μA 0.4% (v/v) hydrogen | | |
|---|---|---|---|
| Background gas(es) | First Cycle | Second Cycle | Δi(i1 − i2) |
| N$_2$ | 1.09 | 1.12 | 0.02 |
| N$_2$/O$_2$ | 0.69 | 0.71 | 0.02 |

Additional cycles of chronoamperometry were performed with several different concentrations of hydrogen, namely 0.25% (v/v), 0.5% (v/v), 0.75% (v/v), 1 (v/v), and 1.25% (v/v), at potentials of 0V, 0.2V, and 0.4V. For these additional cycles, either an N$_2$ background or an N$_2$/O$_2$ mixture background was used.

Figure 43A:
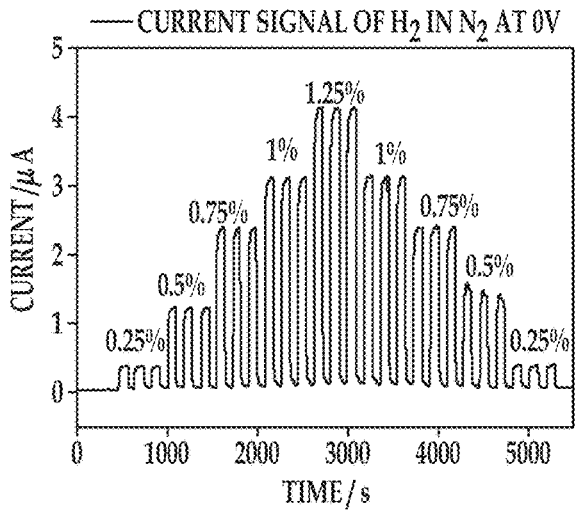
FIGS. 43A and 43B are graphs depicting the (A) the amperometric response of a sensor with ([Bmpy][NTf$_2$]) in the presence of 0.25% $H_2$ in $N_2$ (v/v), 0.5% $H_2$ in $N_2$ (v/v), 0.75% $H_2$ in $N_2$ (v/v), 1% $H_2$ in $N_2$ (v/v), and 1.25% $H_2$ in $N_2$ (v/v) at 0V, and (B) the amperometric response of the sensor with ([Bmpy][NTf$_2$]) in the presence of the presence of 0.25% $H_2$ and 5% $O_2$ in $N_2$ (v/v), 0.5% $H_2$ and 5% $O_2$ in $N_2$ (v/v), 0.75% $H_2$ and 5% $O_2$ in $N_2$ (v/v), 1% $H_2$ and 5% $O_2$ in $N_2$ (v/v), and 1.25% $H_2$ and 5% $O_2$ in $N_2$ (v/v) at 0V.
Figure 43B:
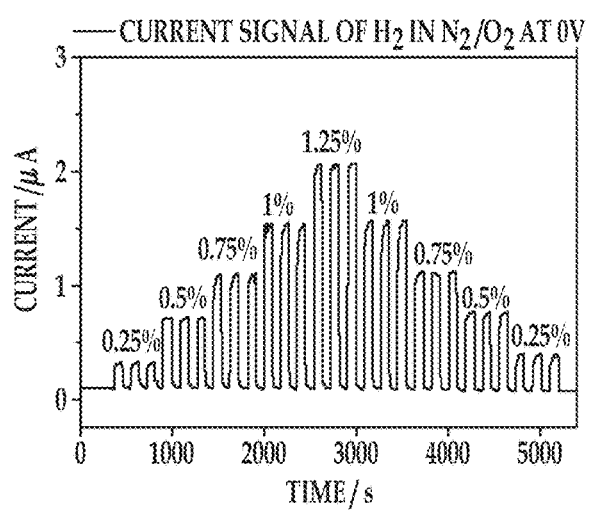
Figure 44A:
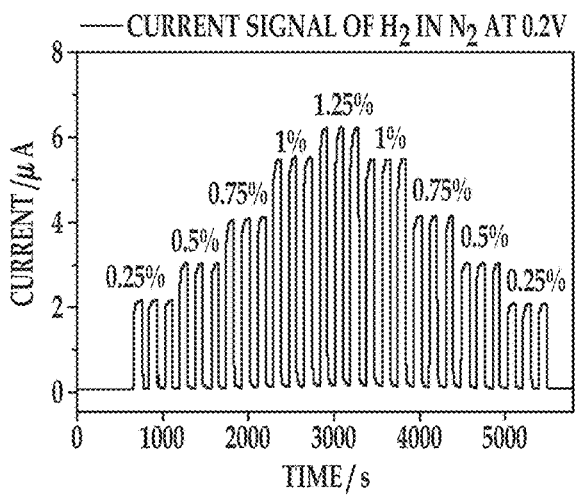
FIGS. 44A and 44B are graphs depicting the (A) the amperometric response of a sensor with ([Bmpy][NTf$_2$]) in the presence of 0.25% $H_2$ in $N_2$ (v/v), 0.5% $H_2$ in $N_2$ (v/v), 0.75% $H_2$ in $N_2$ (v/v), 1% $H_2$ in $N_2$ (v/v), and 1.25% $H_2$ in $N_2$ (v/v) at 0.2V, and (B) the amperometric response of the sensor with ([Bmpy][NTf$_2$]) in the presence of the presence of 0.25% $H_2$ and 5% $O_2$ in $N_2$ (v/v), 0.5% $H_2$ and 5% $O_2$ in $N_2$ (v/v), 0.75% $H_2$ and 5% $O_2$ in $N_2$ (v/v), 1% $H_2$ and 5% $O_2$ in $N_2$ (v/v), and 1.25% $H_2$ and 5% $O_2$ in $N_2$ (v/v) at 0.2V.
Figure 44B:
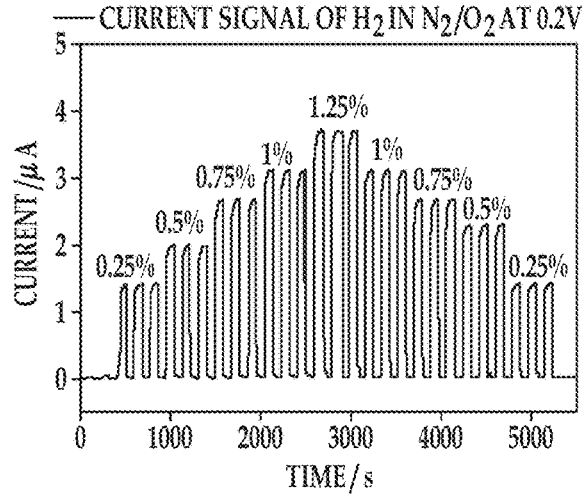
Figure 45A:
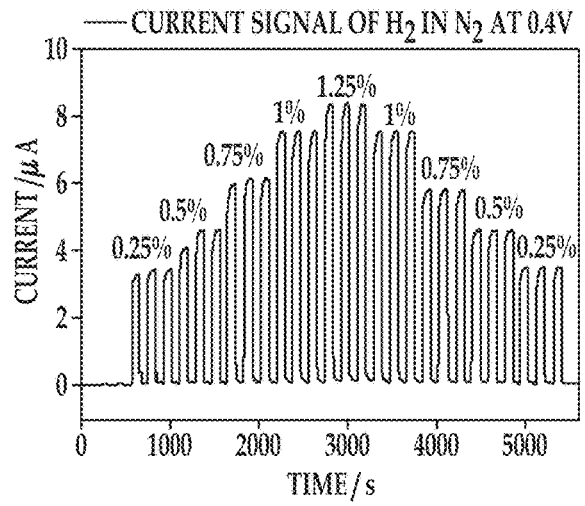
FIGS. 45A and 45B are graphs depicting the (A) the amperometric response of a sensor with ([Bmpy][NTf$_2$]) in the presence of 0.25% $H_2$ in $N_2$ (v/v), 0.5% $H_2$ in $N_2$ (v/v), 0.75% $H_2$ in $N_2$ (v/v), 1% $H_2$ in $N_2$ (v/v), and 1.25% $H_2$ in $N_2$ (v/v) at 0.4V, and (B) the amperometric response of the sensor with ([Bmpy][NTf$_2$]) in the presence of the presence of 0.25% $H_2$ and 5% $O_2$ in $N_2$ (v/v), 0.5% $H_2$ and 5% $O_2$ in $N_2$ (v/v), 0.75% $H_2$ and 5% $O_2$ in $N_2$ (v/v), 1% $H_2$ and 5% $O_2$ in $N_2$ (v/v), and 1.25% $H_2$ and 5% $O_2$ in $N_2$ (v/v) at 0.4V.
Figure 45B:
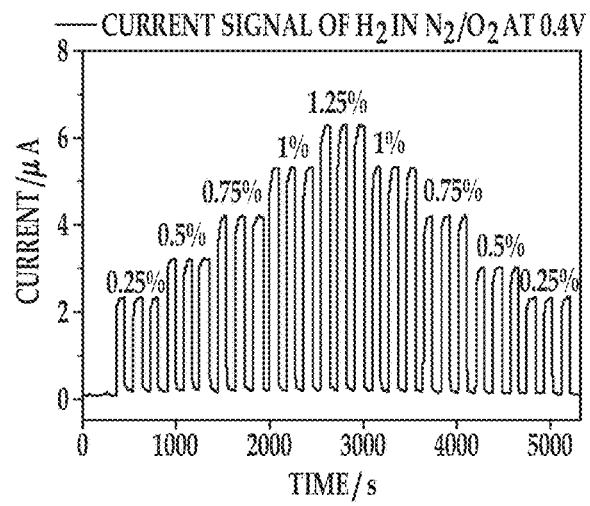

FIGS. 43A and 43B show the chronoamperometry responses of the different percentages of hydrogen in the nitrogen (N$_2$) environment and the mixed N$_2$/O$_2$ environment, respectively, at 0V. FIGS. 44A and 44B show the chronoamperometry responses of the different percentages of hydrogen in the nitrogen (N$_2$) environment and the mixed N$_2$/O$_2$ environment, respectively, at 0.2V. FIGS. 45A and 45B show the chronoamperometry responses of the different percentages of hydrogen in the nitrogen ($N_2$) environment and the mixed $N_2/O_2$ environment, respectively, at 0.4V.

FIGS. 43A through 45B show that the current increased with the increase in the hydrogen concentration at each potential. Comparing FIG. 43A with FIG. 43B, FIG. 44A with FIG. 44B, and FIG. 45A with FIG. 45B, the current signal response in the nitrogen background was higher than in nitrogen/oxygen background.

Table 25 sets forth the calculated average current value of hydrogen with different concentration in the aerobic condition (i.e., mixed $N_2/O_2$ background) and the anaerobic condition (i.e., $N_2$ background) at the three different potentials.

TABLE 25

| Hydrogen Conc. | Average Current μA | | | | | |
|---|---|---|---|---|---|---|
| | Nitrogen Background | | | Nitrogen/Oxygen Background | | |
| (%) | 0.4 V | 0.2 V | 0 V | 0.4 V | 0.2 V | 0 V |
| 0.25 | 3.41 | 2.13 | 0.37 | 2.31 | 1.41 | 0.33 |
| 0.50 | 4.61 | 3.01 | 1.32 | 3.21 | 2.03 | 0.71 |
| 0.75 | 6.12 | 4.13 | 2.41 | 4.17 | 2.68 | 1.11 |
| 1.00 | 7.53 | 5.53 | 3.12 | 5.32 | 3.13 | 1.56 |
| 1.25 | 8.33 | 6.21 | 4.13 | 6.30 | 3.70 | 2.07 |

As demonstrated in Table 25, when the potential and hydrogen concentration are constant, the hydrogen current in $N_2$ is higher than the hydrogen current in the $N_2/O_2$ mixture. The data in Table 25 shows the good stability and reversibility of hydrogen reaction at Pt electrode in [Bmpy][NTf2].

Figure 46A:
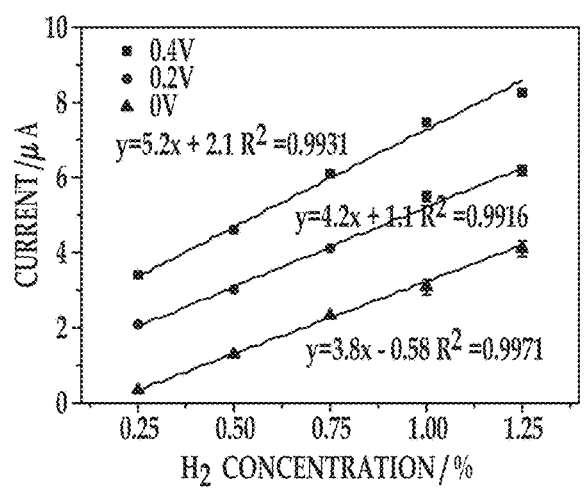
FIG. 46A is a calibration curve of the results in FIGS. 43A, 44A, and 45A.
Figure 46B:
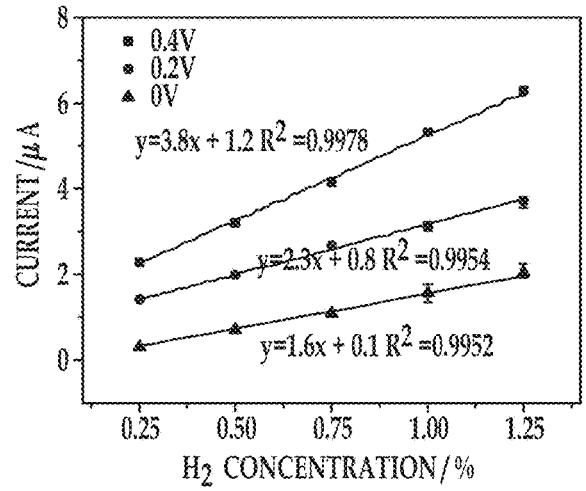
FIG. 46B is a calibration curve of the results in FIGS. 43B, 44B, and 45B.

Calibration curves were generated plotting the average current (in μA) versus the hydrogen concentration (in %) at each of the potentials. The calibration curve for the $N_2$ background is shown in FIG. 46A and the calibration curve for the $N_2/O_2$ background is shown in FIG. 46B. The equation for each of the lines is also shown. When converted to A (from μA), the equations in the $N_2$ background are:

At 0V, $y=3.8E\text{-}6x-5.8E\text{-}7$

At 0.2V, $y=4.2E\text{-}6x+1.1E\text{-}6$

At 0.4V, $y=5.2E\text{-}6x+2.1E\text{-}6$

As shown in FIGS. 46A and 46B, the current increased with the increase of the potential at each concentration. The relationship between the current and the hydrogen concentration in both of the nitrogen and nitrogen/oxygen environment is linear.

FIGS. 46A and 46B show that at lower hydrogen concentrations (e.g., 0.25%) and lower potentials, the difference in current between anaerobic and aerobic conditions was relatively small. However, with the increase of hydrogen concentration, the current difference became significant. This may due to the solubility of hydrogen and the use of potential as the driving force. A higher concentration of hydrogen means that more hydrogen molecules could be dissolved, and a higher potential indicates a stronger driving force which results in more soluble hydrogen molecules that are available to react in the ionic liquid. These results also indicate that the solubility of hydrogen can contribute significantly to the current response of the hydrogen oxidation process.

Figure 47:
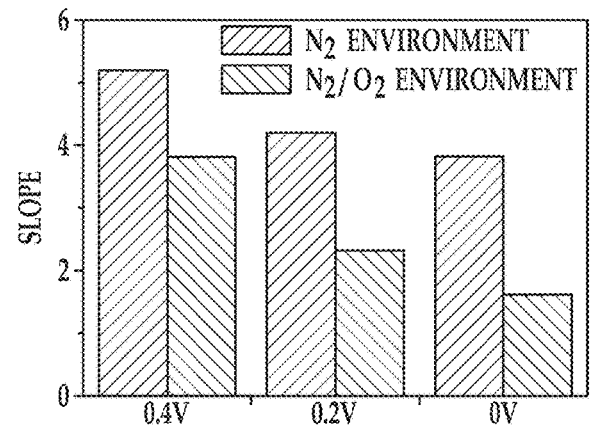
FIG. 47 is a bar chart of the slopes integrated from FIGS. 46A and 46B.

FIG. 47 presents the slopes of the hydrogen oxidation process in the nitrogen and nitrogen/oxygen environments integrated from FIGS. 46A and 46B. From this figure, it can be seen that the more positive potential that was applied, the higher the hydrogen sensing sensitivity (i.e., slope). From this data, the sensitivity factors ($K_{H2}$) are 3.8E-6, 4.2E-6 and 5.2E-6 at the three different potentials (0, 0.2 and 0.4V), respectively; and the residual or background currents ($I_{blank}$) are -5.8E-7, 1.1E-6 and 2.1E-6 at the three different potentials (0, 0.2 and 0.4V), respectively.

In the presence of oxygen, assuming the current is the sum of all faradic processes occurred at an applied potential (as described herein), the following equations (which are based on equations E and F) may be used:

$$\text{At 0V: } I_{E=0V}=3.8E\text{-}6\ C_{H2}+K_{O2}C_{O2}-5.8E\text{-}7 \quad (20)$$

$$\text{At 0.2V: } I_{E=0.2V}=4.2E\text{-}6\ C_{H2}+K_{O2}C_{O2}+1.1E\text{-}6 \quad (21)$$

$$\text{At 0.4V: } I_{E=0.4V}=5.2E\text{-}6\ C_{H2}+K_{O2}C_{O2}+2.1E\text{-}6 \quad (22)$$

Since at positive potentials (0V, 0.2V, and 0.4V), oxygen should have no redox reaction (see e.g., results for 5% $O_2$ in FIGS. 41A and 41C), $K_{O2}=0$ and the equations 20 through 21 can be simplified to:

$$\text{At 0V: } I_{E=0V}=3.8E\text{-}6\ C_{H2}-5.8E\text{-}7 \quad (23)$$

$$\text{At 0.2V: } I_{E=0.2V}=4.2E\text{-}6\ C_{H2}+1.1E\text{-}6 \quad (24)$$

$$\text{At 0.4V: } I_{E=0.4V}=5.2E\text{-}6\ C_{H2}+2.1E\text{-}6 \quad (25)$$

With equations 23 through 25, the hydrogen concentration ($C_{H2}$) could be determined in an unknown sample at the respective potentials.

To test this analytical method, the average current values for hydrogen sensing in the presence of oxygen (i.e., the $N_2/O_2$ environment) at 0V from Table 25 were converted from μA to A. These values are shown in Table 26. These values were plugged into equation 23 (as $I_{E=0V}$) in order to calculated the hydrogen concentration $C_{H2}$. The calculated $C_{H2}$ values are also shown in Table 26. The actual $C_{H2}$ values used in the test, and the different between the calculated and actual values are also shown in Table 26.

TABLE 26

| Potential (V) | Average Current (A) in $N_2/O_2$ from Table 25 | Calculated $C_{H2}$ (v/v %) Using Eq. 23 | Actual $C_{H2}$ (v/v %) Used | $\Delta\ C_{H2(calc)} - C_{H2(actual)}$ |
|---|---|---|---|---|
| 0 | 3.3E-7 | 0.239 | 0.25 | -0.011 |
| | 7.1E-7 | 0.339 | 0.50 | -0.161 |
| | 1.1E-6 | 0.442 | 0.75 | -0.308 |
| | 1.5E-6 | 0.547 | 1.00 | -0.453 |
| | 2.1E-6 | 0.705 | 1.25 | -0.545 |
| 0.2 | 1.4E-6 | 0.071 | 0.25 | -0.179 |
| | 2.0E-6 | 0.214 | 0.50 | -0.286 |
| | 2.7E-6 | 0.381 | 0.75 | -0.369 |
| | 3.1E-6 | 0.476 | 1.00 | -0.524 |
| | 3.7E-6 | 0.619 | 1.25 | -0.631 |
| 0.4 | 2.3E-6 | 0.038 | 0.25 | -0.212 |
| | 3.2E-6 | 0.212 | 0.50 | -0.288 |
| | 4.2E-6 | 0.404 | 0.75 | -0.346 |
| | 5.3E-6 | 0.615 | 1.00 | -0.385 |
| | 6.3E-6 | 0.807 | 1.25 | -0.443 |

The error measured in Table 26 indicates that the analytical method disclosed herein may be used to calculate the hydrogen concentration. The results in Table 26 show: (1) the lower $H_2$ concentration, the smaller the error; and (2) the lower the applied potential, the smaller the error. The negative error suggests that the sensitivity and/or the blank signal are overcompensated. In the presence of the redox active analyte, the induced double layer charging current should be smaller than that of the blank. Furthermore, the adsorption of oxygen may lead to the decrease of hydrogen adsorption, which reduces the sensitivity of hydrogen signal.

Oxygen

Oxygen was analyzed in a similar manner as hydrogen.

Multiple cycles of cyclic voltammetry were performed in a nitrogen background and with the introduction of 5% (v/v) hydrogen in $N_2$ at a potential range from −1.9V to −0.2V. While not shown, these results showed a pair of relatively reversible redox peaks and broad reduction peaks at −1.2V, which indicates that the oxygen reduction reaction is electrochemically reversible in the ionic liquid. In addition, the separation of the oxygen gas reduction potential and the superoxide radical oxidation potential was 0.15V, which indicated that a relatively good reversible redox process had occurred in [Bmpy][NTf2].

From the cyclic voltammetry results, it was apparent that the current increased with an increase of voltage in the potential range from −0.4V to −1.2V, and that the current value had reached maximum at −1.25V. Thus, three different potentials of −0.4V, −0.8V, −1.2V were selected for further analysis.

Figure 48A:
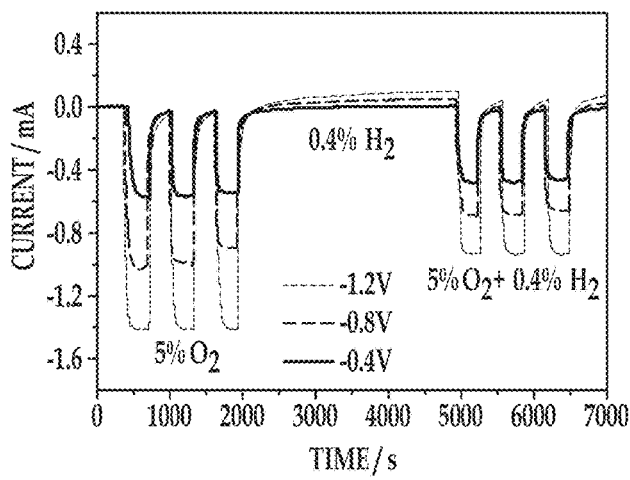
FIGS. 48A and 48B are graphs depicting the (A) the amperometric response of a sensor with ([Bmpy][NTf$_2$]) in the presence of 5% $O_2$ in $N_2$ (v/v), 0.4% $H_2$ in $N_2$ (v/v), and 0.4% $H_2$ and 5% $O_2$ in $N_2$ (v/v) at different negative potentials, and B) the corresponding calibration curve.
Figure 48B:
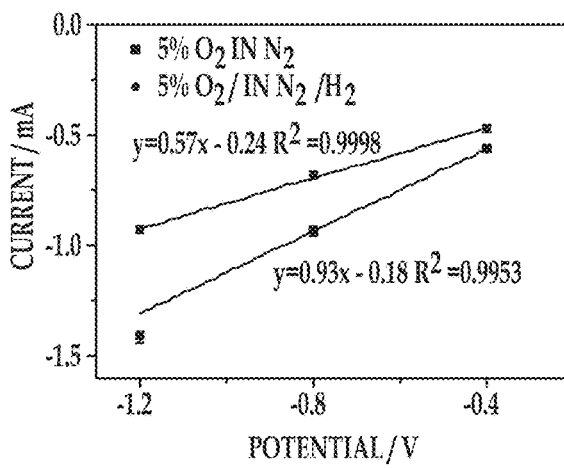

FIG. 48A shows the chronoamperometry responses of 5% (v/v) oxygen in a nitrogen ($N_2$) environment (without any hydrogen), of 0.4% (v/v) hydrogen in an $N_2$ environment, and of 5% (v/v) oxygen in a mixed nitrogen and hydrogen (0.4% (v/v)) environment in the [Bmpy][NTf$_2$] at the three different potentials (−0.4V, −0.8V, −1.2V). The calibration curve is shown in FIG. 48B.

As shown in FIG. 48A, there was a higher cathodic current response of oxygen in the nitrogen background than in the $N_2/H_2$ background, which is due to the presence of 0.4% (v/v) hydrogen in the $N_2/H_2$ background. The calibration curve in FIG. 48B demonstrates that the relationship between the potential and the oxygen current response in either $N_2$ or the $N_2/H_2$ mixture is linear.

Table 27 shows the calculated average current value of 5% (v/v) oxygen in the nitrogen background ($N_2$) or the nitrogen and hydrogen background ($N_2/O_2$) at the three different potentials (0.4V, 0.2V, 0V).

TABLE 27

| Background gas(es) | Average Current mA 5% (v/v) oxygen | | |
|---|---|---|---|
| | −1.2 V | −0.8 V | −0.4 V |
| $N_2$ | −1.41 | −0.95 | −0.56 |
| $N_2/H_2$ | −0.93 | −0.68 | −0.47 |

As shown in Table 27, the 5% (v/v) oxygen average current signal in the $N_2$ environment was 40.8%, 36.7% and 19.1% higher than in the $N_2/H_2$ environment at the −1.2V, −0.8V, and −0.4V potentials, respectively.

The decline of the oxygen current signal in $N_2/H_2$ gas background indicates that an oxidation reaction occurred during the oxygen reduction process, which led to the production of a positive current and thus a less negative current. The initial purging of oxygen to the sensor leads to the formation of $O_2^-$ which can subsequently react with hydrogen and form another product which can contribute to the positive current. The sum of the negative current due to the oxygen reduction and the positive current due to the oxidation reaction results in a less negative current. Thus, the current signal response of oxygen is lower in the presence of hydrogen than without it.

In FIG. 48B, the current difference between $O_2/N_2$ system and $O_2/H_2/N_2$ system increased with an increasingly negative potential. Since all the parameters are held constant except potential, this phenomenon may result from the driving force caused by the potential. At the less negative potential (e.g., −0.4V), there are a smaller number of oxygen radicals (since the driving force is small) that could subsequently react with hydrogen, and thus, the formation of $O_2^-$ could be the rate-determining step of the oxidation reduction process in the presence of hydrogen.

Repeated cycles of chronoamperometry with 5% (v/v) oxygen in the $N_2$ and $N_2/H_2$ mixture backgrounds were performed twice at a potential of −0.4V. Table 28 summarizes the average current value for the two cycles. As shown in Table 28, the difference between the two cycles is negligible. Comparing the 5% (v/v) oxygen results at −0.4V in Table 27 with the results for the two cycles in Table 28 also indicates that the results are similar. These results demonstrate that the hydrogen coupling oxygen reduction reaction process has a stable and repeatable response.

TABLE 28

| Background gas(es) | Average Current mA 5% (v/v) oxygen | | |
|---|---|---|---|
| | First Cycle | Second Cycle | Δi(i1 − i2) |
| $N_2$ | −0.55 | −0.57 | 0.02 |
| $N_2/O_2$ | −0.47 | −0.48 | 0.01 |

The calibration coefficient of oxygen was obtained by single point calibration. The current points (converted to A) of 5% (v/v %) $O_2$ at the three different potentials were used to determine $K_{O2}$ at the three potentials:

At −0.4V: $I_{O2}$=−5.6E-4 and $K_{O2}$=−1.1E-4

At −0.8V: $I_{O2}$=−9.5E-4 and $K_{O2}$=−1.9E-4

At −1.2V: $I_{O2}$=−1.4E-3 and $K_{O2}$=−2.8E-4

The $I_{blankO2}$ values obtained from the current decay curve:

At −0.4V: $I_{blank}$=−2.1E-4

At −0.8V: $I_{blank}$=−3.2E-4

At −1.2V: $I_{blank}$=−3.8E-4

At the negative potential, no hydrogen oxidation occurs (see, e.g., FIG. 48A), thus, it can be assumed that $K_{H2}$=0. As such, the following equations may be used to determine the oxygen concentration of an unknown gas sample at the negative potentials:

At −0.4V: $I_{E=-0.4V}$=−1.1E-4$C_{O2}$−2.1E-4  (26)

At −0.8V: $I_{E=-0.8V}$=−1.9E-4$C_{O2}$−3.2E-4  (27)

At −1.2V: $I_{E=-1.2V}$=−2.8E-4$C_{O2}$−3.8E-4  (28)

To test this analytical method, the average current values for oxygen sensing in the presence of hydrogen (i.e., the $N_2/H_2$ environment) at each of the voltages from Table 27 were converted from mA to A. These values are shown in Table 29. These values were respectively plugged into equations 26, 27, and 18 (as $I_E$) in order to calculate the respective oxygen concentrations $C_{O2}$. The calculated $C_{O2}$ values are also shown in Table 29. The actual $C_{O2}$ values used in the test, and the different between the calculated and actual values are also shown in Table 29.

TABLE 29

| Potential (V) | Average Current (A) in $N_2/H_2$ from Table 27 | Calculated $C_{O2}$ (v/v %) Using Eqs. 26, 27, 28 | Actual $C_{O2}$ (v/v %) Used | $\Delta\, C_{O2(calc)} - C_{O2(actual)}$ |
|---|---|---|---|---|
| −0.4 | −4.7E-4 | 2.36 | 5.00 | −2.64 |
| −0.8 | −6.8E-4 | 1.90 | 5.00 | −3.10 |
| −1.2 | −9.3E-4 | 1.96 | 5.00 | −3.04 |

The error in oxygen sensing was much larger than the error for hydrogen sensing. The primary reason may be due to the coupling reactions below

$$O_2 + e^- \rightleftharpoons O_2^- \tag{29}$$

$$2Pt + O_2^- - e^- \rightleftharpoons 2Pt\text{—}O \tag{30}$$

$$2Pt + 2O_2^- + H_2 - e^- \rightleftharpoons 2Pt\text{—}HO_2^- \tag{31}$$

The coupling reaction of hydrogen with the oxygen reduction product, superoxide $O_2^-$, reduces the sensitivity of the calibration curve which results in negative error. Interestingly, the error is smallest at the least negative potential (−0.4V) but the error does not change much at more negative potentials. This suggests the hydrogen concentration is rate limiting in those coupling reactions in eq. (29-31).

Carbon Dioxide

Carbon dioxide can also react with oxygen at a certain potential range in ionic liquids.

Figure 49A:
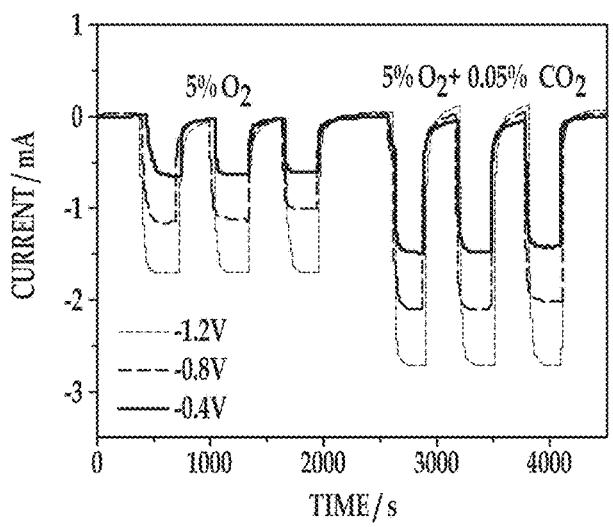
FIGS. 49A and 49B are graphs depicting the (A) the amperometric response of a sensor with ([Bmpy][NTf$_2$]) in the presence of 5% $O_2$ in $N_2$ (v/v) and 0.05% $CO_2$ in $N_2$ (v/v) at different negative potentials, and B) the corresponding calibration curve.
Figure 49B:
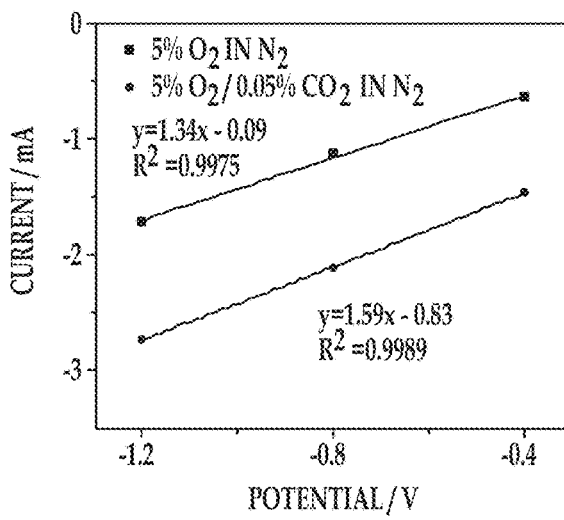

Chronoamperometry was performed with 5% (v/v) oxygen in an $N_2$ background and a mixed $N_2/0.05\%\ CO_2$ mixture background at potentials of −0.4V, −0.8V, and −1.2V. FIG. 49A shows the chronoamperometry responses, and FIG. 49B shows the calibration curve. From these results, it was apparent that the current increased with an increase of potential. In FIG. 49B, the linearity between the current signal response of oxygen and potential in the nitrogen background was consistent with other data presented herein.

There has a higher cathodic current response of oxygen in the $N_2/CO_2$ mixture background than in the nitrogen background, which was due to the presence of 0.05% (v/v) carbon dioxide. Table 30 shows the calculated average current value of 5% (v/v) oxygen in the nitrogen background ($N_2$) or the nitrogen and carbon dioxide background ($N_2/CO_2$) at the three different potentials (−0.4V, −0.8V, −1.2V).

TABLE 30

| Background gas(es) | Average Current mA 5% (v/v) oxygen | | |
|---|---|---|---|
| | −1.2 V | −0.8 V | −0.4 V |
| $N_2$ | −1.71 | −1.13 | −0.63 |
| $N_2/CO_2$ | −2.73 | −2.11 | −1.47 |

As shown in Table 30, the 5% (v/v) oxygen average current signal in the $N_2/CO_2$ environment was 59.6%, 86.7% and 133.3% higher than in the $N_2$ environment at the −1.2V, −0.8V, and −0.4V potentials, respectively.

The increase of oxygen current signal in nitrogen/carbon dioxide environment suggests that an additional reduction reaction occurred during the oxygen reduction process, which led to the production of a negative current and thus an increase in the negative current. In the presence of carbon dioxide, it can rapidly react with $O_2^-$ which results in a negative current response. The reaction mechanism may include:

$$O_2 + e^- \rightleftharpoons O_2^- \tag{29}$$

$$2CO_2 + O_2^- + e^- \rightleftharpoons C_2O_6^{2-} \tag{33}$$

The initial purging of oxygen to the sensor leads to the formation of $O2^-$ which can subsequently react with carbon dioxide and form another product, which can contribute to the negative current. The sum of the negative current due to oxygen reduction and negative current due to the reaction between carbon dioxide and the electrogenerated superoxide results in a larger negative current. Thus, with the addition of carbon dioxide, the current signal response of oxygen would be higher than that without the presence of $CO_2$. Thus, the reduction of $O_2$ in the presence of $CO_2$ results in the formation of adsorbed $C_2O_6^{2-}$ intermediate in the ionic liquid. The reaction of in-situ generated superoxide from $O_2$ reduction with $CO_2$ in the ionic liquid was found to increase the negative current signal current significantly.

Figure 50A:
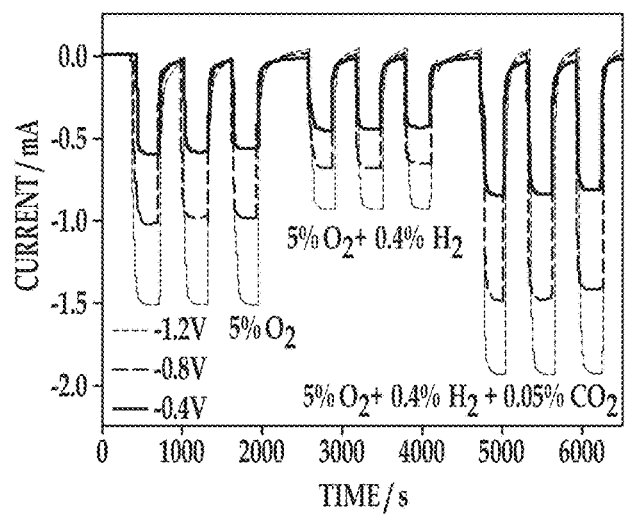
FIGS. 50A and 50B are graphs depicting the (A) the amperometric response of a sensor with ([Bmpy][NTf$_2$]) in the presence of 5% $O_2$ in $N_2$ (v/v), 5% $O_2$ and 0.4% $H_2$ in $N_2$ (v/v), and 5% $O_2$, 0.4% $H_2$, and 0.05% $CO_2$ in $N_2$ at different negative potentials, (B) the amperometric response of the sensor with ([Bmpy][NTf$_2$]) in the presence of 0.4% $H_2$ in $N_2$ (v/v), 5% $O_2$ and 0.4% $H_2$ in $N_2$ (v/v), and 5% $O_2$, 0.4% $H_2$, and 0.05% $CO_2$ in $N_2$ at different potentials.
Figure 50B:
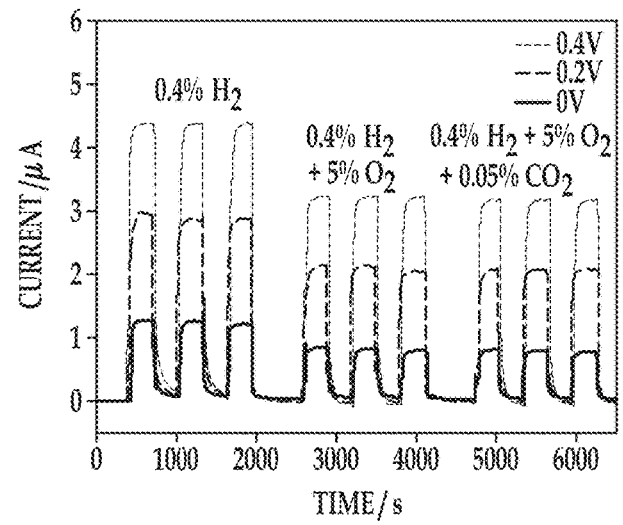

FIG. 50A shows the chronoamperometry responses of 5% (v/v) oxygen in a nitrogen ($N_2$) environment, in a mixed nitrogen and 0.4% (v/v) hydrogen environment, and in a mixed nitrogen, 0.4% (v/v) hydrogen, and 0.05% (v/v) carbon dioxide environment in the [Bmpy][NTf$_2$] at three different negative potentials (−0.4V, −0.8V, −1.2V). FIG. 50B shows the chronoamperometry responses of 0.4% (v/v) hydrogen in a nitrogen ($N_2$) environment, in a mixed nitrogen and 5% (v/v) oxygen environment, and in a mixed nitrogen, 5% (v/v) oxygen, and 0.05% (v/v) carbon dioxide environment in the [Bmpy][NTf$_2$] at three different positive potentials (0V, 0.2V, 0.4V).

In FIG. 50A, the current signals of oxygen in the presence of hydrogen at the three negative potentials were lower than the pure oxygen current signals. In FIG. 50B, the current signals of oxygen in the presence of hydrogen and carbon dioxide were higher than the pure oxygen signals. These results indicate that carbon dioxide plays a more important role in the oxygen coupling reaction.

Figure 51:
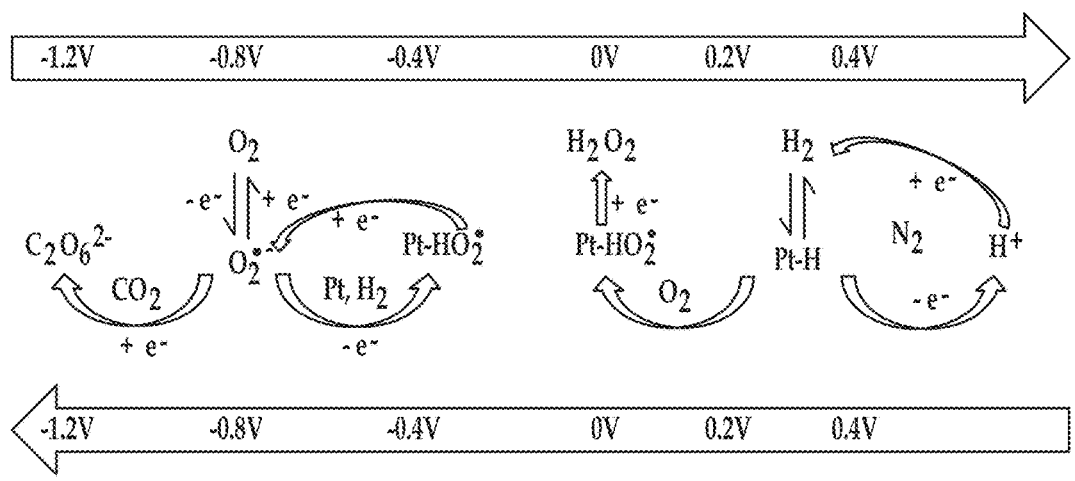
FIG. 51 is a schematic illustration of the coupling reaction mechanism between hydrogen, oxygen, and carbon dioxide in [Bmpy][NTf$_2$] at a potential range of −1.3V to +0.5V.

Based on these results, the coupling reaction process between hydrogen, oxygen and carbon dioxide is schematically presented in FIG. 51. This illustrates how the electrode potential can be used to tune the sensitivity and selectivity of an ionic liquid electrochemical gas sensor for detection of the $H_2$ and $O_2$ in mixed gases utilizing the unique redox reactions of the $H_2$ and $O_2$, as well as their coupling chemical reactions. The pattern of the response mechanism can be used to increase selectivity.

As illustrated in the Examples, the sensing systems 10, 10', 10", 10''' disclosed herein have several desirable characteristics. First, the sensing systems 10, 10', 10", 10''' have high reproducibility over multiple measurements; second, the sensing systems 10, 10', 10", 10''' have high sensitivity to detect gas molecule(s) (e.g., hydrogen) below its explosive concentration (e.g., 4% for hydrogen); and third, the sensing systems 10, 10', 10", 10''' have a fast response, which is desirable for instances where the gas molecule concentration suddenly increases. Finally, the energy consumption of the sensing systems 10, 10', 10", 10''' may be low, so that they can be powered by battery and permit portability.

It is to be understood that the potentials disclosed herein are versus a quasi-reference electrode, and it is to be understood that the potentials may be shifted if another reference electrode is utilized.

It is to be further understood that the ranges provided herein include the stated range and any value or sub-range within the stated range, as if such value(s) or sub-range(s) were explicitly recited. For example, a range from about 18° C. to about 30° C. should be interpreted to include not only the explicitly recited limits of from about 18° C. to about 30° C., but also to include individual values, such as 19.5° C., 22° C., 28° C., etc., and sub-ranges, such as from about 19° C. to about 29° C., from about 20° C. to about 25° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A selective, real-time gas sensing method, comprising:
    supplying an atmospheric gas sample to an interface between a working electrode and an ionic liquid electrolyte, wherein the working electrode is to sense a specific gas molecule, and wherein the ionic liquid electrolyte is selected from the group consisting of 1-ethyl-1-methylpyrrolidinium bis(trifluoromethylsulfonyl)imide, 1-propyl-1-methylpyrrolidinium bis(trifluoromethylsulfonyl)imide, 1-butyl-1-methylpyrrolidinium bis(trifluoromethylsulfonyl)imide, 1-pentyl-1-methylpyrrolidinium bis(trifluoromethylsulfonyl)imide, 1-hexyl-1-methylpyrrolidinium bis(trifluoromethylsulfonyl)imide, 1-heptyl-1-methylpyrrolidinium bis(trifluoromethylsulfonyl)imide, 1-octyl-1-methylpyrrolidinium bis(trifluoromethylsulfonyl)imide, 1-nonyl-1-methylpyrrolidinium bis(trifluoromethylsulfonyl)imide, 1-decyl-1-methylpyrrolidinium bis(trifluoromethylsulfonyl)imide, 1-butyl-3-methylimidazolium bis(trifluoromethylsulfonyl)imide, and a combination thereof;
    based on at least one unique electrochemical reaction of the specific gas molecule to be sensed, implementing a driving force to initiate a series of reactions involving the specific gas molecule; and
    in response to the implementation of the driving force, monitoring for a signal indicative of the specific gas molecule;
    wherein the atmospheric gas sample is supplied continuously for at least 30 seconds and wherein the implementing of the driving force and the monitoring for the signal indicative of the specific gas molecule are performed continuously as the atmospheric gas sample is supplied.

2. The selective, real-time gas sensing method as defined in claim 1 wherein the driving force is a potential applied to the working electrode, and the method further comprises selecting the potential to drive a redox reaction involving the specific gas molecule.

3. The selective, real-time gas sensing method as defined in claim 2 wherein the signal is a current signal, and the method further comprises:
    observing the current signal; and
    quantifying a concentration of the specific gas molecule based on the observed current signal.

4. The selective, real-time gas sensing method as defined in claim 3 wherein the quantification of the concentration of the specific gas molecule is also based on a predetermined current sensitivity value of the specific gas molecule.

5. The selective, real-time gas sensing method as defined in claim 1 wherein the implementing of the driving force involves applying a predetermined electrode potential to the working electrode, wherein the predetermined electrode potential is i) a reduction peak potential for the specific gas molecule, or ii) a more negative potential than the reduction peak potential for the specific gas molecule.

6. The selective, real-time gas sensing method as defined in claim 5, further comprising applying, to a second working electrode, a more positive potential than the predetermined electrode potential, thereby oxidizing a product of a reduction reaction involving the specific gas molecule.

7. The selective, real-time gas sensing method as defined in claim 5 wherein the specific gas molecule is oxygen gas, and the predetermined electrode potential is −1.2V versus a quasi platinum reference electrode, or ranges from −1.2V to a more negative potential that does not reduce an anion of the ionic liquid electrolyte.

8. The selective, real-time gas sensing method as defined in claim 1 wherein the implementing of the driving force involves applying a predetermined electrode potential to the working electrode, wherein the predetermined electrode potential is i) an oxidation peak potential for the specific gas molecule, or ii) a more positive potential than the oxidation peak potential for the specific gas molecule.

9. The selective, real-time gas sensing method as defined in claim 8, further comprising applying, to a counter electrode or a second working electrode, a more negative potential than the predetermined electrode potential, thereby reducing a product of an oxidation reaction involving the specific gas molecule.

10. The selective, real-time gas sensing method as defined in claim 8 wherein the specific gas molecule is hydrogen gas, and the predetermined electrode potential is +0.4V versus a quasi platinum reference electrode, or ranges from +0.4V to a more positive potential that does not oxidize a cation of the ionic liquid electrolyte.

11. The selective, real-time gas sensing method as defined in claim 1 wherein the specific gas molecule is selected from the group consisting of hydrogen gas, oxygen gas, ozone gas, carbon monoxide, sulfur dioxide, methanol, methane, nitrogen dioxide, aldehyde, acetaldehyde, nitrobenzene, methylene chloride, and trichloroethylene.

12. The selective, real-time gas sensing method as defined in claim 1 wherein the driving force is selected from the group consisting of light and temperature.

13. The selective, real-time gas sensing method as defined in claim 1 wherein:
    the driving force to initiate the series of reactions involving the specific gas molecule is a first potential;
    the atmospheric gas sample includes a second specific gas molecule; and
    the method further comprises:
        implementing a second potential to initiate a second series of reactions involving the second specific gas molecule, wherein the second potential is different from the first potential; and in response to the implementation of the second potential, monitoring for a second signal indicative of the second specific gas molecule.

14. The selective, real-time gas sensing method as defined in claim 13 wherein:
the signal indicative of the specific gas molecule is a first current signal;
the second signal indicative of the second specific gas molecule is a second current signal; and
the method further comprises:
determining a concentration of the specific gas molecule using the first current signal and a predetermined current sensitivity value of the specific gas molecule; and
determining a concentration of the second specific gas molecule using the second current signal and a second predetermined current sensitivity value of the second specific gas molecule.

15. The selective, real-time gas sensing method as defined in claim 1 wherein the signal is a current signal, and the method further comprises:
obtaining a charge from a current versus time curve; and
quantifying a concentration of the specific gas molecule based on the charge.

* * * * *